US009804563B2

(12) United States Patent
Rosen et al.

(10) Patent No.: US 9,804,563 B2
(45) Date of Patent: Oct. 31, 2017

(54) SYSTEM, APPARATUS AND METHOD FOR EXTRACTING THREE-DIMENSIONAL INFORMATION OF AN OBJECT FROM RECEIVED ELECTROMAGNETIC RADIATION

(71) Applicant: CELLOPTIC, INC., Rockville, MD (US)

(72) Inventors: Joseph Rosen, Omer (IL); Gary Brooker, Rockville, MD (US)

(73) Assignee: CELLOPTIC, INC., Rockville, MD (US)

( * ) Notice: Subject to any disclaimer, the term of this patent is extended or adjusted under 35 U.S.C. 154(b) by 0 days.

(21) Appl. No.: 15/014,742

(22) Filed: Feb. 3, 2016

(65) Prior Publication Data

US 2016/0154377 A1 Jun. 2, 2016

Related U.S. Application Data

(63) Continuation of application No. 14/727,342, filed on Jun. 1, 2015, now abandoned, which is a continuation
(Continued)

(51) Int. Cl.
| *G03H 1/08* | (2006.01) |
| *G03B 35/02* | (2006.01) |
| *H04N 1/00* | (2006.01) |
| *G03H 1/04* | (2006.01) |
| *G03H 1/06* | (2006.01) |
| *G03H 1/02* | (2006.01) |

(52) U.S. Cl.
CPC ........... *G03H 1/0841* (2013.01); *G03B 35/02* (2013.01); *G03H 1/041* (2013.01); *G03H 1/0402* (2013.01); *G03H 1/0443* (2013.01); *G03H 1/06* (2013.01); *G03H 1/08* (2013.01); *H04N 1/00827* (2013.01); *G03H 2001/0224* (2013.01); *G03H 2001/0436* (2013.01); *G03H 2001/0458* (2013.01); *G03H 2001/085* (2013.01); *G03H 2223/23* (2013.01); *G03H 2225/33* (2013.01); *G03H 2240/13* (2013.01); *G03H 2240/21* (2013.01); *G03H 2240/23* (2013.01); *G03H 2240/24* (2013.01)

(58) Field of Classification Search
CPC .. G03B 35/02; H04N 1/00827; G03H 1/0402; G03H 1/06; G03H 1/0443; G03H 1/041
See application file for complete search history.

(56) References Cited

U.S. PATENT DOCUMENTS 4,853,769 A 8/1989 Kollin
5,159,474 A 10/1992 Franke et al.
(Continued)

*Primary Examiner* — Jennifer L. Doak
(74) *Attorney, Agent, or Firm* — Nixon & Vanderhye PC

(57) ABSTRACT

An apparatus and method to produce a hologram of an object includes an electromagnetic radiation assembly configured to receive a received electromagnetic radiation, such as light, from the object. The electromagnetic radiation assembly is further configured to diffract the received electromagnetic radiation and transmit a diffracted electromagnetic radiation. An image capture assembly is configured to capture an image of the diffracted electromagnetic radiation and produce the hologram of the object from the captured image.

19 Claims, 50 Drawing Sheets

Related U.S. Application Data of application No. 13/970,103, filed on Aug. 19, 2013, now abandoned, which is a continuation of application No. 12/515,343, filed as application No. PCT/US2007/085094 on Nov. 19, 2007, now Pat. No. 8,542,421.

(60) Provisional application No. 60/869,022, filed on Dec. 7, 2006, provisional application No. 60/866,358, filed on Nov. 17, 2006.

(56) References Cited

U.S. PATENT DOCUMENTS

| | | |
|---|---|---|
| 5,347,375 A | 9/1994 | Saito et al. |
| 5,625,471 A | 4/1997 | Smith |
| 6,229,562 B1 * | 5/2001 | Kremen ............... G02B 5/1885 345/419 |
| 6,975,457 B1 | 12/2005 | Greenaway et al. |
| 8,179,578 B2 | 5/2012 | Rosen et al. |
| 8,405,890 B2 | 3/2013 | Rosen |
| 2006/0139711 A1 | 6/2006 | Leister et al. |
| 2006/0204861 A1 * | 9/2006 | Ben-Eliezer ....... G02B 27/0075 430/5 |
| 2012/0224236 A1 | 9/2012 | Rosen et al. |
| 2013/0188232 A1 | 7/2013 | Rosen |
| 2015/0212488 A1 | 7/2015 | Rosen et al. |

* cited by examiner

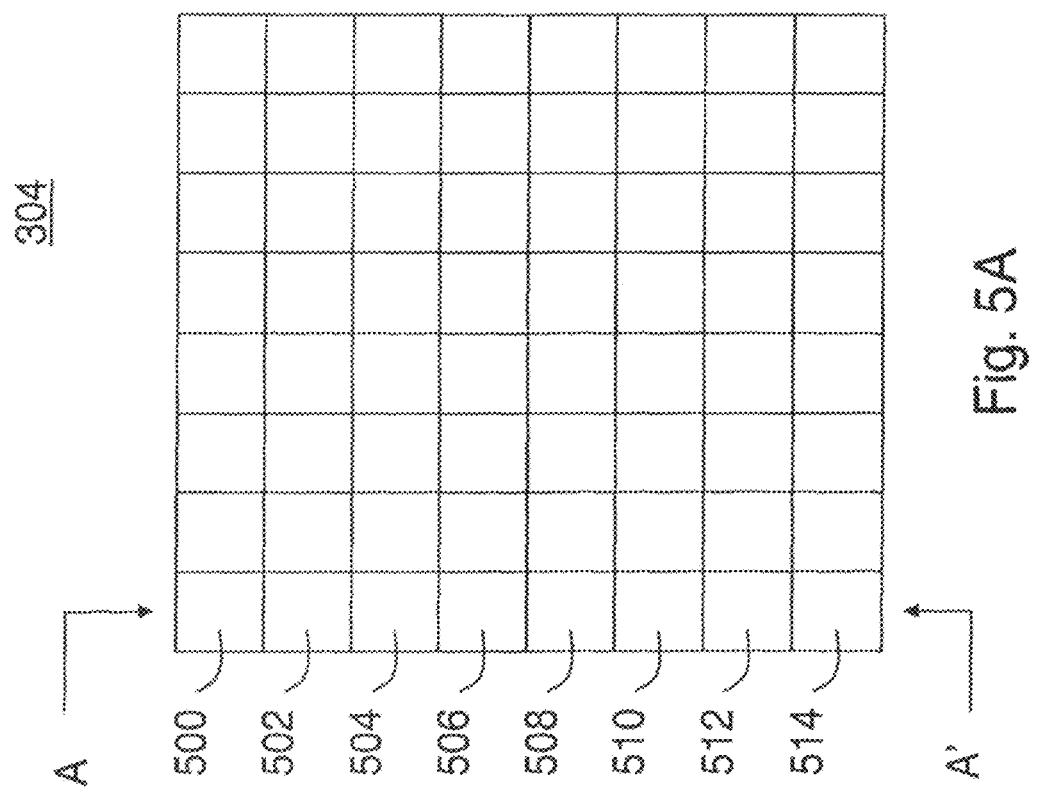

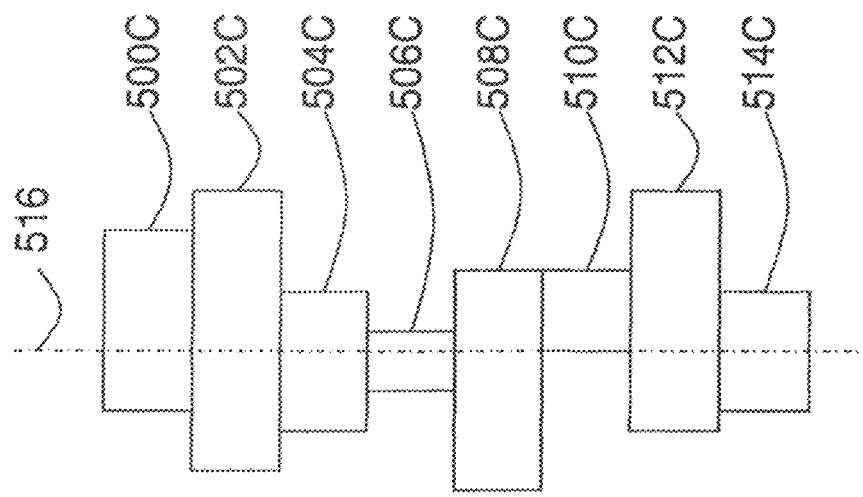
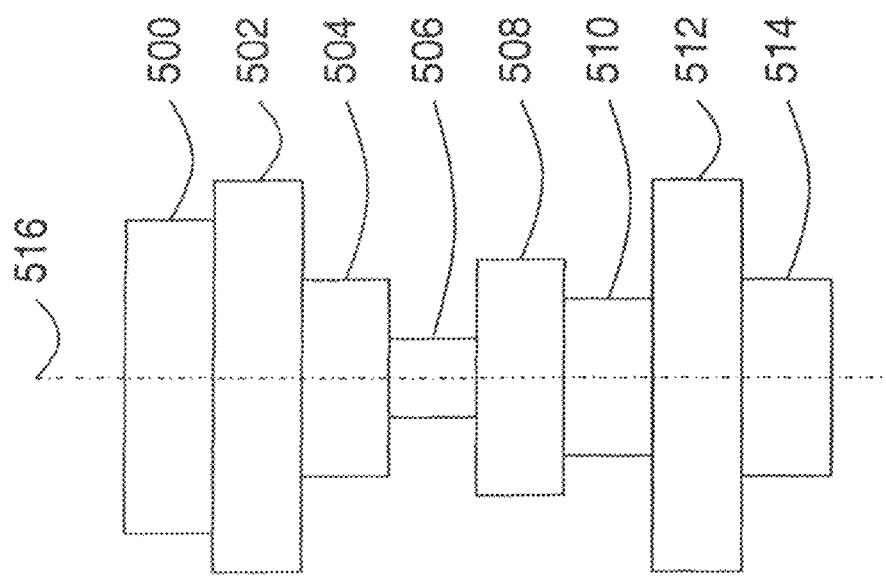

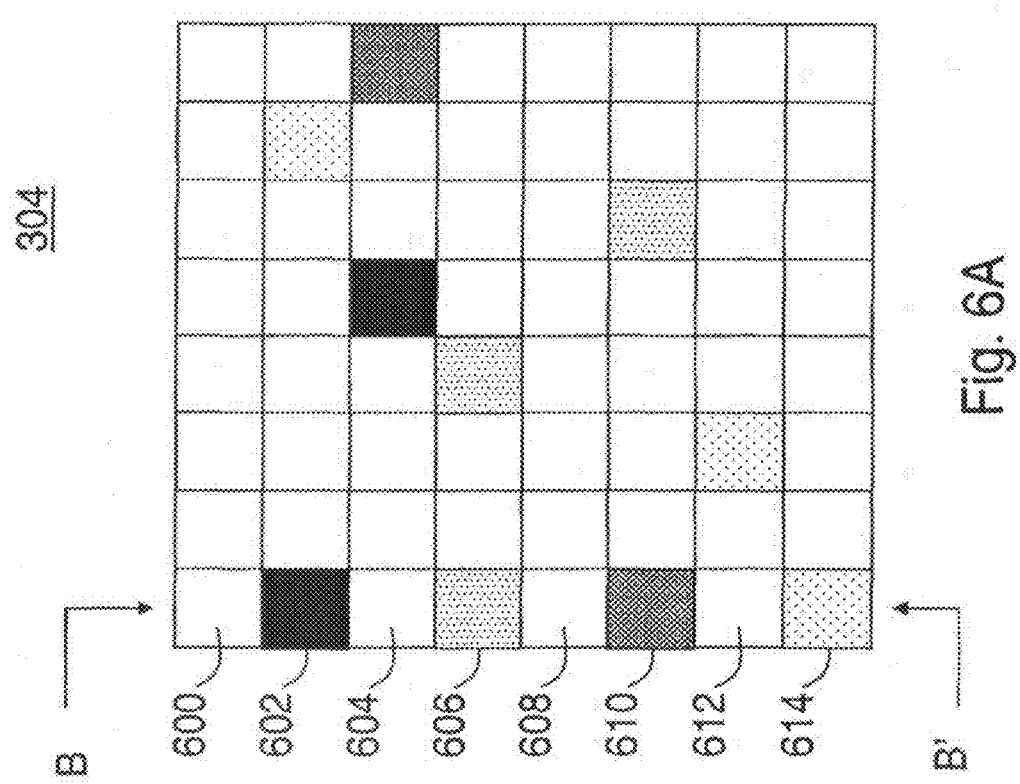

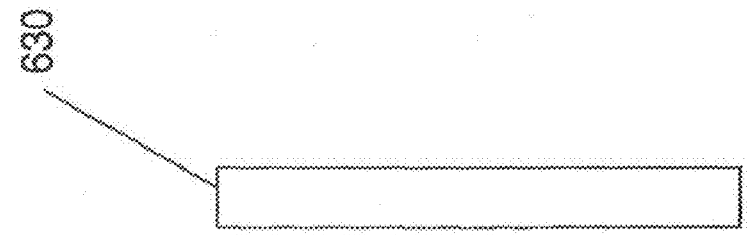
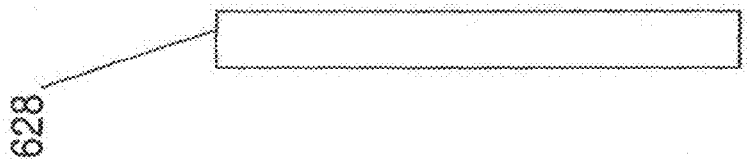
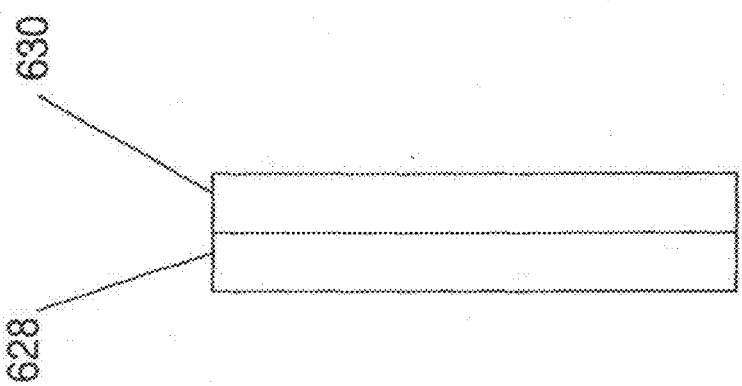
Fig. 6G
Fig. 6F

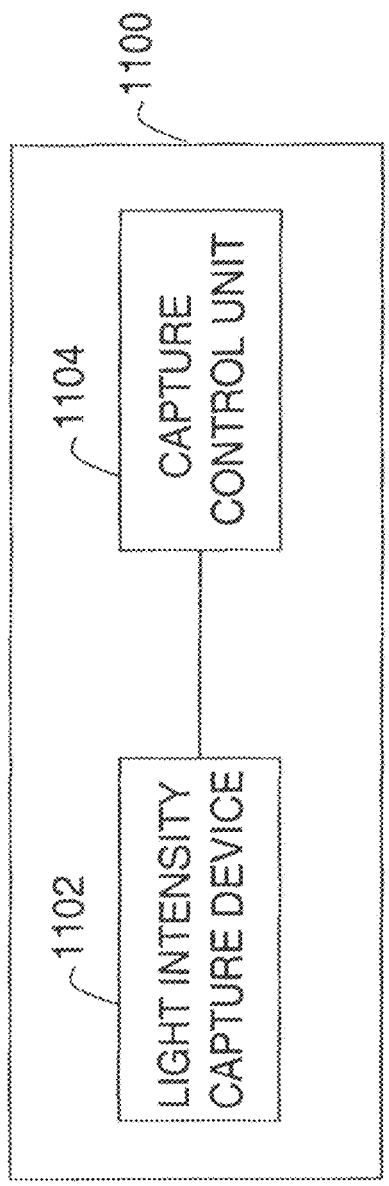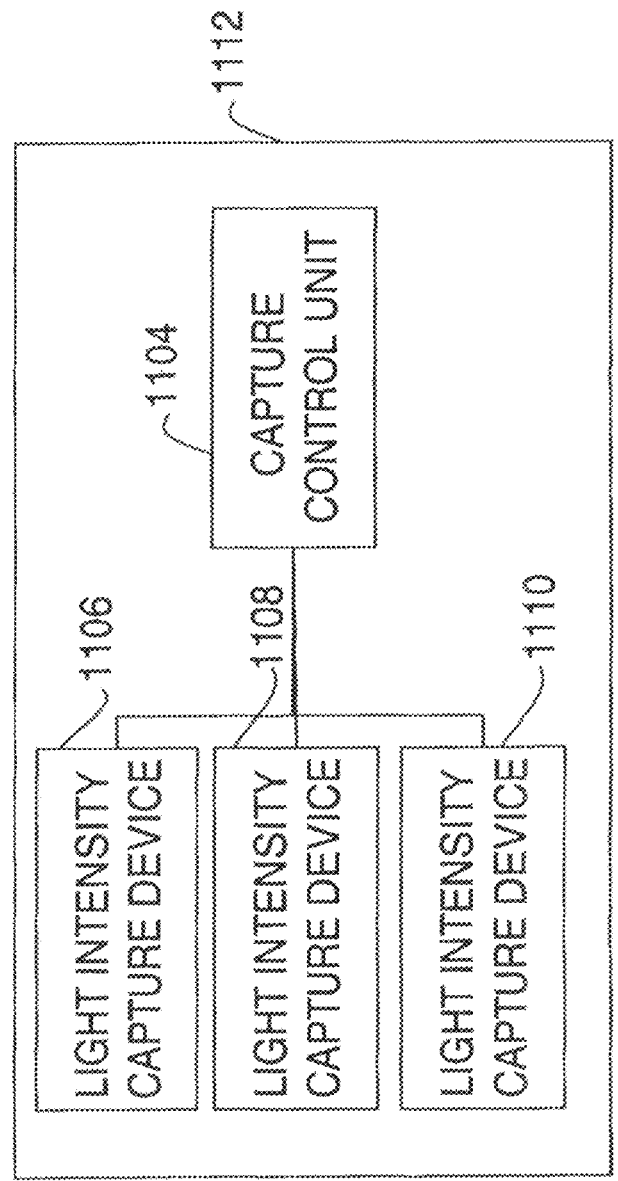

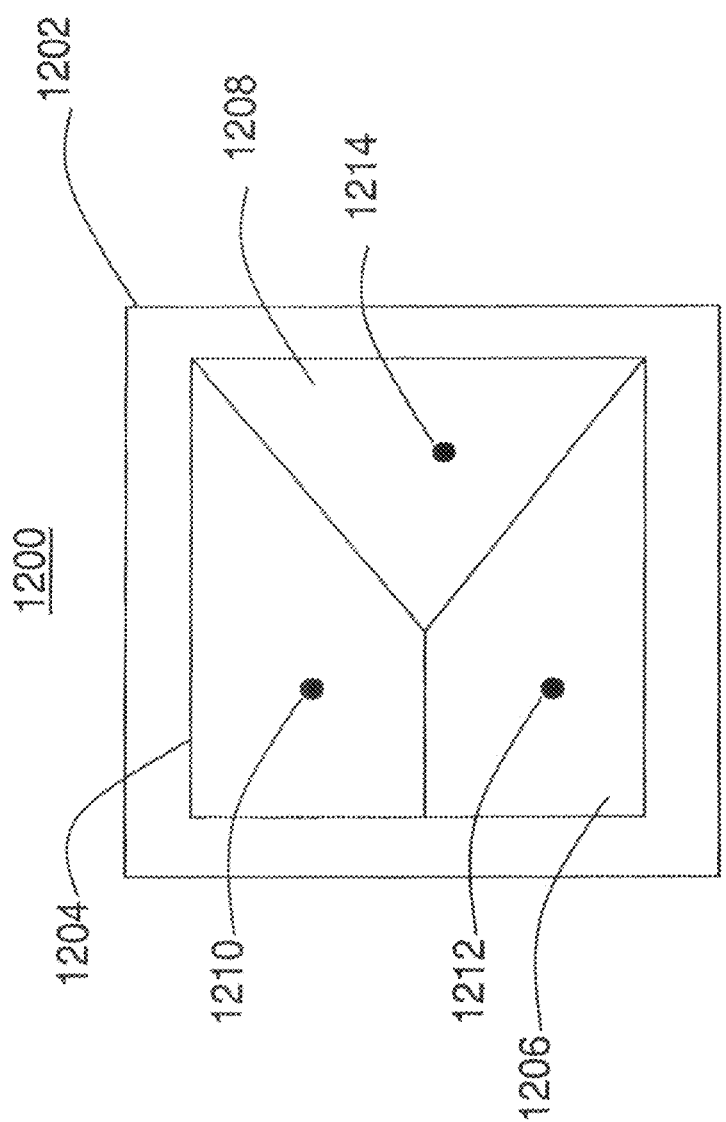

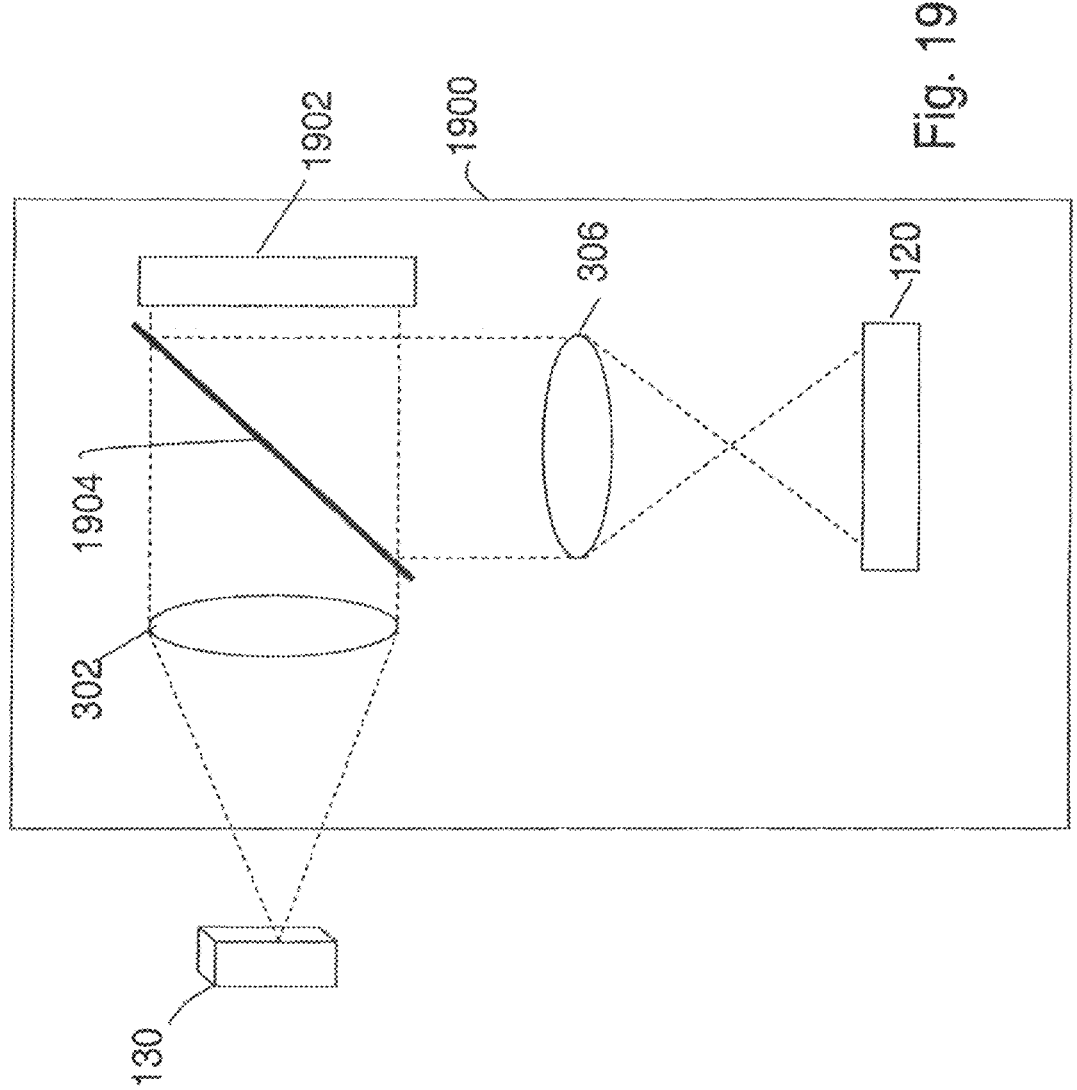

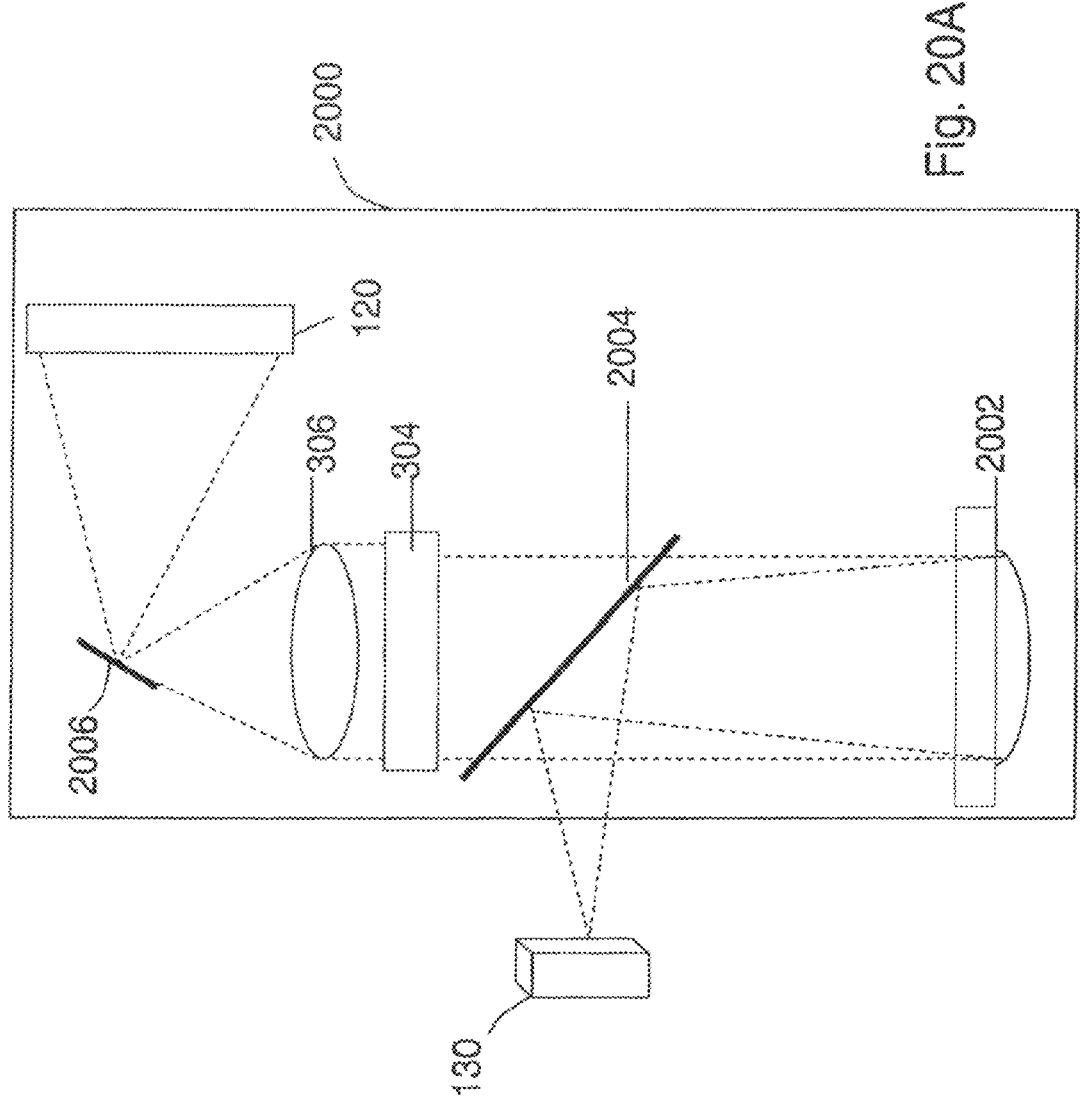

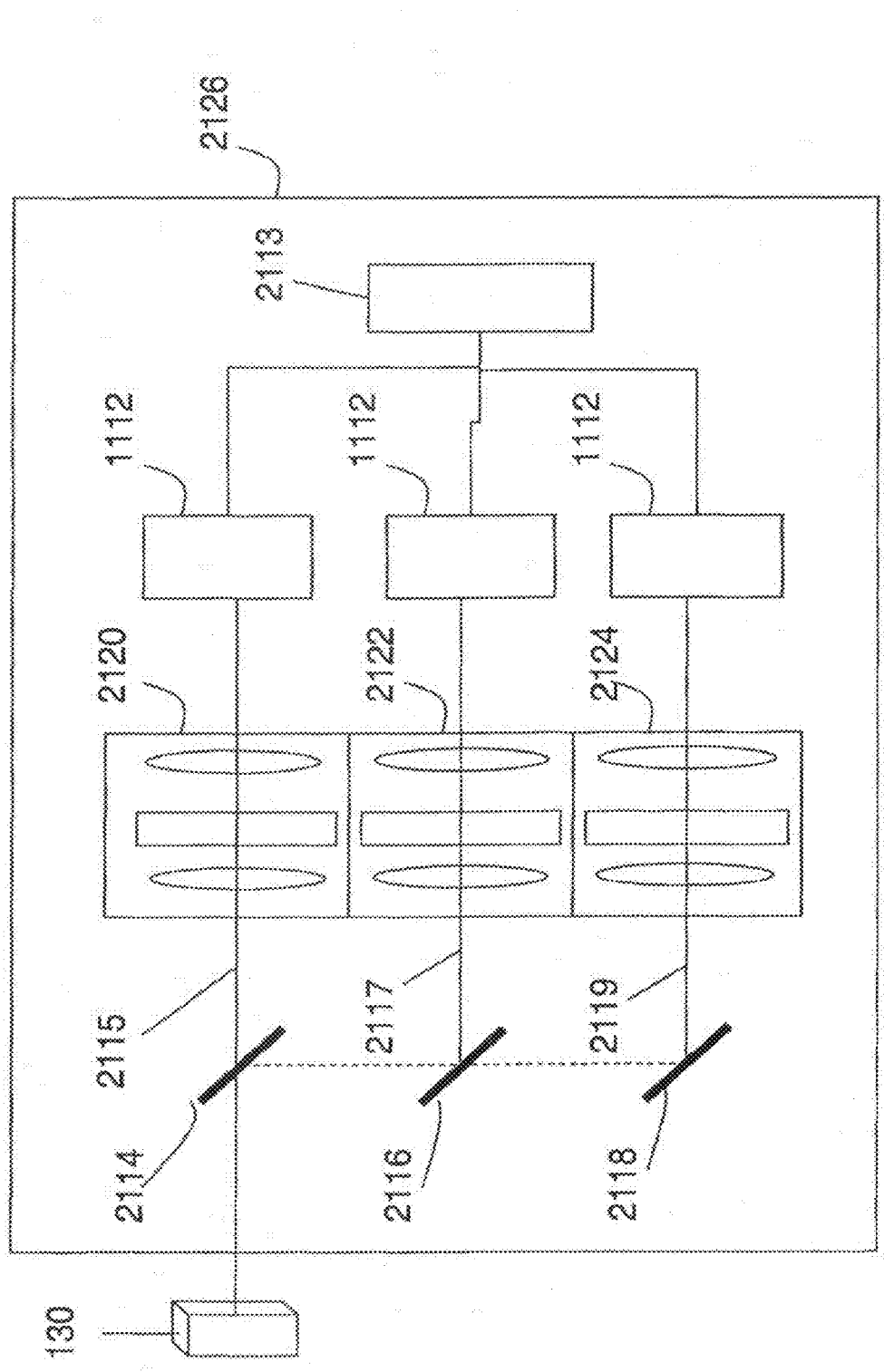

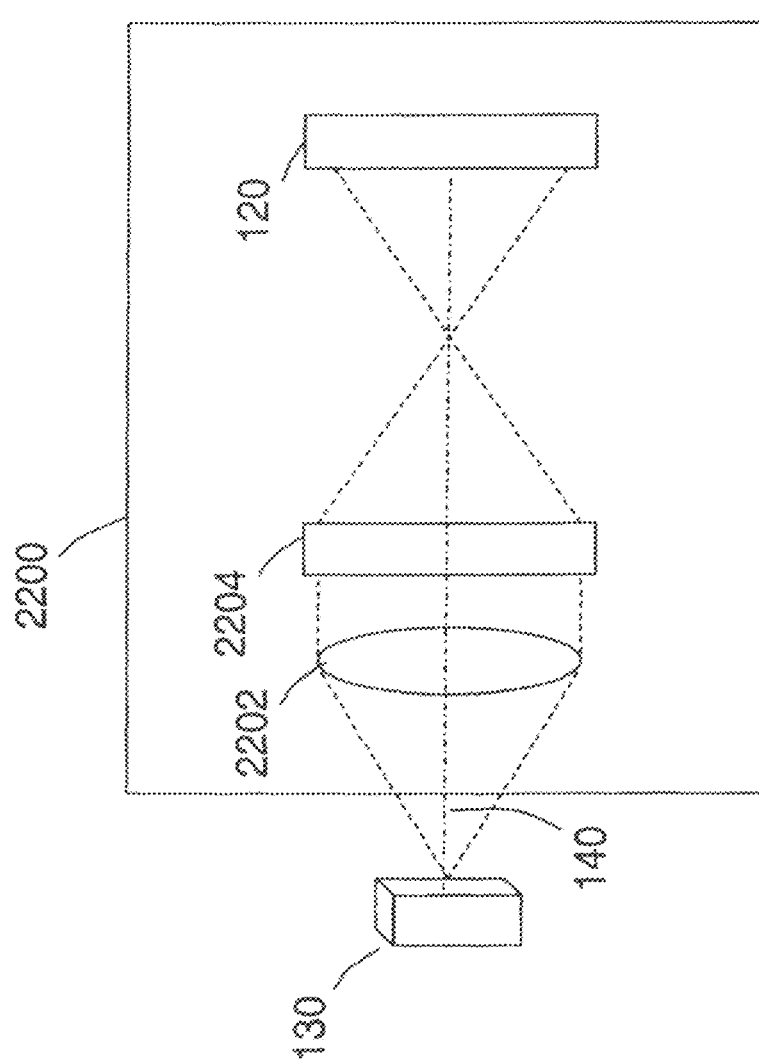

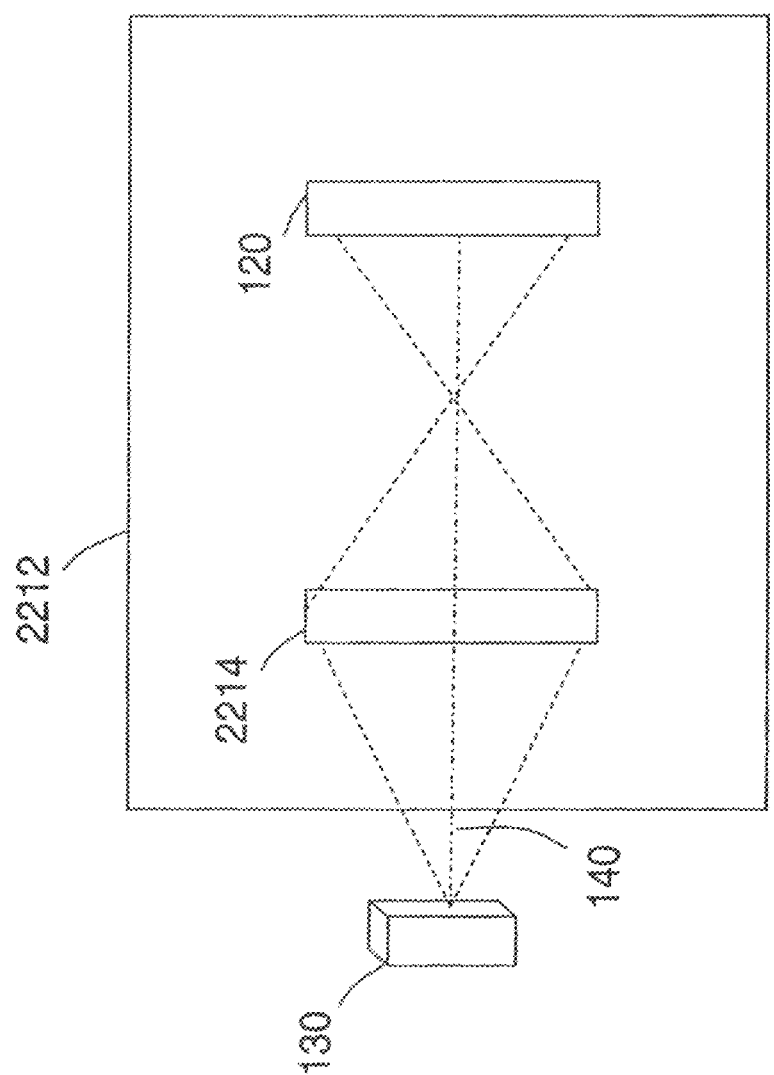

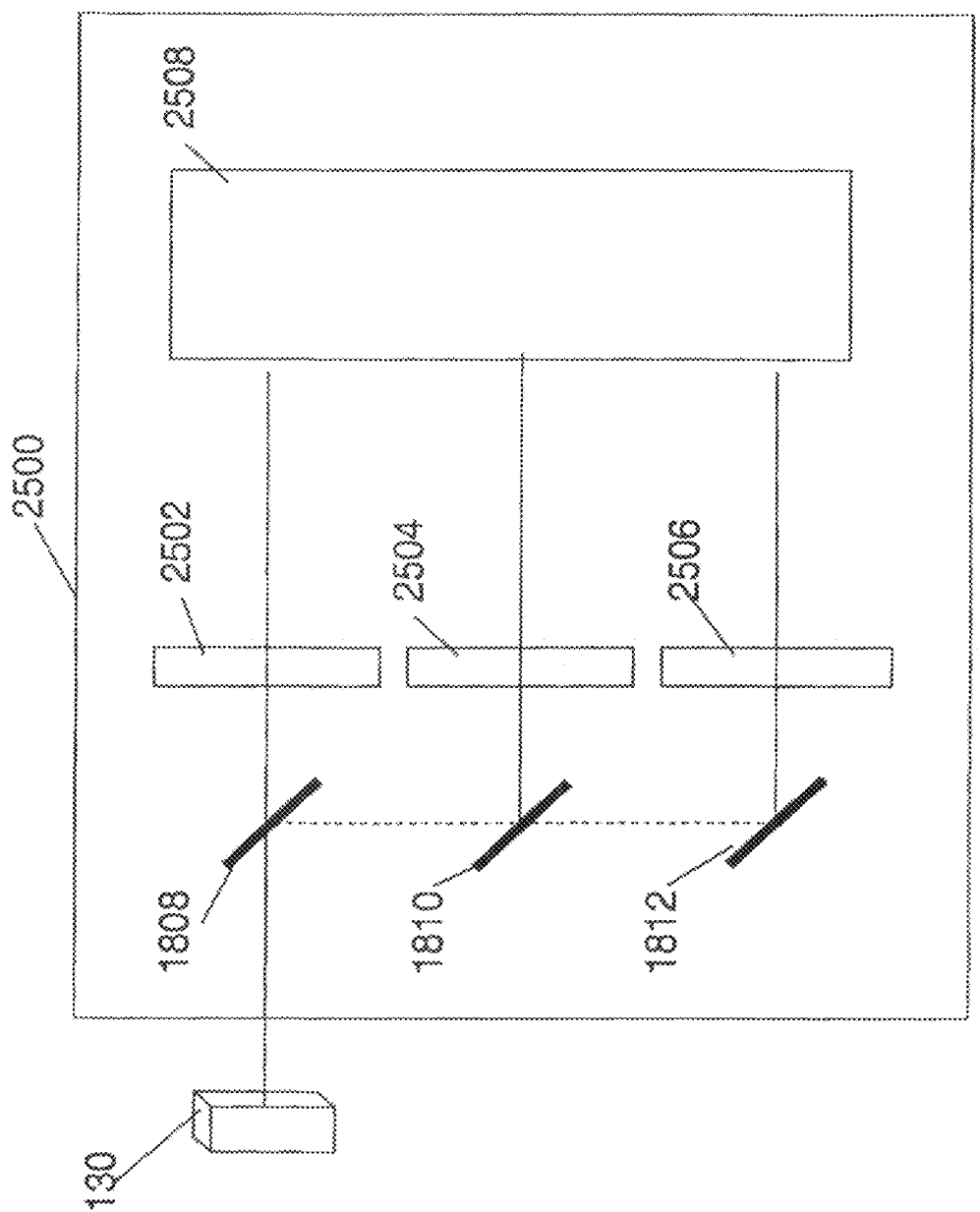

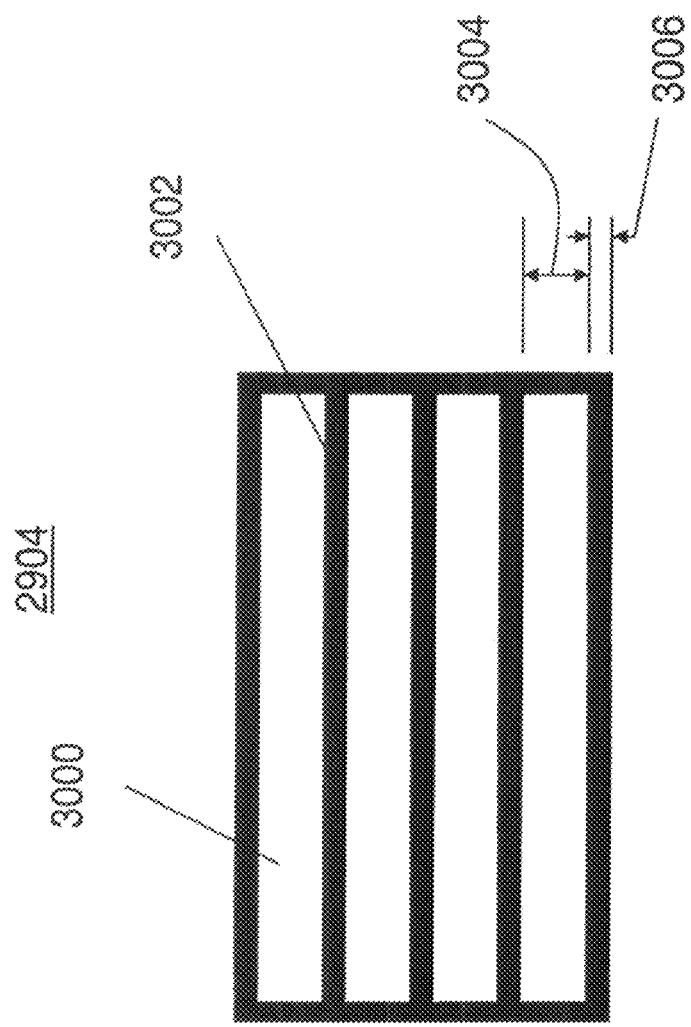

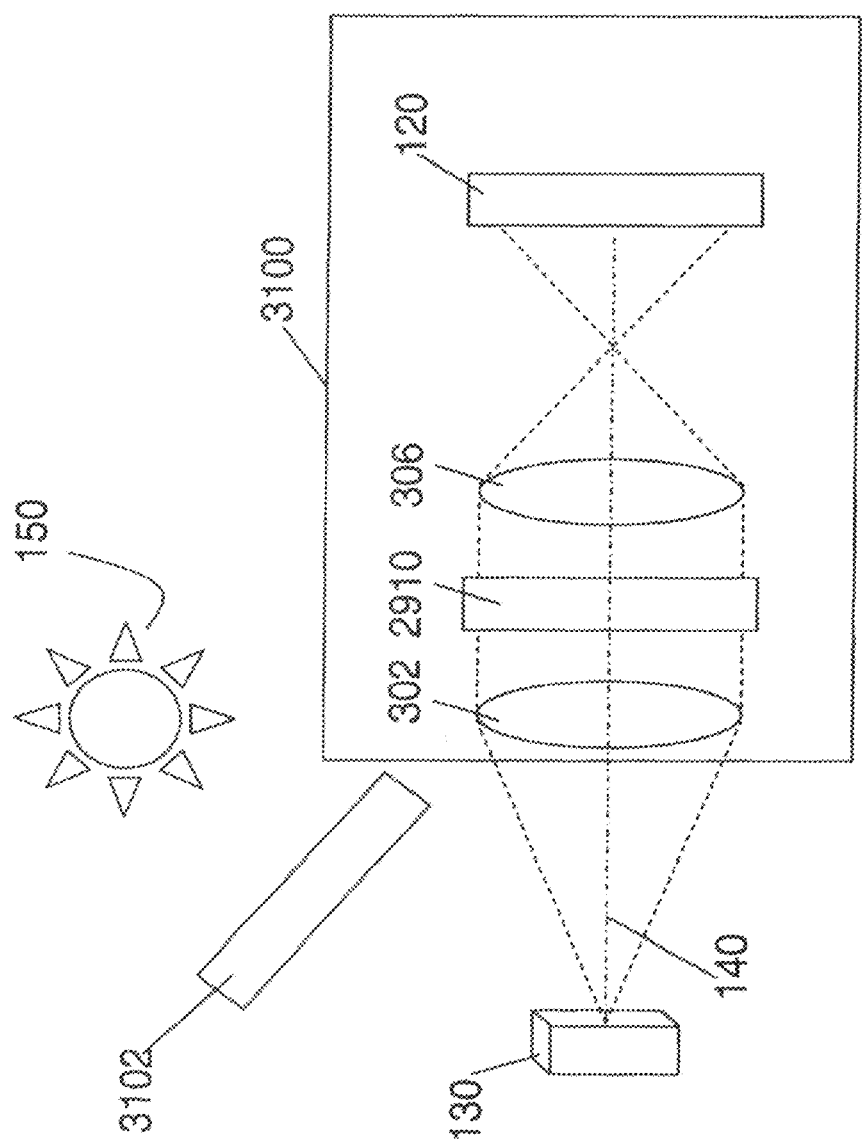

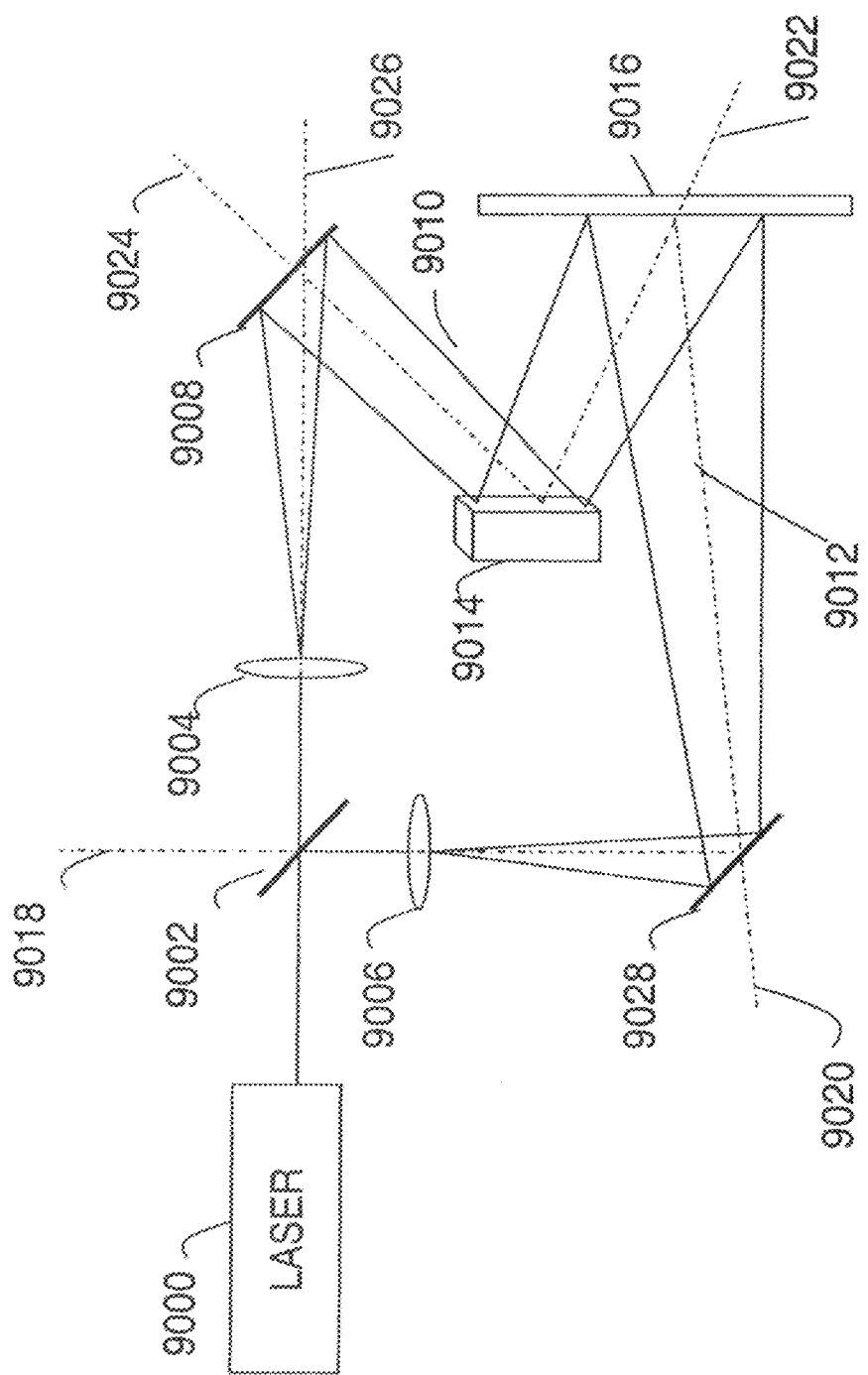

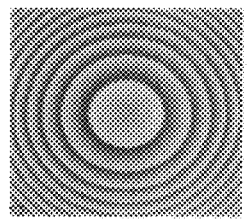
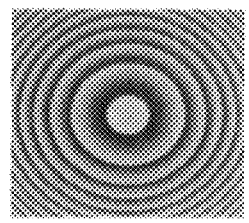
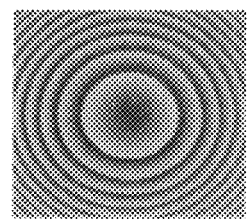
Fig.34A    Fig.34B    Fig.34C
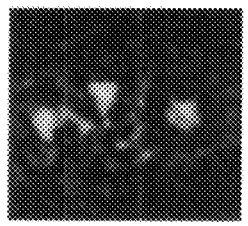
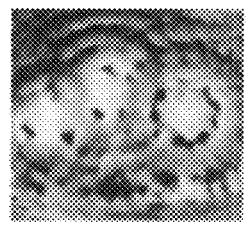
Fig.34D    Fig.34E    Fig.34F
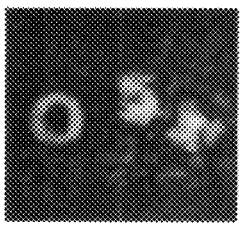
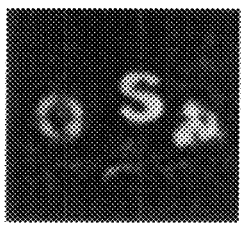
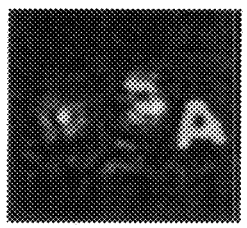
Fig.34G    Fig.34H    Fig.34I

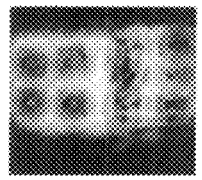 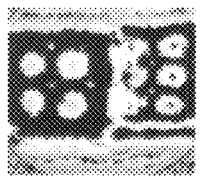 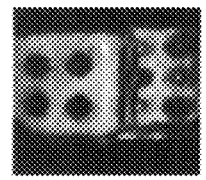 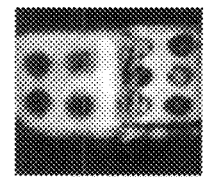
Fig.36A    Fig.36B    Fig.36C    Fig.36D
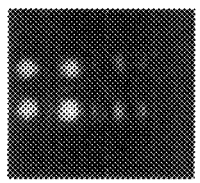 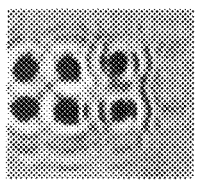 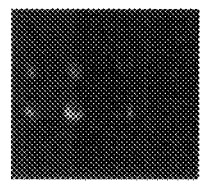 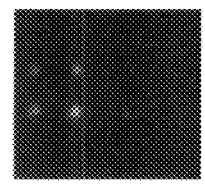
Fig.36E    Fig.36F    Fig.36G    Fig.36H
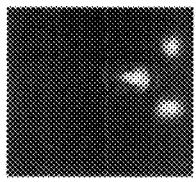 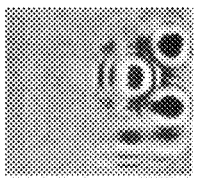 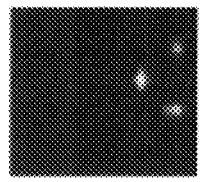 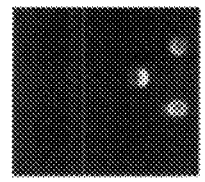
Fig.36I    Fig.36J    Fig.36K    Fig.36L
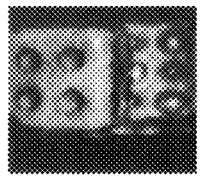 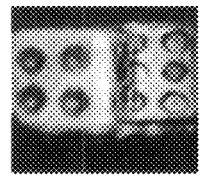
Fig.36M    Fig.36N

SYSTEM, APPARATUS AND METHOD FOR EXTRACTING THREE-DIMENSIONAL INFORMATION OF AN OBJECT FROM RECEIVED ELECTROMAGNETIC RADIATION

CROSS REFERENCE TO RELATED APPLICATIONS

This application is a continuation of U.S. patent application Ser. No. 14/727,342, filed Jun. 1, 2015 which is a continuation of U.S. patent application Ser. No. 13/970,103, filed Aug. 19, 2013 (now abandoned), which is a continuation of U.S. patent application Ser. No. 12/515,343, filed Feb. 18, 2010 (now U.S. Pat. No. 8,542,421, issued Sep. 24, 2013), which is a national stage of PCT/US07/85094, filed Nov. 19, 2007, and claims the benefit of priority under 35 U.S.C. §119(e) of U.S. Patent Provisional Application No. 60/869,022, filed Dec. 7, 2006, and U.S. Patent Provisional Application No. 60/866,358, filed Nov. 17, 2006. The contents of these applications are incorporated herein by reference in their entirety.

BACKGROUND OF THE INVENTION

Field of the Invention

This invention relates to an apparatus for capturing electromagnetic radiation, such as light or other forms of electromagnetic radiation, from an object and extracting object geometric information from the received radiation, in the field of three-dimensional imaging and holography. The invention also relates to a system and method of performing those functions.

Discussion of the Background

Conventional techniques for capturing three-dimensional information from physical objects include holography, range-finding, and tomography. However, conventional techniques may disadvantageously require an active illumination source, or place limitations on a light source (e.g., may require coherent light, a point light source or a bandwidth limited light), place limitations on movement of the object or the sensing apparatus (e.g., require that the object and sensing device be stationary, or require that they be moved in a predetermined fashion), may require complex electromagnetic radiation assemblies (e.g., complex arrangement of mirrors and lenses), and may produce poor quality three-dimensional images having low resolution or low fidelity.

SUMMARY OF THE INVENTION

Accordingly, one object of this invention is to provide an apparatus configured to produce a hologram of an object, said apparatus comprising: an electromagnetic radiation assembly configured to receive a received electromagnetic radiation from the object, diffract the received electromagnetic radiation, and transmit a diffracted electromagnetic radiation; and an image capture assembly configured to capture an image of the diffracted electromagnetic radiation, and produce the hologram of the object from the captured image.

Another object of this invention is to provide a novel apparatus, wherein the electromagnetic radiation includes light.

Another object of this invention is to provide a novel apparatus, wherein the electromagnetic radiation apparatus includes only one radiation propagation axis and is configured to propagate electromagnetic radiation only along the radiation propagation axis in only one direction.

Another object of this invention is to provide a novel apparatus, wherein the electromagnetic radiation assembly includes plural electromagnetic radiation elements each having an axis of symmetry arranged along a same straight line.

Another object of this invention is to provide a novel apparatus, wherein the electromagnetic radiation assembly includes plural electromagnetic radiation elements each having a geometric center arranged along a same straight line.

Another object of this invention is to provide a novel apparatus, wherein the electromagnetic radiation received from the object and the electromagnetic radiation diffracted by the electromagnetic radiation assembly have a same radiation propagation axis.

Another object of this invention is to provide a novel apparatus, wherein the electromagnetic radiation received from the object includes incoherent light.

Another object of this invention is to provide a novel apparatus, wherein the electromagnetic radiation received from the object is produced by the object.

Another object of this invention is to provide a novel apparatus, wherein the electromagnetic radiation received from the object does not interfere with an electromagnetic radiation that is not received from the object to produce the hologram of the object.

Another object of this invention is to provide a novel apparatus, wherein the object and the apparatus are configured to remain stationary during the capture of the image.

Another object of this invention is to provide a novel apparatus, wherein each portion of the electromagnetic apparatus is configured to remain stationary during the capture of the image.

Another object of this invention is to provide a novel apparatus, wherein at least one of the object or the apparatus is configured to be in motion during the capture of the image.

Another object of this invention is to provide a novel apparatus, wherein the hologram is produced from a single captured image.

Another object of this invention is to provide a novel apparatus, wherein the hologram is produced from plural captured images.

Another object of this invention is to provide a novel apparatus, wherein the hologram includes a Fresnel hologram.

Another object of this invention is to provide a novel apparatus, wherein the hologram includes an image hologram.

Another object of this invention is to provide a novel apparatus, wherein a phase and intensity of the diffracted electromagnetic radiation is described by a convolution of the received electromagnetic radiation and a Fresnel Zone Plate.

Another object of this invention is to provide a novel apparatus, wherein the hologram includes geometric information of the object, and the geometric information includes, for each electromagnetic radiation radiating surface of the object, (i) a range distance between the electromagnetic radiation radiating surface of the object and the electromagnetic radiation assembly, (ii) a horizontal offset distance of the electromagnetic radiation radiating surface of the object, and (iii) a vertical offset distance of the electromagnetic radiation radiating surface of the object.

Another object of this invention is to provide a novel apparatus, wherein the electromagnetic radiation assembly is configured to transmit the electromagnetic radiation including a convolution of the received electromagnetic radiation and a complex transmission function including a linear summation of a first transformed pattern, a second transformed pattern and a third transformed pattern, the first transformed pattern including a first shifted concentric ring pattern, the second transformed pattern including a second shifted concentric ring pattern, and the third transformed pattern including a third shifted concentric ring pattern.

Another object of this invention is to provide a novel apparatus, wherein each of the first, second and third shifted concentric ring patterns are shifted away from one another in a same plane of the electromagnetic radiation assembly.

Another object of this invention is to provide a novel apparatus, wherein each of the first, second and third shifted concentric ring patterns includes a Fresnel Zone Pattern or a portion of a Fresnel Zone Pattern.

Another object of this invention is to provide a novel apparatus, wherein the portion of the Fresnel Zone Pattern includes a Fresnel Zone Pattern having one or more rings removed, one or more extra rings added, one or more rings having a varied width, or one or more rings having a portion of the ring removed.

Another object of this invention is to provide a novel apparatus, wherein a phase of the Fresnel Zone Pattern or the portion of the Fresnel Zone Pattern in each of the first, second and third shifted concentric ring pattern is different.

Another object of this invention is to provide a novel apparatus, wherein a predetermined thickness and coefficients of absorption or reflectance of the electromagnetic radiation assembly is configured to control the phase and intensity of the diffracted light.

Another object of this invention is to provide a novel apparatus, wherein the electromagnetic radiation assembly is configured to control at least one of the phase or intensity of the transmitted electromagnetic radiation by varying a thickness of a material through which electromagnetic radiation passes.

Another object of this invention is to provide a novel apparatus, wherein the electromagnetic radiation assembly further comprises: a first electromagnetic radiation assembly configured to receive the received electromagnetic radiation from the object and transmit a first transformed electromagnetic radiation; a complex mask assembly configured to receive the first transformed electromagnetic radiation from the first electromagnetic radiation assembly, and transmit a complex masked electromagnetic radiation according to a complex transmission function; and a second electromagnetic radiation assembly configured to receive the complex masked electromagnetic radiation from the mask assembly, and transmit a second transformed electromagnetic radiation as the diffracted electromagnetic radiation.

Another object of this invention is to provide a novel apparatus, wherein the complex mask assembly further comprises: a mask controller configured to vary the complex transmission function of the electromagnetic radiation assembly over time, said mask controller configured to vary the complex transmission function to be based on a Fourier transform of a first Fresnel Zone Pattern at a first time, a Fourier transform of a second Fresnel Zone Pattern at a second time, and a Fourier transform of a third Fresnel Zone Pattern at a third time.

Another object of this invention is to provide a novel apparatus, wherein the image capture assembly further comprises: a timing controller configured to capture a first partial image at the first time, a second partial image at the second time, and a third partial image at the third time; and a summing unit configured to produce the hologram as a sum of the first partial image captured at the first time, the second partial image captured at the second time, and the third partial image captured at the third time.

Another object of this invention is to provide a novel apparatus, further comprising: an electromagnetic radiation separating assembly configured to separate the electromagnetic radiation received from the object into three object electromagnetic radiation portions each including a different frequency range; said first electromagnetic radiation assembly including three first electromagnetic radiation subassemblies each configured to receive one of the three object electromagnetic radiation portions, and respectively transmit first, second and third portions of the first transformed electromagnetic radiation; said mask assembly including first, second and third mask subassemblies respectively configured to receive the first, second and third portions of the first transformed electromagnetic radiation, and respectively transmit first, second and third complex mask transformed electromagnetic radiation; and said second electromagnetic radiation assembly including three second electromagnetic radiation subassemblies respectively configured to receive first, second and third complex mask transformed electromagnetic radiation, and respectively transmit first, second and third portions of transmitted electromagnetic radiation.

Another object of this invention is to provide a novel apparatus, wherein the first mask subassembly is configured to transmit the first complex mask transformed electromagnetic radiation based on a Fourier transform of a first Fresnel Zone Pattern, the second mask subassembly is configured to transmit the second complex mask transformed electromagnetic radiation based on a Fourier transform of a second Fresnel Zone Pattern, and the third mask subassembly is configured to transmit the third complex mask transformed electromagnetic radiation based on a Fourier transform of a third Fresnel Zone Pattern.

Another object of this invention is to provide a novel apparatus, wherein the image capture assembly includes at least one of a CCD, a CMOS light sensitive device, another electronic camera, a light sensitive emulsion, or another photosensitive device.

Another object of this invention is to provide a novel apparatus, wherein the electromagnetic radiation assembly consists of i) one diffractive electromagnetic radiation element and ii) one converging lens or mirror.

Another object of this invention is to provide a novel apparatus, wherein the electromagnetic radiation assembly consists of i) one diffractive electromagnetic radiation element and ii) two converging lenses or two mirrors.

Another object of this invention is to provide a novel apparatus, further comprising: an objective assembly arranged between the object and the electromagnetic radiation assembly and configured to collimate, focus, invert or modify the electromagnetic radiation from the object, prior to the received electromagnetic radiation being received at the electromagnetic radiation assembly.

Another object of this invention is to provide a novel apparatus, wherein the objective assembly includes at least one of an objective lens, a zoom lens, a macro lens, a microscope, a telescope, a prism, a filter, a monochromatic filter, a dichroic filter, a complex objective lens, a wide-angle lens, a camera, a pin-hole, a light slit, or a mirror.

Another object of this invention is to provide a novel apparatus, wherein the electromagnetic radiation apparatus includes a diffractive electromagnetic radiation element or two lenses configured to produce an off-axis Fresnel Zone pattern when the two lenses are illuminated by a coherent light.

Another object of this invention is to provide a novel apparatus, wherein the two lenses are arranged in a same plane perpendicular to an radiation propagation axis of the received electromagnetic radiation and the two lenses have different focal lengths.

Another object of this invention is to provide a novel apparatus, wherein the two lenses are arranged in different planes perpendicular to an radiation propagation axis of the received electromagnetic radiation.

Another object of this invention is to provide a novel apparatus, wherein the electromagnetic radiation includes at least one of an x-ray radiation, a microwave radiation, an infrared light, a radio frequency signal or an ultraviolet light.

Another object of this invention is to provide a novel apparatus, wherein the electromagnetic radiation assembly and the image capture assembly do not include any reflective electromagnetic radiation elements.

Another object of this invention is to provide a novel apparatus configured to produce a hologram of an object, said apparatus comprising: an electromagnetic radiation assembly configured to receive a received electromagnetic radiation from the object along a radiation axis in an electromagnetic radiation receiving direction, transmit a transmitted electromagnetic radiation along the radiation axis in the electromagnetic radiation receiving direction, and interfere a first portion of the transmitted electromagnetic radiation with a second portion of the transmitted electromagnetic radiation the transmitted electromagnetic radiation; and an image capture assembly configured to capture an image of the transmitted electromagnetic radiation transmitted along the optical axis in the electromagnetic radiation receiving direction, and produce the hologram of the object from the captured image, wherein the radiation axis is a straight line.

Another object of this invention is to provide a novel apparatus configured to produce a hologram of an object, said apparatus comprising: an electromagnetic radiation assembly configured to receive a received electromagnetic radiation from the object and transmit a transmitted electromagnetic radiation based on the received electromagnetic radiation, the transmitted electromagnetic radiation including the hologram of the object; and an image capture assembly configured to capture an image of the transmitted electromagnetic radiation and produce the hologram of the object from the captured image.

Another object of this invention is to provide a novel apparatus configured to produce a hologram of an object, said apparatus comprising: an electromagnetic radiation assembly configured to receive a received electromagnetic radiation from the object, transmit a transmitted electromagnetic radiation based on the received electromagnetic radiation, and interfere a first portion of the transmitted electromagnetic radiation with a second portion of the transmitted electromagnetic radiation; and an opaque image capture assembly configured to capture an image of the transmitted electromagnetic radiation produced by the interference of at least the first and second portions of the transmitted electromagnetic radiation, and produce the hologram of the object from the captured image, wherein a center of the electromagnetic radiation assembly and a center of the image capture assembly are arranged along a same straight line.

Another object of this invention is to provide a novel apparatus configured to produce a hologram of an object, said apparatus comprising: an electromagnetic radiation assembly consisting of one diffractive electromagnetic radiation element and configured to receive a received electromagnetic radiation from the object and transmit a transmitted electromagnetic radiation based on the received electromagnetic radiation; and an image capture assembly configured to capture an image of the transmitted electromagnetic radiation, and produce the hologram of the object from the captured image.

Another object of this invention is to provide a novel apparatus configured to produce a hologram of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of a function representing an intensity distribution of the received electromagnetic radiation and a concentric ring function; and an image capture assembly configured to capture an image of the transmitted electromagnetic radiation, and produce the hologram of the object from the captured image.

Another object of this invention is to provide a novel apparatus configured to produce a hologram of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of i) an intensity distribution of the received electromagnetic radiation and ii) a function having regions of positive slope and negative slope when evaluated between a center of the optical assembly and an outer edge of the optical assembly; and an image capture assembly configured to capture an image of the transmitted electromagnetic radiation, and produce the hologram of the object from the captured image.

Another object of this invention is to provide a novel apparatus configured to produce a hologram of an object, said apparatus comprising: an electromagnetic radiation assembly configured to convolve i) a received electromagnetic radiation received from the object and ii) a curve having plural inflection points between a center of the optical assembly and an edge of the optical assembly, and transmit the convolved electromagnetic radiation; and an image capture assembly configured to capture an image of the convolved electromagnetic radiation, and produce the hologram of the object from the captured image.

Another object of this invention is to provide a novel apparatus configured to produce a hologram of an object, said apparatus comprising: an electromagnetic radiation assembly configured to receive a received electromagnetic radiation from the object, perform a transformation of the received electromagnetic radiation, and transmit the transformed received electromagnetic radiation, the transformation including a convolution of i) an intensity distribution of the received electromagnetic radiation and ii) a transformation function that is a linear combination of three partial transformation functions, each including a concentric ring pattern; and an image capture assembly configured to capture an image of the transmitted electromagnetic radiation, and produce the hologram of the object from the captured image.

Another object of this invention is to provide a novel apparatus configured to produce a hologram of a chemiluminescent object, said apparatus comprising: an electromagnetic radiation assembly configured to receive a received chemiluminescent radiation from the object, and transmit a transmitted electromagnetic radiation including the hologram of the object; and an image capture assembly configured to capture an image of the transmitted electromagnetic radiation, and produce the hologram of the object from the captured image.

Another object of this invention is to provide a novel apparatus configured to produce a hologram of an object, said apparatus comprising: an electromagnetic radiation assembly configured to receive a scattered electromagnetic radiation scattered by the object, which scatters a source electromagnetic radiation, and transmit a transmitted electromagnetic radiation based on the received scattered electromagnetic radiation, the transmitted electromagnetic radiation being independent of any source electromagnetic radiation that is not scattered by the object; and an image capture assembly configured to capture an image of the transmitted electromagnetic radiation and produce the hologram of the object from the captured image.

Another object of this invention is to provide a novel apparatus configured to produce a hologram of an object, said apparatus comprising: an electromagnetic radiation assembly configured to diffract an electromagnetic radiation received from the object; and an image capture assembly configured to capture an image of the diffracted electromagnetic radiation and produce the hologram of the object from the captured image.

Another object of this invention is to provide a novel apparatus configured to produce a hologram of an object, said apparatus comprising: plural electromagnetic radiation sources configured to radiate the object with plural electromagnetic radiation signals; an electromagnetic radiation assembly configured to receive a received electromagnetic radiation from the object and transform the received electromagnetic radiation, the received electromagnetic radiation including portions of the plural source electromagnetic radiation signals scattered by the object; and a capture assembly configured to capture an image of the transformed electromagnetic radiation and produce the hologram of the object from the captured image.

Another object of this invention is to provide a novel apparatus configured to produce a hologram of a fluorescent object, said apparatus comprising: an electromagnetic radiation assembly configured to receive a received fluorescent radiation from the object and transmit a transmitted electromagnetic radiation based on the received fluorescent radiation; and an image capture assembly configured to capture an image of the transmitted electromagnetic radiation and produce the hologram of the object from the captured image.

Another object of this invention is to provide a novel apparatus configured to produce a hologram of a black body radiation radiating object, said apparatus comprising: an electromagnetic radiation assembly configured to receive a received black body electromagnetic radiation from the object, and transmit a transmitted electromagnetic radiation based on the received black body electromagnetic radiation from the object; and an image capture assembly configured to capture an image of the transmitted electromagnetic radiation and produce the hologram of the object from the captured image.

Another object of this invention is to provide a novel apparatus configured to produce a hologram of an object, said apparatus comprising: an electromagnetic radiation assembly configured to receive a received electromagnetic radiation from the object, transmit a transmitted electromagnetic radiation based only on the received electromagnetic radiation from the object, and interfere a first portion of the transmitted electromagnetic radiation with a second portion of the transmitted electromagnetic radiation; and an image capture assembly configured to capture a fringe pattern produced by the interference of at least the first and second portions of the transmitted electromagnetic radiation and produce the hologram of the object from the fringe pattern.

Another object of this invention is to provide a novel electromagnetic radiation apparatus configured to produce a hologram of an object, said apparatus configured to receive a received electromagnetic radiation from the object, diffract the received electromagnetic radiation, and transmit a diffracted electromagnetic radiation including the hologram of the object.

Another object of this invention is to provide a novel apparatus configured to produce a hologram of a scene, said apparatus comprising: an electromagnetic radiation assembly configured to receive a received electromagnetic radiation from the scene, diffract the received electromagnetic radiation, and transmit a diffracted electromagnetic radiation; and an image capture assembly configured to capture an image of the diffracted electromagnetic radiation, and produce the hologram of the scene from the captured image.

Another object of this invention is to provide a novel apparatus configured to produce a hologram of an object, said apparatus comprising: an electromagnetic radiation assembly configured to receive a received electromagnetic radiation from the object, transform the received electromagnetic radiation, and transmit the transformed electromagnetic radiation including a fringe pattern; and an image capture assembly configured to capture an image of the fringe pattern and produce the hologram of the scene from the captured fringe pattern.

Another object of this invention is to provide a novel apparatus configured to produce a hologram of an object, said apparatus comprising: an electromagnetic radiation assembly configured to receive a received electromagnetic radiation from the object and transform the received electromagnetic radiation; and an image capture assembly configured to capture the transformed electromagnetic radiation including the hologram of the object, said hologram includes fringe patterns produced by an interference of the received electromagnetic radiation with itself, and said hologram not including fringe patterns produced by an interference of the received electromagnetic radiation with any other electromagnetic radiation.

Another object of this invention is to provide a novel method for producing a hologram of an object, said method comprising steps of: receiving a received electromagnetic radiation from the object; transmitting a diffracted electromagnetic radiation based on the received electromagnetic radiation; capturing an image of the diffracted electromagnetic radiation; and producing the hologram of the object from the captured image.

Another object of this invention is to provide a novel apparatus, wherein the received electromagnetic radiation does not include coherent light.

A new method of recording digital holograms under incoherent illumination reflects light from a three-dimensional (3-D) object, propagates through a diffractive optical element (DOE) and is recorded by a digital camera. Three holograms are recorded sequentially each for a different phase factor of the DOE. The three holograms are superposed in the computer such that the result is a complex valued Fresnel hologram. When this hologram is reconstructed in the computer, the 3-D properties of the object are revealed.

Another new imaging method records multicolor digital holograms from objects emitting fluorescent light. The fluorescent light specific to the emission wavelength of various fluorescent dyes after excitation of three dimensional (3-D)

objects is recorded on a digital monochrome camera after reflection from a diffractive optical element (DOE). For each wavelength of fluorescent emission, the camera sequentially records three holograms reflected from the DOE, each with a different phase factor of the DOE's function. The three holograms are superposed in a computer to create a complex valued Fresnel hologram of each fluorescent emission. The holograms for each fluorescent color are further combined in a computer to produce a multicolored fluorescence hologram and 3-D color image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is a detailed front view of an embodiment of a mask that includes a DOE having an array of plural transform regions;

FIG. 5B is a cross-section view of a symmetrically arranged volume modulated diffractive optical element structure;

FIG. 5C is a cross-section view of a volume modulated diffractive optical element structure;

FIG. 6A is a detailed front view of another embodiment of a mask that includes a DOE having an array of plural transform regions;

FIG. 6F is a block diagram of an embodiment of a mask including SLMs;

FIG. 6G is a block diagram of another embodiment of a mask including SLMs;

FIG. 11A is a block diagram of an embodiment of an image capture assembly;

FIG. 11B is a block diagram of another embodiment of an image capture assembly;

FIG. 12A is a view of an embodiment of a light intensity capture device that includes a charge coupled device having three distinct regions;

FIG. 19 is a block diagram of another embodiment of an optical apparatus;

FIG. 20A is a block diagram of an embodiment of an optical apparatus having a first transforming optical assembly including a reflective optical assembly;

FIG. 21B is a block diagram of another embodiment of an optical apparatus;

FIG. 22A is a block diagram of an example of an optical apparatus that does not require a second transforming optical element;

FIG. 22C is a block diagram of an example of an optical apparatus that does not require first and second transforming optical elements;

FIG. 25 is a block diagram of another embodiment of an optical apparatus;

FIG. 30 is a detailed view of an embodiment of a grating having low and high transmissivity regions;

FIG. 31A is a block diagram of an embodiment of an optical apparatus that may be used with a lined transparency or grating;

FIG. 32 is a block diagram of a conventional holographic system;

FIG. 34A shows a phase distribution of the reflection masks displayed on the SLM with $\theta=0°$;

FIG. 34B shows a phase distribution of the reflection masks displayed on the SLM with $\theta=120°$;

FIG. 34C shows a phase distribution of the reflection masks displayed on the SLM with $\theta=240°$;

FIG. 34D shows an enlarged portion of the reflection mask in FIG. 34A indicating that half of the SLM's pixels (randomly chosen) modulate light with constant phase;

FIG. 34E shows an enlarged portion of the reflection mask in FIG. 34A indicating that half of the SLM's pixels (randomly chosen) modulate light with constant magnitude;

FIG. 34F shows an enlarged portion of the reflection mask in FIG. 34A indicating that half of the SLM's pixels (randomly chosen) modulate light with phase of the final on-axis digital hologram;

FIG. 34G shows a reconstruction of the hologram of the three letters at the best focus distance of 'O';

FIG. 34H shows a reconstruction of the hologram of the three letters at the best focus distance of 'S';

FIG. 34I shows a reconstruction of the hologram of the three letters at the best focus distance of 'A';

FIG. 36A shows magnitude of a complex Fresnel hologram of the dice;

FIG. 36B shows phase of a complex Fresnel hologram of the dice;

FIG. 36C shows a digital reconstruction of a non-fluorescence hologram at the face of the red-dots on the die;

FIG. 36D shows a digital reconstruction of a non-fluorescence hologram at the face of the green dots on the die;

FIG. 36E shows magnitude of a complex Fresnel hologram of the red dots;

FIG. 36F shows phase of a complex Fresnel hologram of the red dots;

FIG. 36G shows a digital reconstruction of the red fluorescence hologram at the face of the red-dots on the die;

FIG. 36H shows a digital reconstruction of the red fluorescence hologram at the face of the green dots on the die;

FIG. 36I shows magnitude of a complex Fresnel hologram of the green dots;

FIG. 36J shows phase of the complex Fresnel hologram of the green dots;

FIG. 36K shows a digital reconstruction of a green fluorescence hologram at the face of the red-dots on the die;

FIG. 36L shows a digital reconstruction of a green fluorescence hologram at the face of the green dots on the die;

FIG. 36M shows a composition of the digital reconstructions in FIGS. 36C, 36G, and 36K; and FIG. 36N shows a composition of the digital reconstructions in FIGS. 36D, 36H, and 36L.

DETAILED DESCRIPTION OF THE PREFERRED EMBODIMENTS

Figure 1:
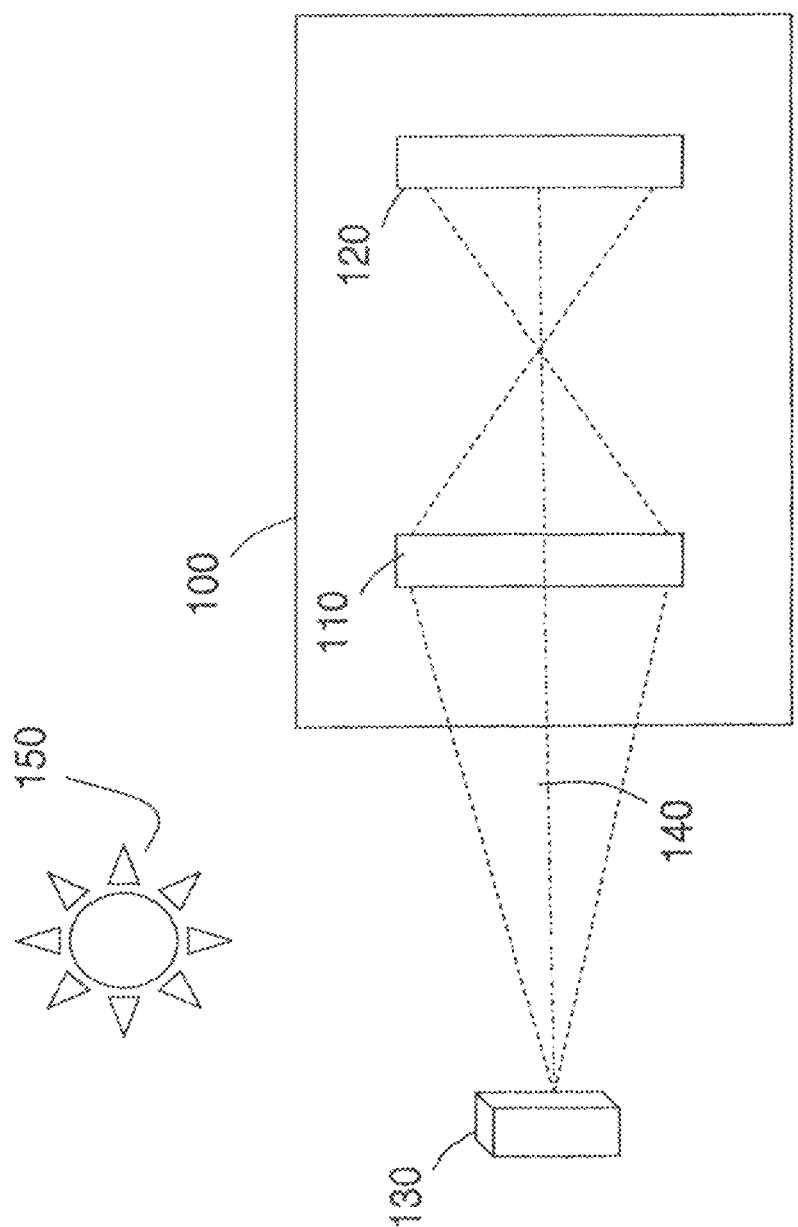
FIG. 1 is a block diagram of an optical apparatus according to an embodiment of the present invention.

Conventional holographic techniques may include methods of capturing a hologram of an object by capturing an interference pattern that results when a first portion of a coherent laser light beam (e.g., reference beam) interferes with a second portion of the laser light beam reflected off the object (e.g., object beam). A three-dimensional image of the object may be viewed by appropriately illuminating the recorded interference pattern with the reference beam.

FIG. 32 is a block diagram of a conventional holographic system including a laser 9000 that shines a coherent laser light beam along a first optical axis 9026 through a partially reflective and transmissive mirror, such as a beam splitter 9002. A first portion of the split laser beam is guided by lens 9004 and mirror 9008 to illuminate the object 9014 with the object beam 9010 along a second optical axis 9024. A second portion of the split laser beam is reflected by the beamsplitter 9002 along a third optical axis 9018 and guided by lens 9006 and mirror 9028 to direct a reference beam 9012 along a fourth optical axis 9020 to an image capture device 9016 such as a photographic plate, a charge coupled device (CCD) or a complementary metal oxide semiconductor sensor (CMOS). The reference beam 9012 and the object beam 9010 reflected from the object 9014 along a fifth optical axis 9022 interfere with each other, producing an interference pattern that may be recorded as a hologram on the image capture device 9016.

Conventional holography solutions that produce a hologram by interfering two parts of a light source along different optical paths or optical axes may be very sensitive to any change in alignment of the optical paths or axes, because even minor changes in the length or direction of the optical paths or axes will change the phase relationship of the portions of light that interfere. Such a change will result in a change to the resulting interference pattern and hologram, and yield a distorted resulting image.

For example, in the holography system of FIG. 32, a factor such as motion, vibration, component deterioration or distortion, or thermal expansion, may cause a slight change in the length or direction of one or more of the first, second, third, fourth or fifth optical axes 9026, 9024, 9018, 9020 and 9022, respectively. Even a slight change in one of the axes may cause a corresponding change in the phase relationship of the reference beam 9012 and the light reflected from the object 9014 along the fifth optical axis 9010, thereby causing a significant change in the resulting interference pattern and hologram captured at the image capture device 9016.

Such a sensitivity to axial variation in conventional holographic systems may result in reduced resolution in the resulting three-dimensional information.

Various conventional attempts to address such a sensitivity to axial variation have had limited success. For example, attempts have included using massive platforms and shock absorbers to dampen vibration, high tolerance mechanical optical stages to reduce positioning errors, and optical and structural materials having reduced coefficients of thermal expansion to reduce thermal expansion effects. However, these attempts generally increase the cost, size and mass of conventional holography systems, and reduce system portability and availability.

In addition, conventional holography systems may require an active light source to illuminate the object and produce the reference and object beams. Active solutions that require illumination of the object by a particular light source may limit the applicability and usefulness of the conventional holography systems. For example, an active light source would not be useful in stealth military targeting holographic systems where it would be undesirable for the targeting device to give away its position by producing light or other electromagnetic radiation. Alternatively, an active radiation source would not be applicable in holographic systems that observe objects that produce their own light, such as a holographic system observing chemiluminescent, black body, or infrared illuminating objects. Such a holographic technique may be useful in observing objects such as ships by virtue of their ability to block the chemiluminescence of background emissions in certain bodies of water, such as the chemiluminescent Red Sea.

In addition, conventional holographic systems that rely on a coherent light source, such as a monochromatic laser, may be unable to capture color information from the object unless multiline lasers or multiple lasers of different wavelengths are used. Systems such as those are likely to be very complex. Further, such systems may not be suitable for capturing three-dimensional information regarding objects that should not be illuminated with laser light (e.g., sensitive biological material).

Conventional holographic techniques using incoherent light to illuminate an object rely on a simplifying assumption that incoherent source objects may be considered to be composed of many individual light source points, each of which is self coherent, and each of which can therefore create an interference pattern with its mirrored image. For the purposes of this document, incoherent light is any temporally or spatially incoherent light for which any two electromagnetic fields emitted from a same location at two different times (in the case of temporal incoherence) or emitted from two different locations at the same time (in the case of spatial incoherence) do not create an interference grating or pattern when the two fields are summed together. Various methods of incoherent holography have been proposed using this principle, such as methods described in A. W. Lohmann, "Wavefront Reconstruction for Incoherent Objects," J. Opt. Soc. Am. 55, 1555-1556 (1964), G. Cochran, "New method of making Fresnel transforms," J. Opt. Soc. Am. 56, 1513-1517 (1966), P. J. Peters, "Incoherent holography with mercury light source," Appl. Phys. Lett. 8, 209-210 (1966), H. R. Worthington, Jr., "Production of holograms with incoherent illumination," J. Opt. Soc. Am. 56, 1397-1398 (1966), A. S. Marathay, "Noncoherent-object hologram: its reconstruction and optical processing," J. Opt. Soc. Am. A 4, 1861-1868 (1987), and G. Sirat, D. Psaltis, "Conoscopic holography," Optics Letters, 10, 4-6 (1985), each of which is incorporated herein by reference.

However, the conventional incoherent holographic techniques may require impractically high levels of light intensity. Thus, conventional incoherent holographic systems require active illumination of objects, and therefore may exhibit the resulting problems and limitations described above.

In addition, conventional incoherent holographic systems may rely on illuminating the object with a bandwidth limited source to reduce sensitivity to length differences in the plural optical path differences. For example, in a conventional incoherent holographic system acceptable variations in the relative length of optical paths may be limited to the inverse of the bandwidth multiplied by the light velocity. Thus, a predetermined light source having a limited bandwidth may be required, and the elimination of extraneous illumination may be necessary in conventional incoherent holographic systems.

Further, conventional incoherent holographic systems may require optical arrangements having plural optical axes similar to the example shown in FIG. 32. Thus, conventional incoherent holographic systems may also be susceptible to variations in direction or length of the optical axes, and attendant problems, as described above.

In addition, conventional holographic techniques involve splitting light into two channels using mirrors, which may have a low transfer efficiency, and then recombining the split light. The efficiency may be particularly low in the recombination where more than 50% of the power gets lost.

Further, in a conventional Fourier hologram, each object point is transformed to a linear grating throughout the entire image plane (e.g., throughout an entire CCD plane). Thus, in conventional incoherent methods of producing Fourier holograms, light from each object point must disadvantageously be intense enough to establish a high contrast grating or pattern over the entire image plane.

Tomographic methods have been proposed to overcome the limitations of conventional holographic techniques described above. Such tomographic methods may involve capturing plural images of an object from different points of view, for example by moving the object, or the camera, or both, in between successive images, and extracting three-dimensional object information by processing the successive images. Conventional tomographic methods are described in Y. Li, D. Abookasis and J. Rosen, "Computer-generated holograms of three-dimensional realistic objects recorded without wave interference," Appl. Opt. 40, 2864-2870 (2001), and Y. Sando, M. Itoh, and T. Yatagai, "Holographic three-dimensional display synthesized from three-dimensional Fourier spectra of real existing objects," Opt. Lett 28, 2518-2520 (2003), each of which is incorporated herein by reference.

Tomographic methods may be slow, however, as they may require plural images to be captured before and after a relative perspective between the object and camera is changed and thus may not be able to capture objects which change during the time it takes to capture the multiple images. Alternatively, tomographic methods may require more expensive or physically large equipment that includes the ability to simultaneously capture images of the object from more than one perspective. Further, the methods may be impractical for distant objects or immovable objects for which it may be difficult to change a relative perspective from the camera. In addition, if the object is moving in an unpredictable way, it may be difficult to extract information from successive images without having another source of information regarding the shape or the movements of the object.

Range-finding methods involve measuring the distance between an apparatus and various points on a surface of an object, and constructing an image or model of the object based on the distances. Further, some range-finding methods may include a predetermined or controlled movement of the object or the apparatus to predictably change the view of the object from the apparatus over time. Thus, the conventional range-finding methods may also include the predictable change in the view of the object to determine an exterior three-dimensional shape of the object. Conventional range-finding methods include systems that illuminate points on an object with a laser, and measuring the amount of time required for the laser light to travel between the object and the laser source to determine a distance to the object based on the travel time. Related methods include "painting" an object with a laser stripe or grid and examining a deformation in the observed grid to determine geometric information of the object.

However, such range-finding methods require active illumination of the object by a coherent laser, and therefore are not suitable for incoherently illuminated objects or for fluorescent or luminescent emitting objects. When coherent light sources can be used, they have the attendant problems and limitations of active illumination and coherent light sources described above. Further, the methods may be difficult to perform if the object is moving in an unpredictable way, or if the object is very close to the laser source.

Other range-finding methods may include using a camera with a lens having a narrow depth of field and a calibrated automatic focusing system. The automatic focus system automatically adjusts the lens to focus on portions of the object, for example, by maximizing contrast in resulting images. Then, a range to the object is determined based on a mechanical position of the calibrated lens. However, such a calibrated focus technique may not be useful for objects having minimal optical contrast, or when objects or the apparatus is in motion. Further, the accuracy of such a system may be limited by the mechanical tolerances of the calibrated lens.

Another conventional method includes extracting an object distance from shadows in an image. For example, a conventional shadow method includes capturing an image of shadows produced when electromagnetic radiation (e.g., x-ray radiation or light) from an object is blocked by a mask with a concentric ring pattern such as a Fresnel Zone Pattern (FZP, a.k.a., Transmission Zone Plate, Zone Plate, Zone Pattern, Fresnel Zone Plate, etc. . . . ) placed between the object and an image plane.

For the purposes of this application, an FZP may be understood to be a two-dimensional pattern of alternating light and dark concentric rings in which a thickness (e.g., radial width) of successive rings is inversely proportional to the distance from the center of the rings. For example, the $n^{th}$ ring of an FZP may transition (i.e., from dark to light or light to dark) at a radius r described by the following equation (or by an approximation thereof):

$$r_n = \sqrt{nf\lambda}$$

where n is an integer, $\lambda$ is the wavelength of the applied light and f is the focal length of the FZP.

When used with scattered point light sources, such as stars, the relative positions of the centers of the shadows in the image may be extracted from the image, and distances to the corresponding point light sources may be calculated from the shadow center locations in the image. Such a method is described in L. Mertz and N. O. Young, "Fresnel transformations of images," in *Proceedings of Conference on Optical Instruments and Techniques*, K. J. Habell, ed. (Chapman and Hall, London 1961) p. 305, incorporated herein by reference.

However, such conventional shadow ranging methods have a limited usefulness for when the captured electromagnetic radiation has a wavelength comparable to the distance between the rings of the FZP, such as visible light. For example, the visible light may be diffracted by the edges of rings in the FZP causing shadows in the image to have poorly defined or smeared edges, thereby making it difficult or impossible to isolate the centers of resulting shadow patterns (e.g., see Mertz and Young at FIG. 2).

Conventional scanning holographic methods involve scanning an object by illuminating a surface of the object with a moving a pattern of Fresnel Zone Plates (FZPs), serially sensing the intensity of reflected or transmitted light from the object (i.e., a one dimensional intensity signal) as the pattern moves across the object, and integrating and processing the serially sensed light intensities to generate three-dimensional information of the object. In particular, a convolution between the object and the moving Fresnel Zone Patterns is used to extract three-dimensional information regarding the object. Conventional scanning holographic methods are described in Poon T.-C., "Three-dimensional image processing and optical scanning holography," ADVANCES IN IMAGING AND ELECTRON PHYSICS 126, 329-350 (2003), and G. Indebetouw, A. El Maghnouji, R. Foster, "Scanning holographic microscopy with transverse resolution exceeding the Rayleigh limit and extended depth of focus," J. Opt. Soc. Am. A 22, 892-898 (2005), each of which is incorporated herein by reference.

However, conventional scanning holographic methods require that a pattern be moved across the object while the location of the object is fixed, thereby limiting the usefulness of the method. Alternatively, the pattern may be fixed and the object moved across the pattern, resulting in similar limitations.

In addition, the scanning process may be a relatively slow process requiring mechanical movements. Thus, scanning is susceptible to problems produced by mechanical deterioration and inaccuracy, such as reduced resolution as described above.

Further, since scanning holographic methods serially capture a one-dimensional light intensity signal from the object and integrate the serial signal to extract three-dimensional information, such systems are highly susceptible to variations in the relative positions of the scanning apparatus and the object over the duration of the scan. For example, if such a system captures a first intensity during a first part of the scan, and a second intensity during a second part of the scan, any variation in the relative positions of the object and the scanning apparatus (or even minor changes in the internal arrangement of elements of the scanning apparatus) may adversely introduce variations into the captured second intensity, thereby reducing an accuracy, resolution and usefulness of the system.

In addition, scanning holographic systems are generally large and complex therefore they may not be suitable for applications requiring portability or low cost. Further, conventional scanning holographic systems may require an object to be illuminated by an interference pattern produced by interfering laser light, may include a very slow recording process that could take several minutes or more for each object capture, and the recording process may disadvantageously require significant mechanical movement of recording device components and/or the object during the recording process.

Holograms recorded by incoherent light open many new applications like outdoor and astronomical holography (J. B. Breckinridge, "Two-Dimensional White Light Coherence Interferometer," Appl. Opt. 13, 2760 (1974)) and fluorescence holographic microscopy (G. Indebetouw, A. El Maghnouji, R. Foster, "Scanning holographic microscopy with transverse resolution exceeding the Rayleigh limit and extended depth of focus," J. Opt. Soc. Am. A 22, 892-898 (2005)). The oldest methods of recording incoherent holograms have made use of the property that every incoherent object is composed of many source points each of which is self spatial coherent and therefore can create an interference pattern with light coming from the point's mirrored image. Under this general principle there are various types (J. B. Breckinridge, "Two-Dimensional White Light Coherence Interferometer," Appl. Opt. 13, 2760 (1974)) (A. W. Lohmann, "Wavefront Reconstruction for Incoherent Objects," J. Opt. Soc. Am. 55, 1555-1556 (1965)) (G. Sirat, D. Psaltis, "Conoscopic holography," Optics Letters, 10, 4-6 (1985)) of holograms including Fourier (J. B. Breckinridge, "Two-Dimensional White Light Coherence Interferometer," Appl. Opt. 13, 2760 (1974)) (G. W. Stroke and R. C. Restrick, "Holography with Spatially Incoherent Light," Appl. Phys. Lett. 7, 229 (1965)) and Fresnel holograms (G. Cochran, "New method of making Fresnel transforms," J. Opt. Soc. Am. 56, 1513-1517 (1966)) (P. J. Peters, "Incoherent holography with mercury light source," Appl. Phys. Lett. 8, 209-210 (1966)). The process of beam interfering demands high levels of light intensity, extreme stability of the optical setup and relatively narrow bandwidth light source. These limitations have prevented holograms from becoming widely used for many practical applications.

More recently two groups of researchers have proposed to compute holograms of 3-D incoherently illuminated objects from a set of images taken from different points of view. (Y. Li, D. Abookasis and J. Rosen, "Computer-generated holograms of three-dimensional realistic objects recorded without wave interference," Appl. Opt. 40, 2864-2870 (2001)) (Y. Sando, M. Itoh, and T. Yatagai, "Holographic three-dimensional display synthesized from three-dimensional Fourier spectra of real existing objects," Opt. Lett 28, 2518-2520 (2003)) This method, although it shows promising prospects, is relatively slow since it is based on capturing tens of images of the scene images from different view angles.

Another method is called scanning holography (G. Indebetouw, A. El Maghnouji, R. Foster, "Scanning holographic microscopy with transverse resolution exceeding the Rayleigh limit and extended depth of focus," J. Opt. Soc. Am. A 22, 892-898 (2005)) (Poon T.-C., "Three-dimensional image processing and optical scanning holography," Adv. in Imag. & Elec. Phys. 126, 329-350 (2003)) in which a pattern of Fresnel Zone Plate (FZP) scans the object such that at each and every scanning position the light intensity is integrated by a point detector. The overall process yields a Fresnel hologram obtained as a convolution between the object and FZP patterns. However the scanning process is relatively slow and is done by mechanical movements. A similar convolution is actually done also in the present work; however, unlike the case of scanning holography, we propose here a convolution without movement.

Mertz and Young (L. Mertz and N. O. Young, "Fresnel transformations of images," in *Proceedings of Conference on Optical Instruments and Techniques*, K. J. Habell, ed. (Chapman and Hall, London 1961) p. 305) already proposed holographic photography based on convolution without movement between object and FZPs. However, their process relies on geometrical optics, which cannot yield good imaging results in the optical regime. On the contrary, our suggested correlator for implementing the holographic recording is valid in the optical regime, since its operation principle is based on the diffraction theory (J. Goodman, Introduction to Fourier Optics, $2^{nd}$ ed., McGraw-Hill, New York, 1996, pp. 63-95 (Chapter 4).

Referring now to the drawings, wherein like reference numerals designate identical or corresponding parts throughout the several views.

FIG. 1 is a block diagram of an optical apparatus 100 according to a first embodiment of the present invention. The optical apparatus 100 is configured to capture a three-dimensional information of an object 130, and the optical apparatus 100 includes an optical assembly 110 and an image capture assembly 120. In particular, the optical assembly 110 receives light from the object 130 along a receiving optical axis 140. For example, the optical assembly may receive light from the sun 150 that is reflected or scattered by reflecting surfaces on the object 130. The received light may be polychromatic and incoherent light, such as reflected sunlight, or may also include monochromatic light or coherent light. In addition, the light from the object may be fluorescent light or chemiluminescent light emitted by the object. The optical apparatus 100, in this embodiment, does not illuminate the object but passively receives light from the object.

The optical assembly 110 transforms the received light according to a transformation described below, and transmits the transformed light along the receiving optical axis 140. The image capture assembly 120 receives the transformed light from the optical assembly 110, and captures a two-dimensional intensity image of the transformed light. The captured two-dimensional intensity image includes three-dimensional or geometric information regarding the portions of the object 130 from which light is received at the optical assembly 110. The three-dimensional or geometric information is encoded in the captured two-dimensional intensity image as a Fresnel hologram. In other words, a hologram, as discussed in this specification, is a two-dimensional image that encodes three-dimensional information. In addition, the present invention also applies to capturing a volume hologram, which is a three-dimensional intensity image that encodes three-dimensional or geometric information of an object. The image capture assembly 120 may extract the three-dimensional information from the captured image. The image capture assembly may be an opaque light capturing device. An opaque device is understood to mean a device that is not transparent or translucent to electromagnetic radiation of relevant frequencies and intensities, and therefore such a device does not allow such electromagnetic radiation to pass through.

A Fresnel hologram is a real positive light intensity distribution that encodes a complex valued wave-front distribution, including three-dimensional information regarding the light scattering surface of the object. Further, in a Fresnel hologram, each point on the object is encoded into a portion of a sinusoidal Fresnel zone plate with an entire range of spatial frequency components present, as noted by Goodman, "Introduction to Fourier Optics," 3rd Ed., Roberts & Company Publishers, 2005, incorporated herein by reference. Thus, a three-dimensional image of the object may be recreated optically, by appropriately illuminating a transparency having the Fresnel hologram, or the three-dimensional image of the object may be recreated by a computer using an electronic image data of the Fresnel hologram. The recreated three-dimensional image of the object includes three-dimensional information regarding the shape and distance of an observable surface of the object.

The optical apparatus 100 may advantageously capture the three-dimensional object information without moving or being moved (i.e., the spatial relationship between the optical apparatus 100 and the object 130 may remain unchanged from a time before an image is captured to a time after the three-dimensional information is extracted from the captured image by the image capture assembly 120). In addition, the optical apparatus 100 may advantageously capture the three-dimensional object information while one or both of the object and the optical apparatus 100 are in motion.

Moreover, the optical apparatus 100 does not project any pattern on the object, such as is done in a conventional or scanning holographic method. Further, the optical apparatus 100 does not include any parts that are required to move while the light is being received from the object, such as a scanning aperture used in scanning holography. Thus, without parts that move during image capture, the optical apparatus 100 may be less expensive to produce and use, more reliable, quieter, and faster, for example, than an apparatus used for scanning holography. Further, with respect to conventional holographic systems that require active illumination (for example, illumination by a laser), the present invention advantageously has a simpler design that may be applied to more types of imaging.

In addition, the present invention does not require an interference between a light from the illumination (i.e., not scattered by the object) with a light scattered by the object. Instead, the current approach diffracts light scattered by the object, which may be understood as a mutual interference between portions of electromagnetic radiation wavefronts coming from object itself, and is not an interference between such scattered light and another light from the source. Thus, as the mutual interference may be performed by a few collinear electromagnetic elements (e.g., lenses and masks, or DOEs, as described below), or even a single electromagnetic element (e.g., a single DOE, as described below), the relative differences between optical paths of the interfering wavefronts are easily controlled (e.g., all the optical paths pass through the same electromagnetic elements) and therefore, variations between the lengths of the paths may be more easily controlled and minimized.

Further, the optical apparatus 100 may advantageously capture the three-dimensional object information in a single image (e.g., a single exposure).

Moreover, the optical apparatus 100 may advantageously be able to capture images with very low levels of light intensity. Conventional holographic systems may require beam splitters and/or mirrors that may cause some received light to be lost or wasted. On the other hand, the optical apparatus 100 does not require the use of beam splitters or mirrors, and therefore may be able to capture images with low levels of light intensity.

Further, conventional holographic systems may produce Fourier holograms in which each object point contributes to interference fringe patterns that are spread over the entire image plane. Such conventional systems may require greater light intensity than the optical apparatus 100, which translates each object point using a Fresnel Zone Pattern, which may produce fringe patterns for a particular object point in only a portion of the image plane, thereby advantageously allowing for lower light intensities.

In addition, the optical apparatus 100 advantageously receives and transmits light only along a single axis, thereby reducing susceptibility to axial variation and simplifying the design, manufacture and use of the optical apparatus 100.

Further, the optical apparatus 100 is coaxial and self-interfering. In particular, in the present embodiment light from separate light paths is not interfered to produce an interference pattern or hologram. Instead, the hologram is produced by diffraction of light in the optical assembly 110. Although diffraction may be understood as being produced by interference between each portion of a light wavefront (i.e., each point along the wavefront being considered a point source of light according to Huygens wave theory of light), diffraction produced by a single coaxial assembly, as in the present embodiment, is much less sensitive to variations in optical paths between interfering light sources. In particular, light is self-interfered, according to the present embodiment, because the only interference is between light waves passing through various portions of a same optical element (e.g., the optical assembly 110, or the mask 304 in FIG. 3, described below), and it is much easier to minimize path length and angle variations for paths passing through a same optical element, as in the present embodiment, than it is to control path variations between separate optical paths, passing through separate optical elements, along separate optical axes, as in the conventional holography systems. In addition, the optical apparatus 100 may be used to advantageously capture polychromatic incoherent light received from the object. Therefore, a full color three-dimensional image may be recreated from the Fresnel hologram recorded by the apparatus.

Although embodiments within this document are described as transmitting and receiving light, capturing light images and including optical assemblies, the invention is also applicable to other types of electromagnetic radiation. Thus, the invention also includes an electromagnetic radiation apparatus that includes an electromagnetic radiation assembly that receives a received electromagnetic radiation from an object.

Figure 2:
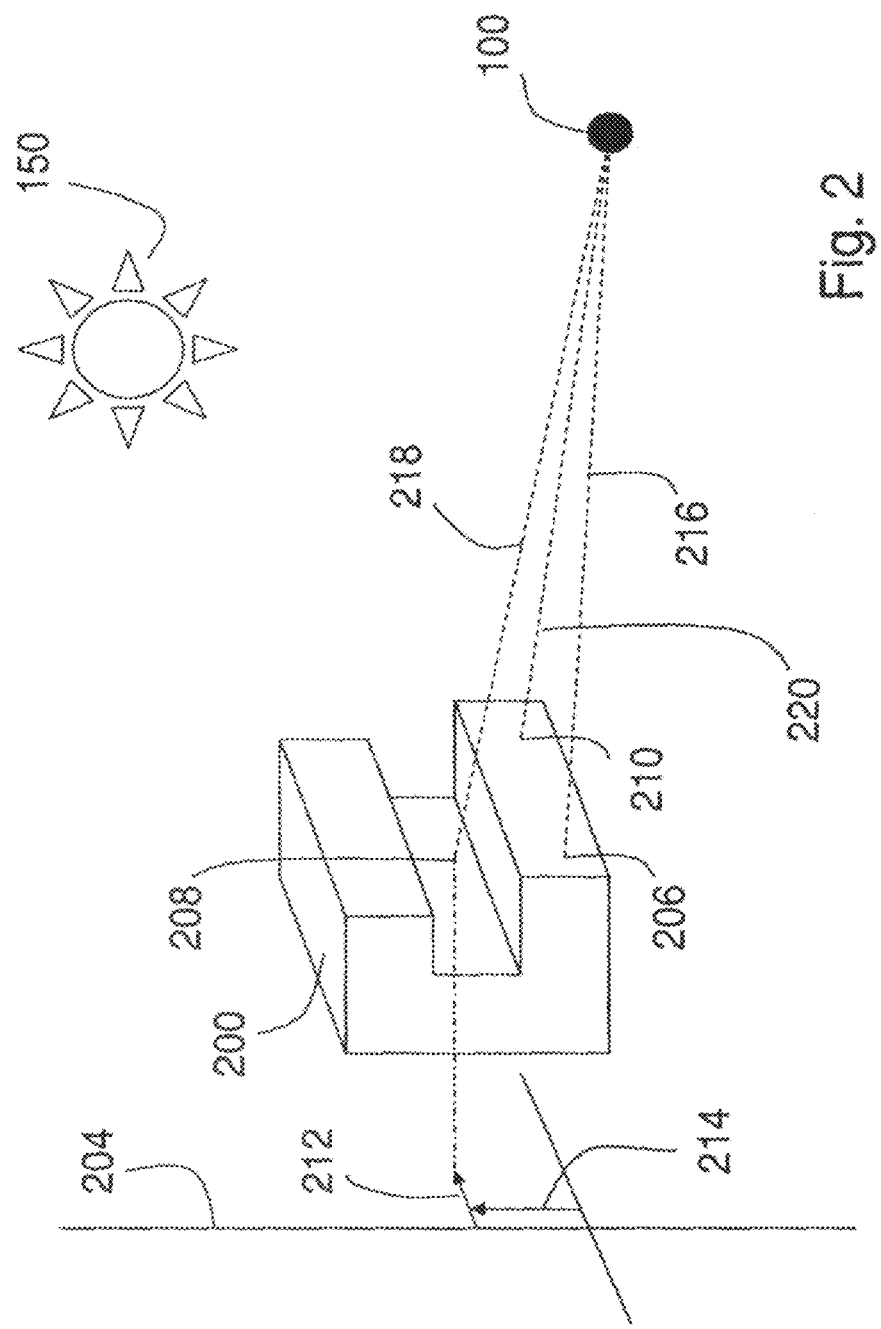
FIG. 2 is a block diagram that illustrates an example of captured geometric information according to embodiments of the present invention.

FIG. 2 is a block diagram that illustrates an example of captured geometric information according to embodiments of the present invention. According to the example of FIG. 2, an object 200 is illuminated by a light source or sources (e.g., the sun 150) causing light to be scattered or reflected by various light radiating portions of the object 200. Three example light radiating portions 206, 208 and 210 scatter light rays 216, 218 and 220, respectively. These example light rays travel towards the optical apparatus 100 (shown in FIG. 2 without the detail of FIG. 1). Light captured by the optical apparatus 100, according to the present invention, includes geometric information regarding the distance between the object and the optical apparatus as well as the shape of observable surfaces of the object 200 from which light is received at the optical apparatus 100. For example, the captured light includes information regarding a distance traveled by the ray of light 218, and in particular, includes the distance between the light radiating portion 208 and the optical apparatus 100. Further, the captured light also includes geometric information regarding a horizontal distance of the light radiating portion 208, for example, a horizontal distance 212 between an edge of the object 200 and the light radiating portion 208. In addition, the captured light also includes geometric information regarding a vertical distance of the light radiating portion 208, for example, a vertical distance 214 between an edge of the object 200 and the light radiating portion 208. In this example, horizontal distance 212 and vertical distance 214 are distances measured in a measurement plane 204 that passes through radiating portion 208.

Thus, an optical apparatus, according to the present embodiment, may be configured to capture a light including geometric information regarding each portion of each object from which the light is received at the optical apparatus. Further, from the geometric information, the size, shape and location of the visible portions of each object may be determined. For example, in FIG. 2, if light is scattered by each external surface of the object 200, and at least a portion of the scattered light is received at the optical apparatus 100, then the apparatus 100 may capture light including geometric information regarding the dimensions (e.g., height, width and depth) of each visible surface of the object 200, as well as information regarding the distance between the object 130 and the front surface of optical apparatus 100.

Although light is scattered by external surfaces in FIG. 2, one of skill in the art will understand that such an optical apparatus is also capable of capturing received light from an internal surface of the object 130 that radiates light to the optical assembly 100 through a translucent or transparent exterior portion of the object 130. In that case, the captured geometric information may include geometric information regarding an interior portion of the object.

The optical assembly 110 includes any optical assembly configured to control a complex amplitude of the transmitted light according to the complex transformation function described below. Thus, for example, optical assembly 110 may include one or more refractive lenses, one or more diffractive optical elements (DOEs), or one or more spatial light modulators (SLMs).

An incoherent correlator in the regime of diffraction theory may include every system that produces a pattern of a Fourier transform of the mask transparency on the system's aperture at an output plane around a point that is linearly related to an input point's location, when the incoherent correlator is illuminated by a single point from some position on the input plane. Thus, the incoherent correlator produces an output image including every point in the input plane.

Figure 3:
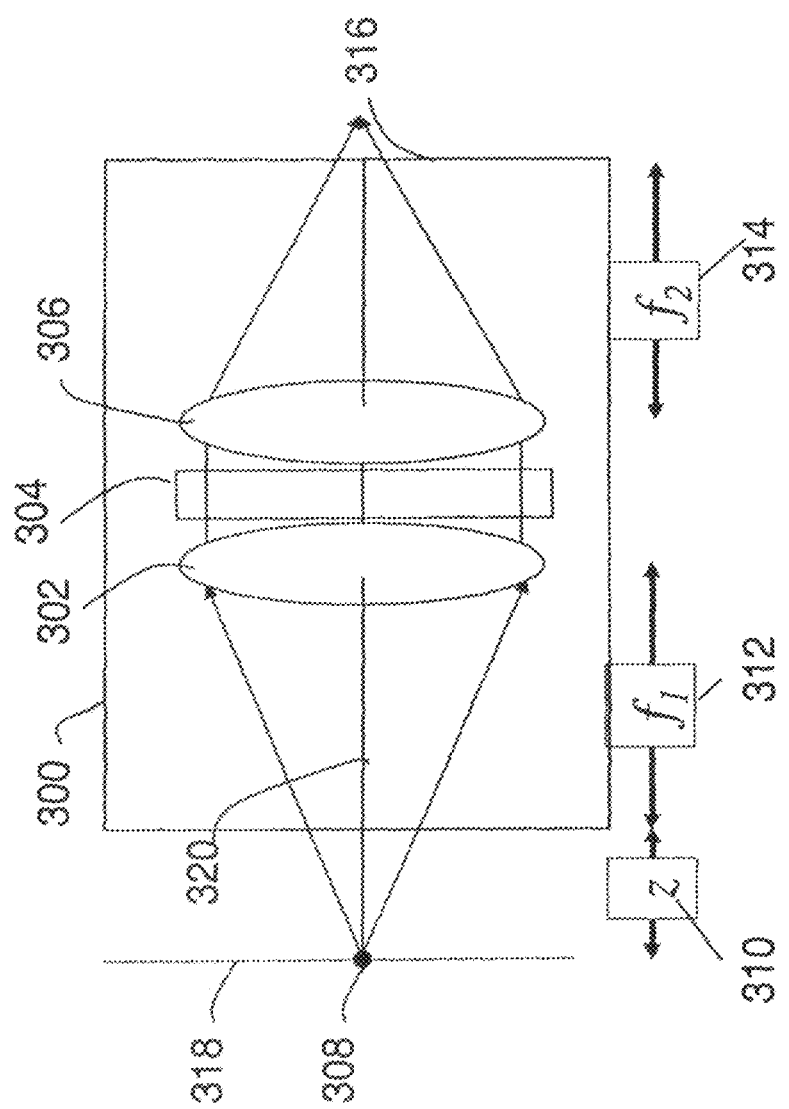
FIG. 3 is a block diagram of an incoherent correlator that may be used as the optical assembly in the optical apparatus of FIG. 1.

FIG. 3 is a block diagram of an incoherent correlator 300 that may be used as the optical assembly 110 in the optical apparatus 100 shown in FIG. 1. The incoherent correlator 300 is an optical assembly that includes a first transforming optical assembly 302, a mask 304 and a second transforming optical assembly 306. Each of the first and second transforming optical assemblies 302/306 include the types of converging lenses that would perform a two-dimensional Fourier transform of received light if they were illuminated by coherent light (though coherent light is not required during the operation of the present invention). When the incoherent correlator 300 is illuminated by a single point light source 308 from some position on a plane 318, the incoherent correlator 300 produces a pattern of a Fourier transform of a mask 304 on an output plane 316. The plane 318 is located along and perpendicular to an optical axis 320 of the incoherent correlator 300, at a distance $(z+f_1)$ from the first transforming optical assembly 302, where $f_1$ is a focal length of the first transforming optical assembly 302 and z is a remaining distance between the point light source 308 and the first transforming optical assembly 302. The output plane is located along and perpendicular to the optical axis 320 at a distance $f_2$ from the second transforming optical assembly 306, where $f_2$. is a focal length of the second transforming optical assembly 306, in a direction away from the plane 318. Note that the Fourier transform of a mask 304 on an output plane 316 is obtained only if z=0. When z≠0 the optical assembly 300 still performs a correlation between the object, but with a different function than the Fourier transform of mask 304. In other words, in the case that z≠0, the output plane 316 will include an output image that is different than a Fourier transform of a mask 304.

Figure 4:
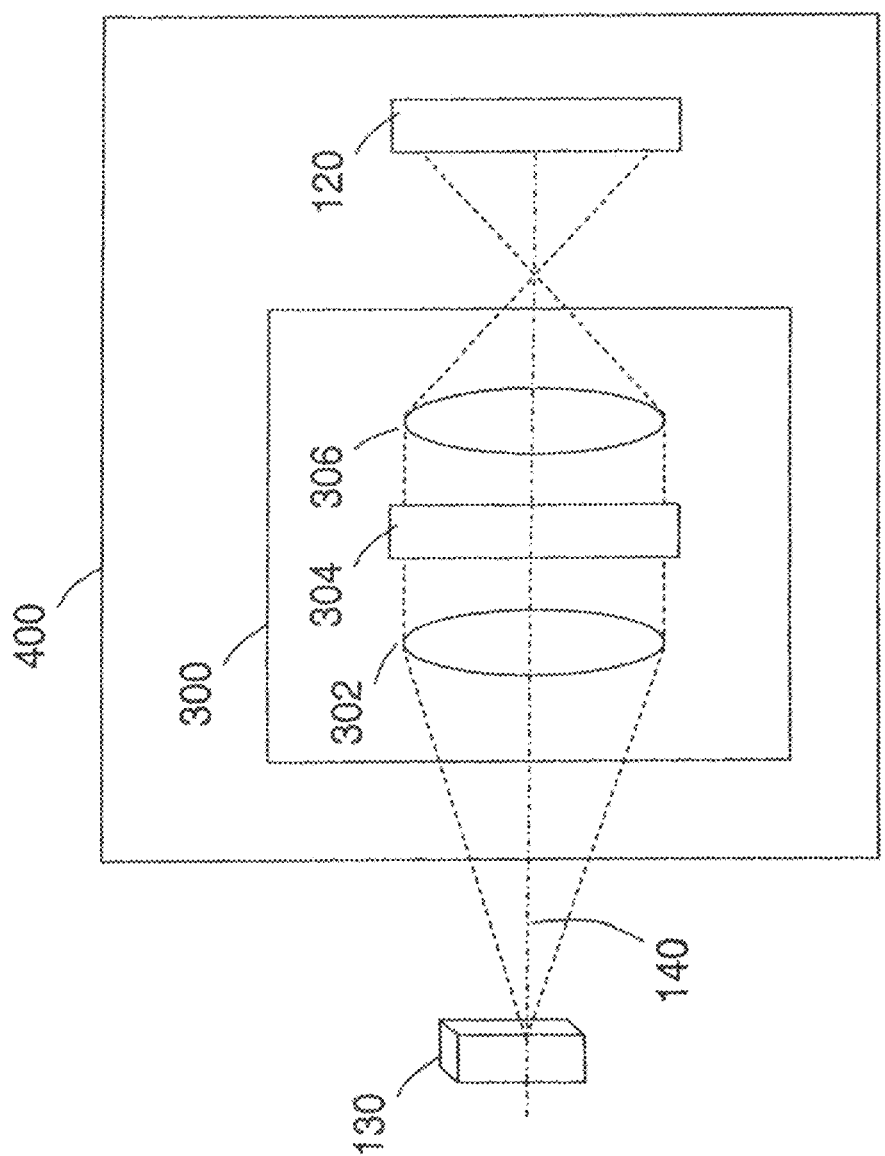
FIG. 4 is a block diagram of an embodiment of an optical apparatus that includes an optical assembly.

FIG. 4 is a block diagram of an embodiment of an optical apparatus 400 that includes an optical assembly 300. Optical apparatus 300 includes a first transforming optical assembly 302, a mask 304 and a second transforming optical assembly 306. Each of the first and second transforming optical assemblies 302/306 are the types of optical assemblies (e.g., converging Fourier lenses) that would perform a two-dimensional Fourier transform operation on a received coherent light (although the use of the apparatus does not require coherent light). Light is received from object 130 at the first transforming optical assembly 302, which transforms the received light and transmits the transformed light. The mask 304 receives the transformed light, varies an amplitude and/or phase of the received coherent transformed light as described below, and transmits a portion of the received light as the masked light. The masked light is received by the second transforming optical assembly 306, which transforms the masked light and transmits a second transformed light. The image capture assembly 120 receives and captures the second transformed light, as described above. Note that when the light received from the object is incoherent, the transformations performed by the first and second transforming optical assemblies 302/306 may not be Fourier transformations. However, the first and second transforming optical assemblies 302/306 are the types of optical assemblies (e.g., converging Fourier lenses) that would produce a Fourier transform of received coherent light or received point source light.

The mask 304 includes any device or structure configured to transform an amplitude and phase of a received light, according to one or more predetermined complex transmission functions. For example, the mask 304 may include one or more diffractive optical elements (DOE), one or more amplitude filters, one or more lenses, and/or one or more SLMs.

FIG. 5A is a detailed front view of an embodiment of mask 304 that includes a DOE having an array of plural transform regions 500-514. Each of the plural transform regions in the diffractive optical element is configured to transform a phase and/or an amplitude of a received light according to the transform equations described below.

The diffractive optical element may include volume-modulated diffractive optical elements that use a variation in the volume of refractive material in each transform region to transform the phase and/or amplitude of the received light and produce transformed transmitted light. In addition, the diffractive optical element may include index-modulated diffractive optical elements that use a variation in a refractive index of refractive material in each transform region to transform the phase and/or amplitude of the received light and produce transformed transmitted light. In addition, the diffractive optical element may include one or more transmission layers of having a predetermined transmissivity to thereby vary an amplitude of the received light. Further, diffractive optical elements that combine one or more features of volume-modulated, index-modulated and transmission layer diffractive optical elements may also be included. Methods of preparing the diffractive optical elements include, for example, conventional methods such as those described in Salmio et al., "Graded-index diffractive structures fabricated by thermal ion exchange," Applied Optics, Vol. 36, No. 10, 1 Apr. 1997, Carre et al., "Customization of a self-processing polymer for obtaining specific diffractive optical elements," Synthetic Metals 127 (2002) 291-294, and Nordman et al., "Diffractive phase elements by electron-beam exposure of thin As$_2$S$_3$ films, Journal of Applied Physics 80(7), 1 Oct. 1996, each of which is incorporated herein by reference.

Figure 5E:
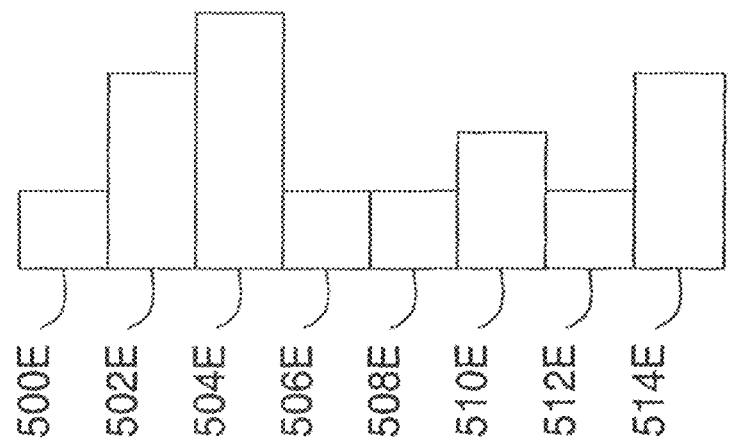
FIG. 5E is a cross-section view of a mixed mode diffractive optical element structure.

FIGS. 5B-5G show a view of cross-section AA' in FIG. 5A for various embodiments of optical assembly 110. FIG. 5B is a cross-section view of a symmetrically arranged volume modulated diffractive optical element structure, in which the volume of transform regions 500-514 are symmetrical with respect to a center line 516.

In FIGS. 5C-5G, each of the transform regions corresponds to a transform region in the embodiments of FIGS. 5A and 5B (e.g., transform regions 500C, 500D, 500E, 500F and 500G correspond to transform region 500), however, with the properties of the relevant embodiment.

FIG. 5C is a cross-section view of a volume modulated diffractive optical element structure in which the volume of transform regions 500C-514C are varied and arranged asymmetrically with respect to a center line 516.

Figure 5D:
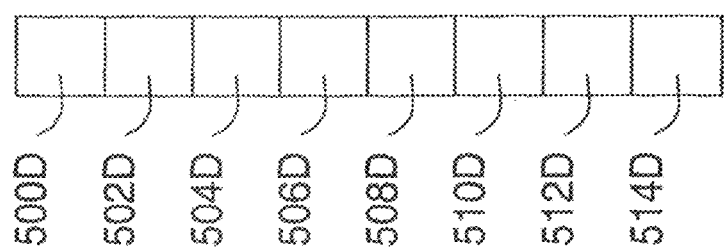
FIG. 5D is a cross-section view of an index modulated diffractive optical element structure.

FIG. 5D is a cross-section view of an index modulated diffractive optical element structure in which a refractive index of transform regions 500D-514D is varied.

The optical assembly 110 is not limited to embodiments including only volume or index modulated transform regions, but also includes a mixture of volume and index modulated transform regions, as well as transform regions that include both volume and index modulation features.

FIG. 5E is a cross-section view of a mixed mode diffractive optical element structure in which transform regions 500E, 506E, 508E and 512E include varied refractive indexes, transform regions 502E, 510E and 514E include varied volumes and transform region 504E includes both a varied refractive index and a varied volume, for example.

The optical assembly 110 is not limited embodiments including only a refractive-type diffractive optical assembly, in which light passes from one side of the assembly to exit at another side, but also includes embodiments having a reflective-type diffractive optical assembly, in which light is reflected by a surface prior to exiting the assembly.

Figure 5G:
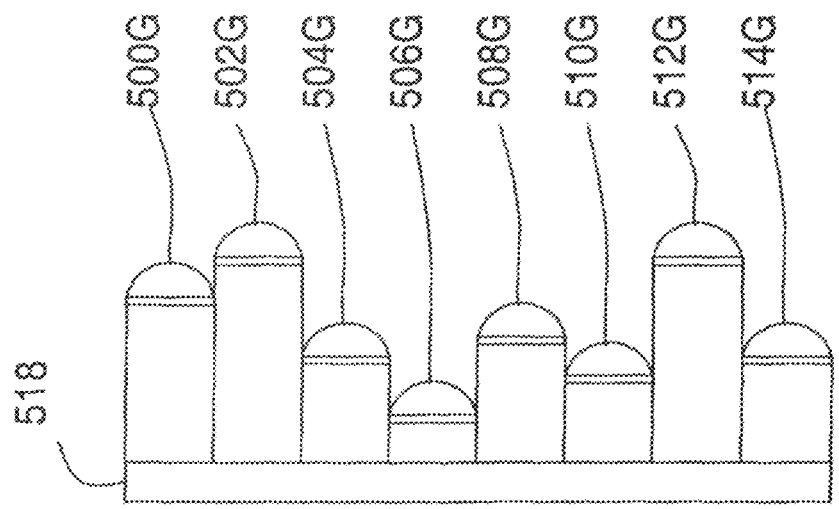
FIG. 5G is a cross-section view of a reflective volume modulated diffractive optical element.
Figure 5F:
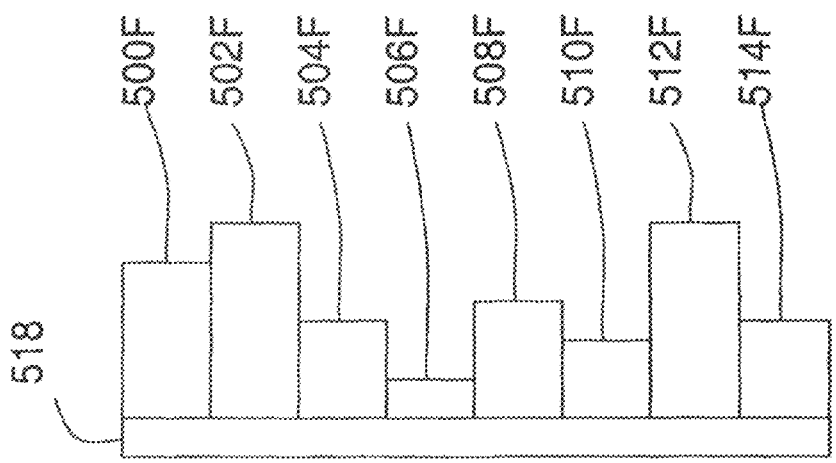
FIG. 5F is a cross-section view of a reflective volume modulated diffractive optical element.

FIG. 5F is a cross-section view of a reflective volume modulated diffractive optical element including a reflective layer 518 and volume modulated transform regions 500E-514F. In this embodiment, the received light enters through transform regions 500E-514F, is reflected by reflective layer 518 and passes again through transform regions 500E-514F before exiting the diffractive optical element.

The optical assembly 110 is not limited to embodiments including transform regions having the shapes shown in the figures above, but also includes embodiments in which the transform regions have other shapes, for example a rounded shape.

FIG. 5G is a cross-section view of a reflective volume modulated diffractive optical element in which the transform regions 500G-514G have a different shape on an external edge and a square shape on an internal edge adjacent to the reflective layer 518.

FIG. 6A is a detailed front view of an embodiment of mask 304 that includes a DOE having an array of plural transform regions 600-614, each of which may include features similar to those described above regarding FIGS. 5A-5G. Further, each of the plural transform regions in the diffractive optical element of this embodiment is configured to transform an amplitude of a received light using one or more transmission layers configured to reduce an amplitude of received light by various predetermined amounts according to the transmission equations below. In this embodiment, transform region 614 is configured to include a transmission layer including a material such as an absorbent ink or a reflective metal configured to reduce an amplitude or intensity of transmitted light by a relatively small amount, while transform regions 606, 610 and 602 are configured to reduce an amplitude or intensity of transmitted by respectively increasing amounts. The varied transmissivity may be produced by varying a number of layers of a same material, varying a density of a same material, mixing various concentrations of materials, or by any conventional method used to vary an intensity of a received light.

Further, each transform region 600-614 may be configured to apply different amounts of amplitude or intensity reduction over different frequencies of the received light spectrum. Thus, each transform region 600-614 may include an ability to differently filter each color of the received light. For example, transform region 606 may transmit a portion of received light having frequencies close to the color red without reduction in amplitude and may reduce the amplitude of all other frequencies of the received light. Further, transform region 610 may reduce the amplitude of received blue light by a first amount and may reduce the amplitude of a received yellow or red light by a second amount. All permutations of frequency attenuating profiles for each transform region are included in the invention.

Figure 6C:
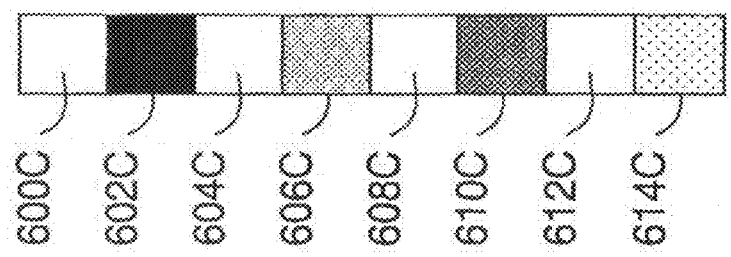
FIG. 6C is a cross-section view of a mask having transform regions configured to vary an amplitude of the received light.
Figure 6B:
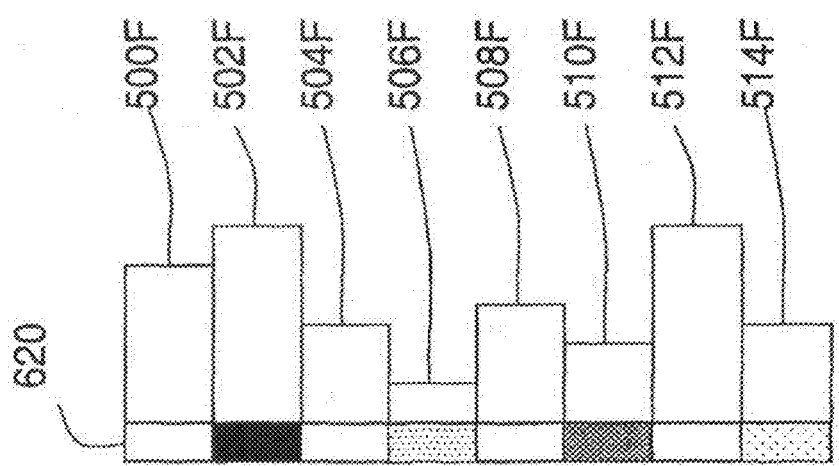
FIG. 6B is a cross-section view of a mask including a transmission layer having varied transmissivity for regions adjacent to corresponding transform regions.
Figure 6E:
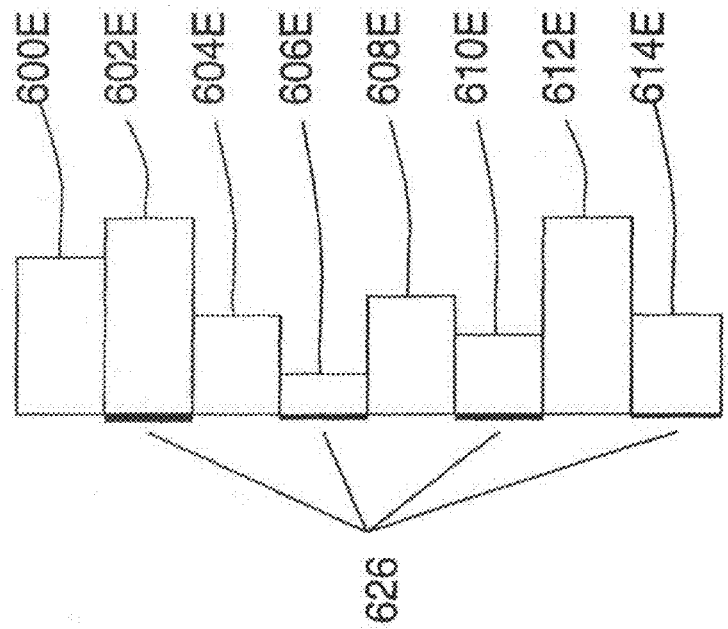
FIG. 6E is another embodiment of a mask configured to vary an amplitude of the received light.

FIGS. 6B-6E show views of cross-section BB' in FIG. 6A for various embodiments of mask 304. FIG. 6B is a cross-section view of a mask including a transmission layer 620 having varied transmissivity for regions adjacent to corresponding transform regions 514F, 506F, 510F and 502F.

FIG. 6C is a cross-section view of a mask having transform regions 614C, 606C, 610C and 602C configured to vary an amplitude of the received light (e.g., for example, due to impurities added to the transform region)

Figure 6D:
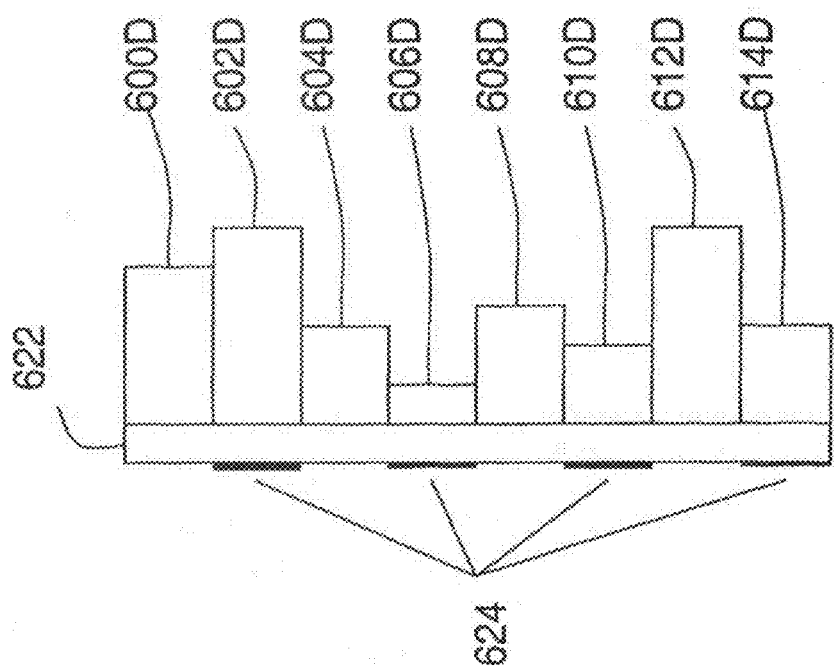
FIG. 6D is a cross-section view of a mask having a printed overlay.

FIG. 6D is a cross-section view of a mask having a printed overlay 622 attached to one side. The printed overlay 622 includes printed regions 624 in which ink or other light absorbing or reflecting material is deposited in regions adjacent to corresponding transform regions 614D, 606D, 610D and 602D in varying concentrations or amounts to vary an amplitude of the received light. The printed overlay 622 may be printed prior to being attached to the rest of the mask 304. Further, the printed regions 624 may be printed directly on the DOE without using a printed overlay 622, as shown in the mask 304 embodiment in FIG. 6E.

The DOE in the mask is not limited to DOEs having an array of 64 transform regions as shown in the examples above, but also includes DOEs having any other number of transform regions, and includes transform regions arranged other than in an array, such as with a radial arrangement of transform regions (not shown). Further the transform regions may have any shape and be in any arrangement.

The mask 304 may be configured to simultaneously perform one or more complex transmission functions. In the present embodiment, the mask includes three different transmission functions to produce three different convoluted and transformed partial images within each captured image. When particular transmission functions, as described below, are included in the mask 304, the resulting three different convoluted and transformed partial images in the captured image may be combined as a Fresnel hologram of the object 130, from which three-dimensional object information may be extracted.

FIG. 6F is a block diagram of an embodiment of mask 304 including an amplitude SLM 628 that is configured to controllably modify an amplitude of a received light, and phase SLM 630 that is configured to controllably modify a phase of the amplitude modified light and that is mounted adjacent to the amplitude SLM 628.

FIG. 6G is a block diagram of an alternative embodiment of mask 304 in which amplitude SLM 628 and phase SLM 630 are not located next to each other, but have an intervening space. Further, the SLMs may alternatively be placed in a different order with respect to the light path (not show). Further, the invention may include other SLMs that may be available now or in the future and are configured to controllably modify both the amplitude and phase of a received light.

The two-dimensional intensity image captured by the image capture assembly is generally described by an intensity function $o(x,y)$, which describes the distribution of light intensities captured at each point in the image capture plane (i.e., x, y plane). The three intensity functions $o_n(x,y)$ define the partial contribution to the overall image intensity contributed by each partial image, and is related to the overall image intensity function as follows:

$$o(x, y) = \sum_{n=1}^{3} B_n o_n(x, y) \qquad (1A)$$

where $B_n$ is a complex constant.

The transmission functions that produce the three partial images captured by the image capture assembly 120 are defined as follows:

$$o_n(x,y) = \iiint s(x',y',z') |h_n(x-x',y-y',z')|^2 dx'dy'dz' \qquad (1B)$$

where $s(x',y',z')$ is a function that describes the intensity at the system input in the vicinity of the point $(x',y',z')=(0,0,0)$. From the function $o(x,y)$, the geometric information regarding the light scattering surface (i.e., the portions of the object facing the optical apparatus 100 that scatter or emit light that is received at the optical assembly 110) of the object may be determined in terms of object referenced coordinates x', y' and z'.

The transformed light includes point spreading functions (PSF) $h_n(x,y,z)$ contributed by each transmission function. In the present embodiment, $h(x,y,z)$ is a linear summation of point spreading functions $h_1(x,y,z)$, $h_2(x,y,z)$ and $h_3$, which each perform a light spreading function with respect to the image capture coordinates (i.e., x, y, z). PSF $h(x,y,z)$ is defined as follows:

$$h(x, y, z) = \qquad (2)$$

$$\sum_{n=1}^{3} \left( \frac{1}{\sqrt{2}} \exp\left\{ \frac{i\pi}{2\lambda\Delta(z)}[(x-x_n)^2+(y-y_n)^2] + \frac{i\theta_n}{2} \right\} + \frac{1}{\sqrt{2}} \exp \right.$$

$$\left. \left\{ \frac{-i\pi}{2\lambda\Delta(z)}[(x-x_n)^2+(y-y_n)^2] - \frac{i\theta_n}{2} \right\} \right) p_z(x-x_n, y-y_n),$$

where $p_z(x-x_n, y-y_n)$ are two-dimensional disk functions centered at points $(x_1,y_1)$, $(x_2,y_2)$ and $(x_3,y_3)$, respectively, in the image capture space, i is the imaginary unit (i.e., $i=(-1)^{0.5}$), $\lambda$ is the wavelength of the propagating light, and $\Delta(z)$ is a parameter monotonically related to the distance z. Further, the disk function $p_z$ has a diameter function $d(z)$ that varies the diameter based on the value of z and thereby limits the diameter of a corresponding FZP. Further, each PSF is selected to have a different constant phase value $\theta_n$.

Although the equation above includes a single value $\lambda$ for the wavelength of the propagating light, the above equation may be used for polychromatic light by assuming that the captured intensity image is a combination of intensities in plural portions of the total captured spectrum, and for example, the captured intensity image may be considered as a combination of captured red light intensities, captured yellow light intensities, and captured green light intensities. Further, the invention also includes using other color models to represent the colored image, such as CMYK.

Thus, in the image captured at the image capture device (i.e., at z=0), the PSFs $h4_{1,2,3}$ are given by $$h(x, y, 0) = \qquad (3)$$

$$\sum_{n=1}^{3} \left( \frac{1}{\sqrt{2}} \exp\left\{ \frac{i\pi}{2\lambda\Delta(0)}[(x-x_n)^2+(y-y_n)^2] + \frac{i\theta_n}{2} \right\} + \frac{1}{\sqrt{2}} \exp \right.$$

$$\left. \left\{ \frac{-i\pi}{2\lambda\Delta(0)}[(x-x_n)^2+(y-y_n)^2] - \frac{i\theta_n}{2} \right\} \right) p_0(x-x_n, y-y_n),$$

Therefore, the desired light transforming function of each partial function $H_n(u,v)$ of the optical assembly 110 is the Fourier transform of $h_n(x,y,0)$ in equation 3 above. Thus, $H_n(u,v)$, corresponding to embodiments with the spatial multiplexing of partial mask patterns as shown in Equation 3 and FIGS. 9A-9C, 10A and 10B, is defined as follows:

$$H_n(u, v) = \left\{ \frac{1}{2} \exp\left[ \frac{i\pi}{\lambda\gamma_1}(u^2+v^2) + \frac{i2\pi}{\lambda f_2}(x_n u + y_n v) + \frac{i\theta_n}{2} \right] + \right. \qquad (4A)$$

$$\left. \frac{1}{2} \exp\left[ \frac{i\pi}{\lambda\gamma_2}(u^2+v^2) - \frac{i2\pi}{\lambda f_2}(x_n u + y_n v) - \frac{i\theta_n}{2} \right] \right\} *$$

$$P(u, v), n = 1, 2, 3$$

In alternative time multiplexing embodiments, such as those shown in FIGS. 15, 17 and 18, $H_n(u,v)$ may be defined as follows:

$$H_n(u, v) = \qquad (4B)$$

$$\left\{ \frac{1}{2} \exp\left[ \frac{i\pi}{\lambda\gamma_1}(u^2+v^2) + \frac{i\theta_n}{2} \right] + \frac{1}{2} \exp\left[ \frac{i\pi}{\lambda\gamma_2}(u^2+v^2) - \frac{i\theta_n}{2} \right] \right\} * P(u, v),$$

$$n = 1, 2, 3$$

where * represents a convolution operation.

Further, the overall transforming function of the mask $H(u,v)$ is defined as follows:

$$H(u, v) = \sum_{n=1}^{3} H_n(u, v) \qquad (5)$$

where u and v are coordinates in the plane of the optical assembly 110 corresponding to the x and y coordinates in the image capture plane (i.e., the u axis is parallel to the x axis and the v axis is parallel to the y axis), and $P(u,v)$ is the Fourier transform of disk function $p_o(x,y)$.

In the equations above, $\gamma_{1,2}$ may be defined according to the following equation:

$$\gamma_{1,2} = \pm \frac{27 f_1^2}{4 f_2} \quad (6)$$

Note, however, that the invention is not limited to using optical assemblies having a different focal length and that the equations may be extended to allow same focal lengths for the two optical assemblies. In other words, the parameters of mask $\gamma_{1,2}=\pm\gamma$ are determined according to Equation 6 when the parameters $f_1$ and $f_2$ are known. $f_1$ and $f_2$ may be chosen according to the resolution of the SLM or DOE For example, if the SLM area is DxD, with NxN pixels, then the pixel size is $\delta=D/N$. The minimal ring width of FZP displayed on this SLM is well known as $\delta=|\gamma|\lambda/D$. Therefore, from the equation $D/N=|\gamma|\lambda/D$ one gets $|\gamma|=D^2/N\lambda$. Then, substituting $|\gamma|$ into Equation 6 yields the values of the parameters $f_1$ and $f_2$. Note that this example illustrates only one possible set of considerations, but the invention also includes methods and resulting apparatuses produced with filter parameters calculated based on other factors.

When the transform regions of a mask include a color filtering capability configured to filter out or to pass light only centered at particular frequencies, as described above with respect to FIG. 6A. The masks do not have to change when illuminated by various colors. The response of a mask transparency changes according to the wavelength of the light, for example as shown in Equation 27 below.

Figure 7:
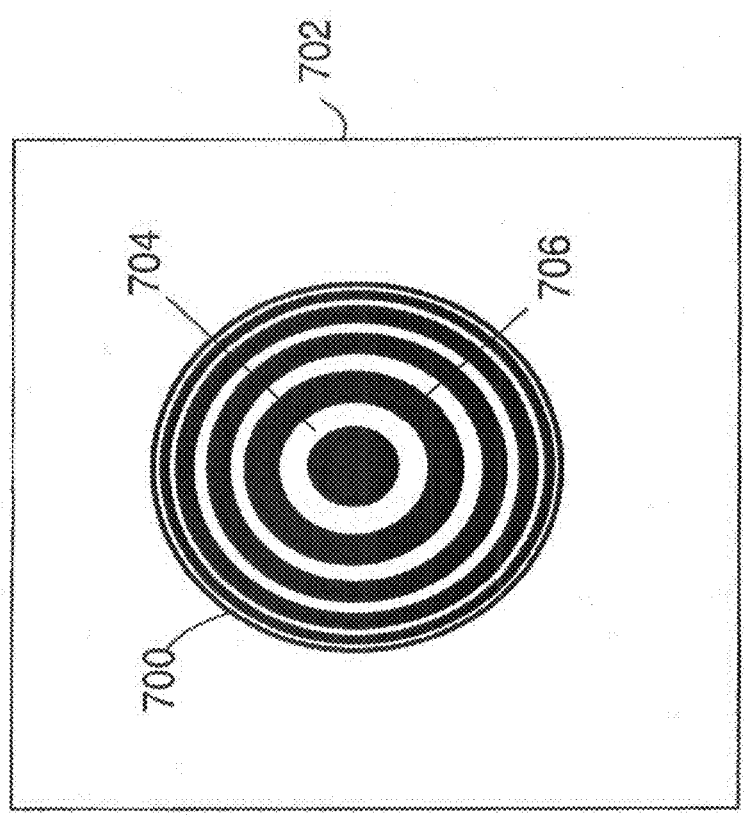
FIG. 7 is an example of a binary Fresnel Zone Pattern.

FIG. 7 shows an example of a binary Fresnel Zone Pattern 700, in which each of zone includes only one of two transmissivity states: substantially transparent, and substantially opaque, with respect to the light being transmitted. In this example, the FZP 700 is printed on a glass substrate 702 that transmits more than 90% of light within the visual light spectrum using an ink that reflects or absorbs more than 90% of light within the relevant light spectrum.

The invention is not limited to binary FZPs having alternating zones of more than 90% transmission and more than 90% absorption/reflection, but also includes FZPs having other levels of transmission, and absorption/reflection, as known in the field of FZPs. Further, the invention is not limited to FZPs having zones having a consistent transmissivity throughout each zone (i.e., zones that are entirely substantially transparent or entirely substantially opaque), but also includes FZPs having zones with varying transmission levels within each zone. In addition, the invention is not limited only to patterns of complete circular rings, but also includes patterns of partial rings, such as an off-axis FZP. Moreover, the invention also includes replacing the FZP with a photon sieve, such as described in Kipp et. al., "Sharper images by focusing soft x-rays with photon sieves," Nature, vol. 414, 8 Nov. 2001, pp. 184-188, incorporated herein by reference.

Figure 8C:
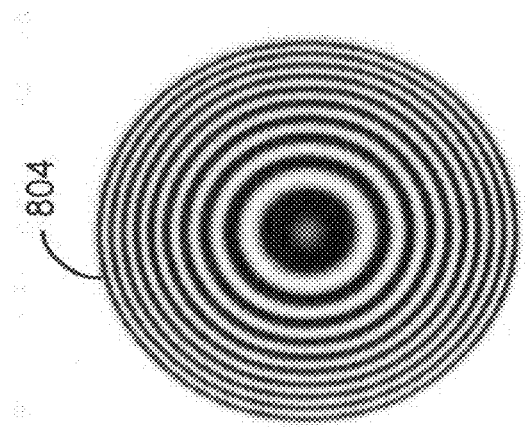
FIG. 8C is an example of another sinusoidal FZP.
Figure 8B:
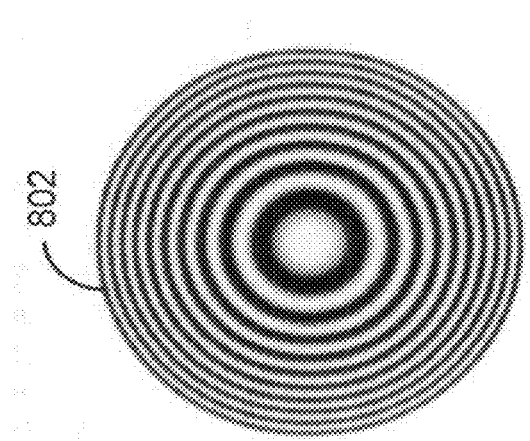
FIG. 8B is an example of another sinusoidal FZP.
Figure 8A:
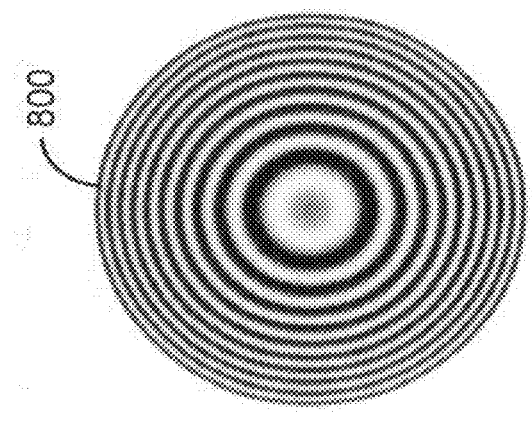
FIG. 8A is an example of a sinusoidal FZP.

FIGS. 8A-8C show examples of sinusoidal FZPs 800, 802 and 804. In sinusoidal FZPs, transmissivity varies sinusoidally between points of maximum transmissivity in substantially transmissive zones and points of minimum transmissivity in less transmissive zones, along a straight line radiating from the center of the FZP. Further, the FZPs 800, 802 and 804 each have a different phase.

Figure 9C:
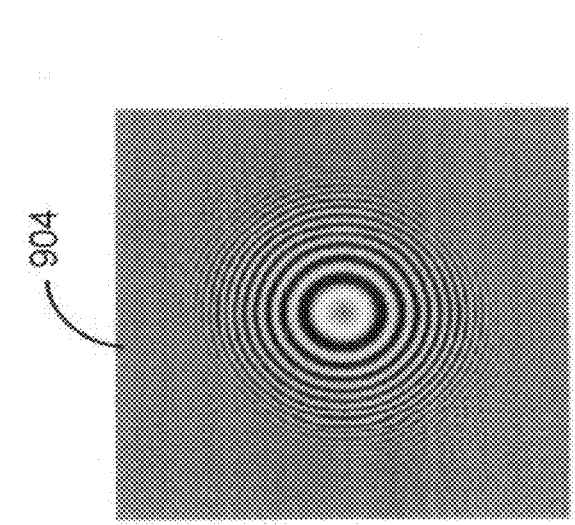
FIG. 9C is another example of a Fourier Transformed FZP pattern.
Figure 9B:
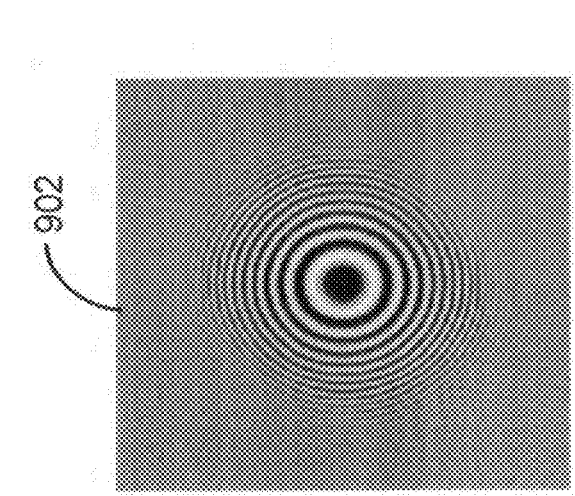
FIG. 9B is another example of a Fourier Transformed FZP pattern.
Figure 9A:
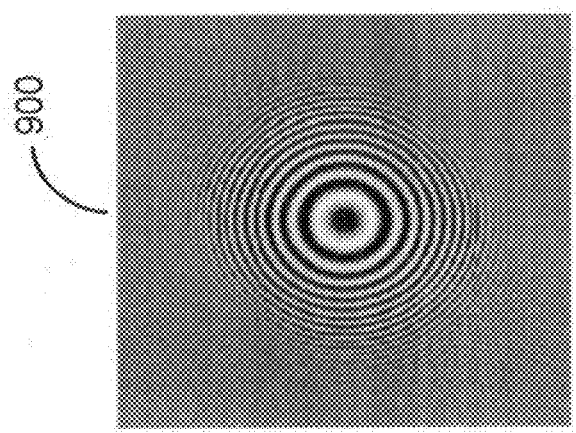
FIG. 9A is an example of a Fourier Transformed FZP pattern.

FIGS. 9A-9C show examples of Fourier Transformed FZP patterns (FT-FZP) 900, 902 and 904 that are Fourier transforms of FZPs 800, 802 and 804, respectively. Note that the FT-FZP patterns may also have an FZP concentric pattern. However, where the FZPs in FIGS. 8A-C produce an image having an intensity vs. radial coordinate distribution having a uniform amplitude across the radial coordinates, the FT-FZPs in FIGS. 9A-C have an intensity vs. radial coordinate distribution similar to a bell curve with an intensity peak at the centers of the rings in the ring patterns, and reduced intensities at all other locations. The Fourier transforms of Fresnel zone patterns may be used to produce the mask functions according to Equation 4 above.

Further, H(u,v) of Equation 4 may be obtained by Fourier transform of h(x,y,0) from Equation 3 multiplied by the quadratic phase function. Note that an FZP may be a sum of two quadratic phase functions with opposite signs in their arguments, and the Fourier transform of a quadratic phase function is also a quadratic phase function. Therefore, each quadratic phase of h(x,y,0) is multiplied by a quadratic phase function and then Fourier transformed to another quadratic phase function. The net result is that H(u,v) is a sum of two quadratic phase functions. It is possible to carefully choose h(x,y,0) to make sure that H(u,v) will be a sum of two quadratic phase functions with arguments that are equal in their absolute value and have opposite signs. In that case, the sum of quadratic phase functions is a FZP with a bell curve because h(x,y,0) has a disk shape. In particular, a disk function may be transformed to what is called a Mexican-Hat function, which is convolved with the infinite FZP as shown in Equation 4. This convolution may gradually decrease the amplitude of the FZP as radius values increase, thereby creating the bell curve shape. According to the features of Fourier transforms the restricted area on h(x,y,0) causes a convolution of H(u,v) with a narrow function indicated in Equation 4 by P(u,v). This convolution is responsible for the bell-like shape of envelope of H(u,v).

Figure 10B:
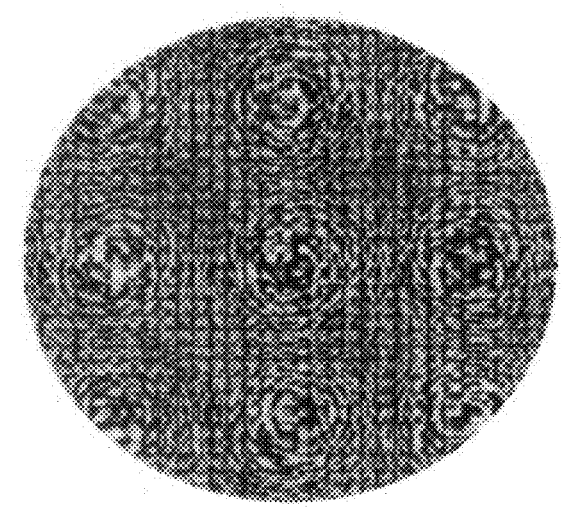
FIG. 10B is the phase portion of a complex transmission function that is a Fourier Transform of a linear combination of mask functions.
Figure 10A:
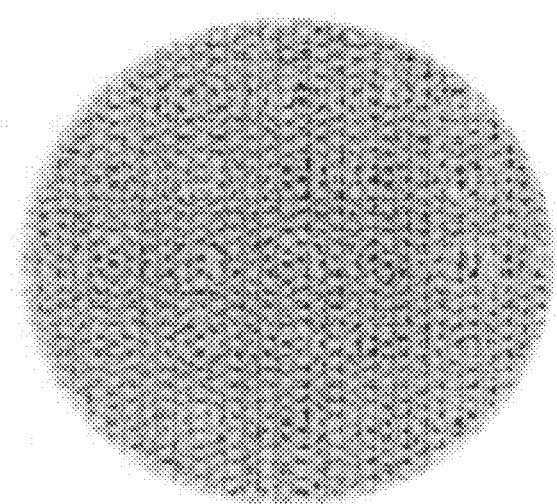
FIG. 10A is the amplitude portion of a complex transmission function that is a Fourier Transform of a linear combination of three mask functions.
Figure 10C:
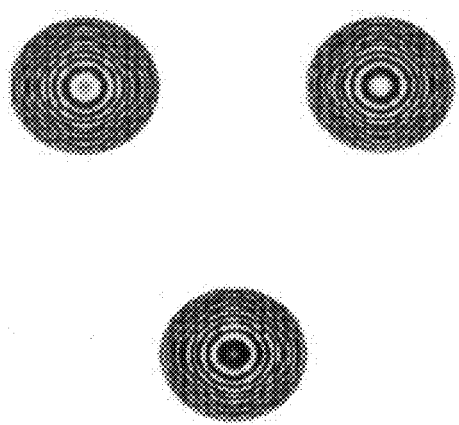
FIG. 10C is an example of a pattern on a CCD when a point object is present at the input.

FIG. 10A is the amplitude portion of a complex transmission function according to Equation 5, which is a linear combination of three mask functions each according Equation 4B, and corresponding to the Fourier transform of the three FZPs in FIG. 10C.

FIG. 10B is the phase portion of the complex transmission function according to Equation 5, which is a linear combination of mask functions according to Equation 4, and corresponding to the Fourier transform of the three FZPs in FIG. 10C.

The complex transmission function of Equation 5 and examples illustrated in FIGS. 10A and 10B may be implemented using a single DOE or SLM or combinations of DOEs and/or SLMs, as described above.

Note that the FT-FZPs (e.g., as shown in FIG. 9A-C) may be an amplitude only real function, but the linear combination of FT-FZPs is an amplitude and phase pattern (e.g., as shown in FIG. 10A-B). This is possible by a careful choice of h(x,y,0). When h(x,y,0) is chosen to be two particular quadratic phase functions that, when multiplied by the quadratic phase function of the lens and performing a Fourier transform of the resulting product, the obtained result is two quadratic phase functions having arguments that are equal in their absolute values, but with opposite signs. In that case, the sum is a purely real function. On the other hand this property may not occur with the H(u,v) shown in FIGS. 10A-B, because the combination of 3 FZPs together is not symmetric in the sense that h(x,y,0)≠h(−x,−y,0). Further, it is well known that a Fourier transform of non-symmetric functions can not be purely real.

FIG. 10C is an example of the pattern that is generated on the CCD when a point object is present at the input, as described above during the process to produce mask patterns shown in FIGS. 10A and 10B.

FIG. 11A is a block diagram of an image capture assembly 1100 that includes a light intensity capture device 1102 and a capture control unit 1104. The light intensity capture device 1102 of this embodiment is a conventional light capturing device, such as a charge coupled device (CCD) as used in digital cameras, and is configured to capture a two-dimensional array of light intensity information (i.e., image of the received light) under the control of the capture control unit 1104. The invention is not limited only to CCDs but may also include other devices that capture light intensity, such as a photographic film or a transparent film, an X-ray detector, other electromagnetic radiation detectors, a CMOS device, a diode array, or a photo-detector, etc. . . . . .

The capture control unit 1104 controls the light capturing functions of the light intensity capture device 1102 and is configured to retrieve electronic image data information from the light intensity capture device 1102. For example, in the present embodiment, the light intensity capture device includes a CCD connected to the capture control unit 1104, which is configured, according to conventional means, to retrieve electronic image data from the CCD image array. Alternatively, for example, if the light intensity capture device included a photographic film, the image capture control unit could include a conventional image scanning function configured to scan the captured image from the photographic film, and thereby retrieve the electronic image data. The invention also includes other conventional methods of capturing electronic image data, known to those of skill in this field.

The capture control unit 1104 controls the functions of the CCD 1102, and may also include and provide control for conventional photographic mechanical assemblies such as a shutter and/or a controllable aperture (not shown) to control aspects of capturing the image on the CCD 1102. Alternatively, one of skill in the image capture field will understand that such mechanical assemblies controlled by the capture control unit 1104 may be arranged in any convenient location along the light path between the object and the image capture assembly, or between the light source and the image capture assembly.

According to the present embodiment, light is spread by the pattern in the mask 304 which includes PSFs $h_n$ (Equation 3) having disk functions $p_1(x,y)$, $p_2(x,y)$ and $p_3(x,y)$ centered at points $(x_1,y_1)$, $(x_2,y_2)$ and $(x_3,y_3)$, respectively, in the image capture space. Thus, an image capture device may be configured to include three distinct regions within a single light intensity capture device to receive three distinct partial images produced by mask 304, such as the light intensity capture device 1102 in FIG. 11A. Further, the image capture device may include three separate light intensity capture devices to receive the three distinct partial images produced by mask 304, such as light intensity capture devices 1106, 1108 and 1110 in the embodiment of image capture assembly 1112 shown in FIG. 11B.

FIG. 12A is a view of an example of a light intensity capture device 1200 that includes a charge coupled device 1202 having three distinct regions 1204, 1206 and 1208. A central location in each region 1210, 1212 and 1214, respectively, corresponds to a center of each of the three partial images produced by the optical assembly 110. In particular, the coordinates of the points 1210, 1212 and 1214 correspond to $(x_1,y_1)$, $(x_2,y_2)$ and $(x_3,y_3)$, respectively, from Equation 3.

Figure 12B:
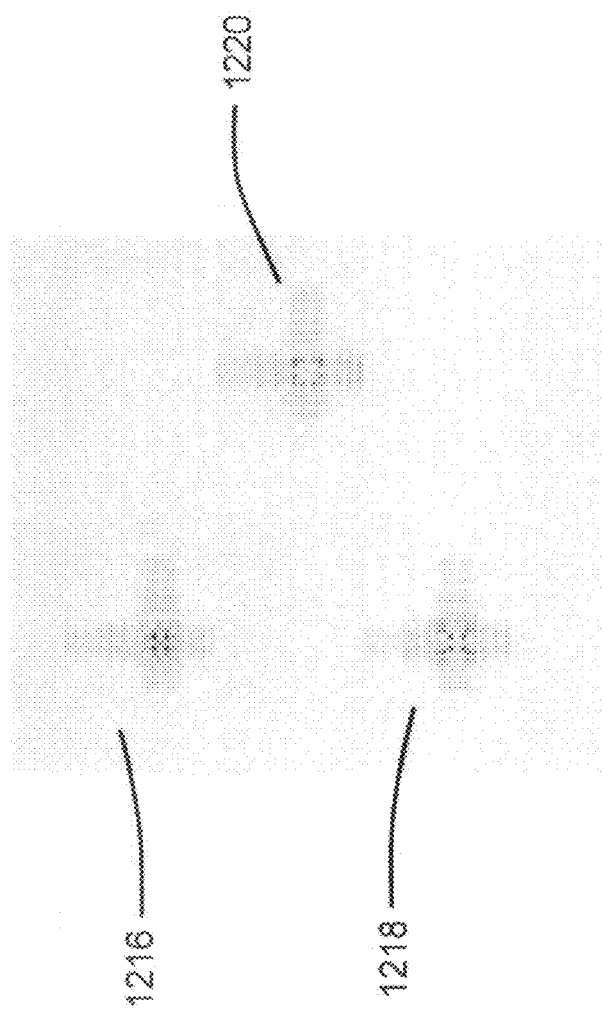
FIG. 12B is an example of a two-dimensional intensity image including three partial images.

FIG. 12B is an example of a two-dimensional intensity image according to Equation 1A captured by image capture assembly 120, including three partial images 1216, 1218 and 1220 produced by optical assembly 110. Such a two-dimensional intensity image is converted into a three-dimensional image of the object by the image capture assembly 120, as described below.

Figure 13C:
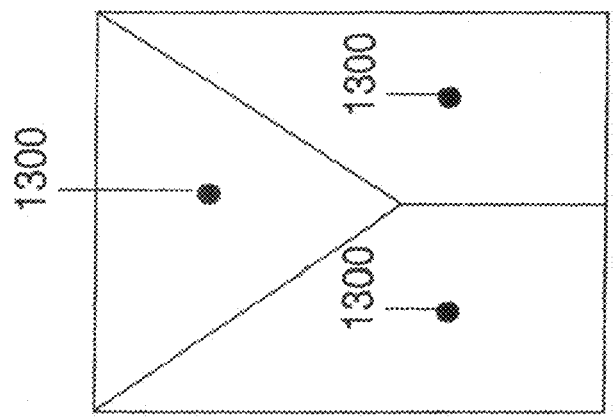
FIG. 13C is another example of an arrangement of distinct regions in an embodiment of a light capturing device.
Figure 13B:
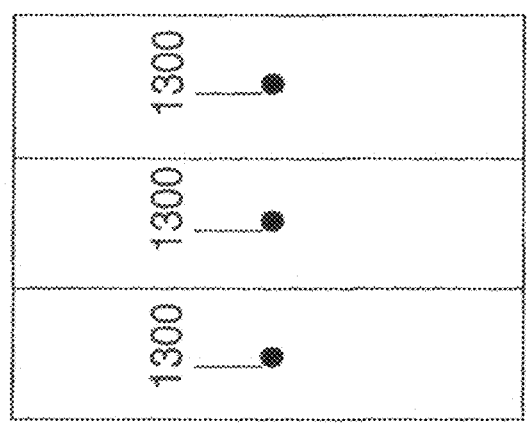
FIG. 13B is another example of an arrangement of distinct regions in an embodiment of a light capturing device.
Figure 13A:
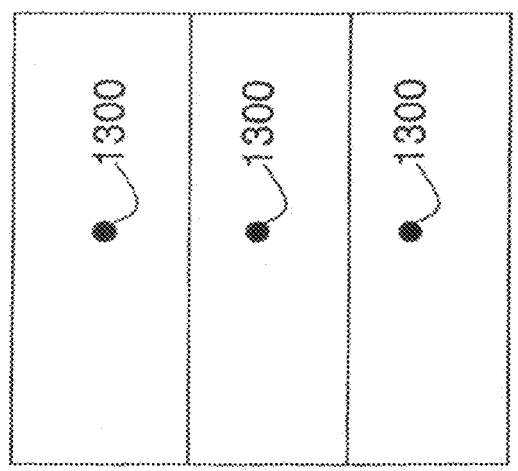
FIG. 13A is an example of an arrangement of distinct regions in an embodiment of a light capturing device.

FIGS. 13A-13C show other examples of ways in which the distinct regions of a light intensity capturing device may be arranged, where each distinct region includes a center 1300. One of skill in the art will understand that the light intensity capturing device may be divided into three or more zones in any convenient manner. For example, if the light intensity capturing device includes a randomly addressable CCD, the boundaries of the zones may be arranged along convenient address regions. Alternatively, if the light intensity capturing device includes a photographic film, the boundaries of the zones may be arranged according to the geometries that are convenient for the dimensions and aspect ratio of the film.

According to Equation 1A above, an image capture assembly 120 receives and captures light having a light intensity distribution given by o(x,y). To extract the object geometric information from the captured image, the image capture assembly operates on the captured image (i.e., intensity function o(x,y)) according to Equation 1A. Thus, the object geometric information of the object s(x',y',z') is given by the following equation:

$$s(x', y', z') = O_F(x, y) * \exp\left[\frac{-i\pi}{\lambda\Delta(z)}(x^2 + y^2)\right]. \quad (7)$$

where $O_F(x,y)$ is a linear combination of the intensity distributions in the partial images as follows:

$$O_F(x,y) = o_1(x,y)[\exp(-i\theta_3) - \exp(-i\theta_2)] + o_2(x,y)[\exp(-i\theta_1) - \exp(-i\theta_3)] + o_3(x,y)[\exp(-i\theta_2) - \exp(-i\theta_1)] \quad (8).$$

The extraction of the geometric information may be performed using methods from the field of digital holography, for example as described in I. Yamaguchi, and T. Zhang, "Phase-shifting digital holography," Opt. Lett. 22, 1268-1269 (1997), incorporated herein by reference.

In addition, the capture control unit 1104 may include functions for combining the electronic data for each of the three partial images according to Equation 8, for extracting the object geometric information according to Equation 7 and for providing the resulting object geometric information in a desired format. Alternatively, those functions may be performed in a general purpose computer configured to receive the image data from the image capture assembly.

The object geometric information may be extracted as surface data, which may be suitable for use in applications such as physical modeling (e.g., to create a computer model of the object) or three-dimensional fabrication (e.g., to create a physical three-dimensional copy of the object) applications. In addition, the object geometric information may be displayed graphically, for example using two-dimensional representations of three-dimensional objects (e.g., a two-dimensional projection such as isometric projection, or a two-dimensional representation of a three-dimensional object that may be animated to rotate the object around one or more axes to better illustrate the three-dimensional object), or using direct three-dimensional representation of three-dimensional objects (e.g., holographic display or projection).

Figure 14:
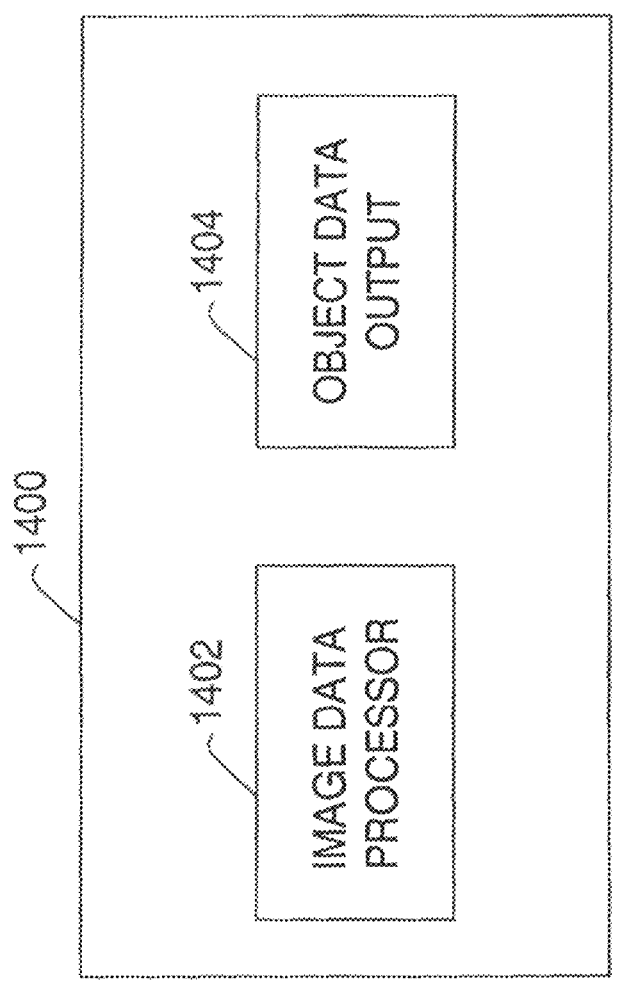
FIG. 14 is a block diagram of an embodiment of a capture control unit that includes an image data processor that combines the electronic image data.

FIG. 14 is a block diagram of an example of a capture control unit 1400 that includes an image data processor 1402 that combines the electronic image data according to Equation 7 to produce the object geometric information, and an object data output device 1404 to output the object geometric information. The image data processor 1402 may be implemented using a conventional processor and conventional data processing software. The object data output device 1404 may include any of a number of conventional devices configured to utilize three-dimensional object geometric data such as a visual holographic display, a virtual reality environment display, a three-dimensional object fabrication device (e.g., laser sintering fabrication device, a digitally controlled lathe, etc. . . . ), a simulation model, a two-dimensional animation of a moving three-dimensional object, etc. . . . . The invention also includes a capture control unit (not shown) that is configured to include an interface to an external control device, such as a computer, which may replace image data processor 1402 and object data output 1404, to flexibly perform the image data processing functions in a separate device.

In the embodiments described above, three different mask patterns having three different transmission functions (e.g., functions $H_1$, $H_2$, and $H_3$ of equation (4B or 4A)) are combined in a single mask, three partial images resulting from the mask patterns are simultaneously captured, and the three partial images are combined to obtain geometric object information. However, if the image capture assembly of FIG. 11A is used, the resulting resolution of the captured image may be reduced if the pixel array size is not increased three times so that each of the three images are the same resolution so that the three partial images may be captured on a single light intensity capture device. Alternatively, if the image capture assembly of FIG. 11B is used, or if a single sensor with three times the area is used, the resulting cost of the capture apparatus is increased by the cost of two additional light intensity capture devices or the larger format sensor.

Another embodiment that varies a mask over time may not cause the possible resolution reduction or cost increase of the preceding embodiment. In particular, in this embodiment, a mask may be varied over time, resulting in three different partial images that vary over time. The three different partial images may be captured by an image capture assembly configured to capture images over time, and the three partial images may be combined to extract the geometric information of the object.

Figure 15:
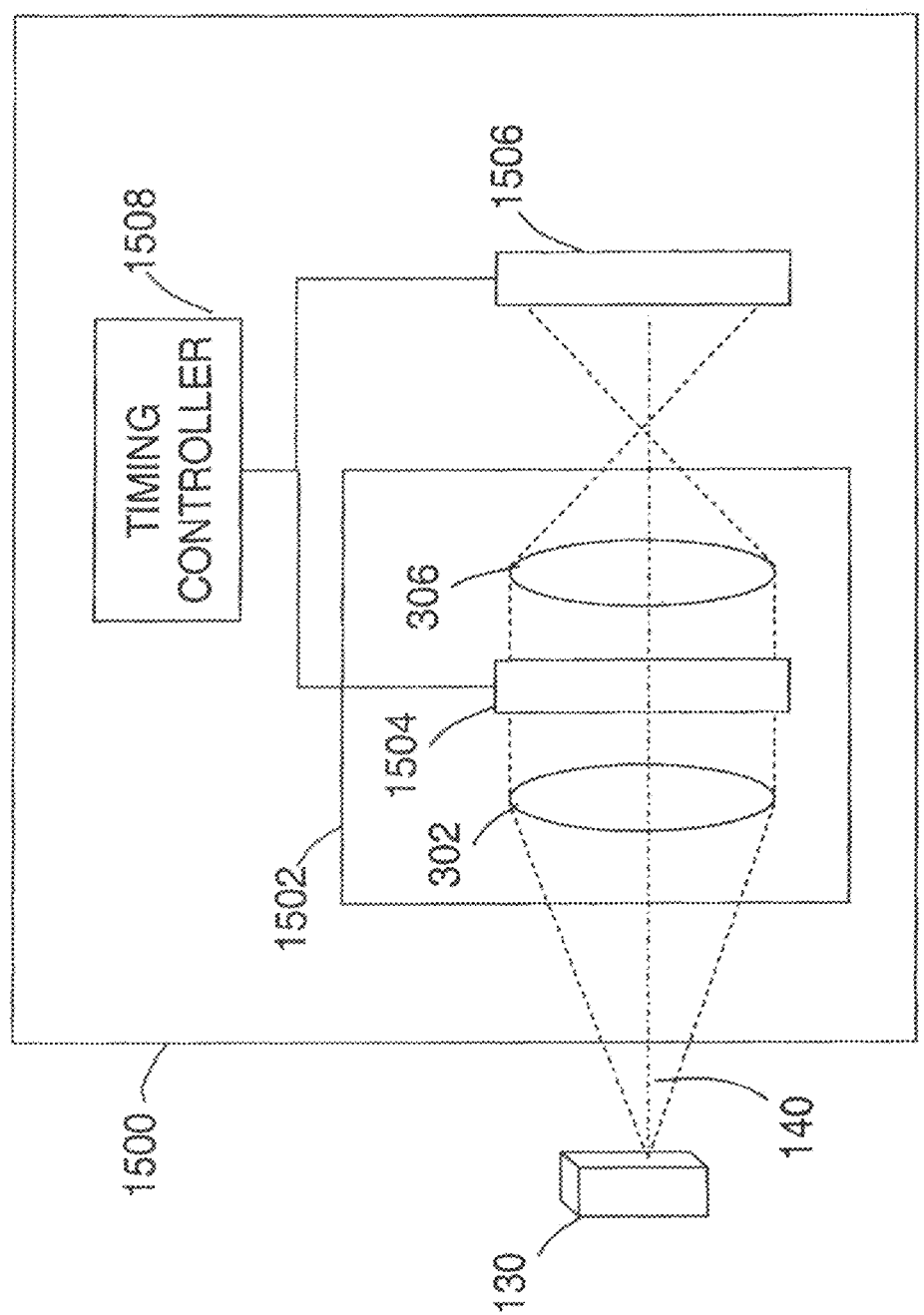
FIG. 15 is a block diagram of an embodiment of an optical apparatus that varies the mask over time.

FIG. 15 is a block diagram of an embodiment of an optical apparatus 1500 that varies the mask over time. Optical apparatus 1500 is similar to the embodiment of the optical apparatus 400 in FIG. 4, however, the optical apparatus 1500 includes a controllable incoherent correlator 1502 and a controllable image capture assembly 1506 that are controlled by a timing controller 1508, and the optical apparatus 1500 is configured to capture three-dimensional or geometric information of object 130 using at least three different images captured at different times.

The controllable incoherent correlator 1502 is similar to the incoherent correlator 300 of the embodiment shown in FIG. 4. However, the controllable incoherent correlator 1502 includes a controllable mask 1504 having a mask that may be controlled by the timing controller, to controllably transform the amplitude and phase of light received from the object. One or more spatial light modulators (SLMs), as described in FIGS. 6F and 6G, may be used in such a controllable incoherent correlator.

Further, the controllable image capture assembly 1506 is similar to the image capture assembly 120 in the embodiment shown in FIG. 4. However, the controllable image capture assembly 1506 is further configured to be controlled to capture and retrieve electronic image data by the timing controller 1508.

Figure 16:
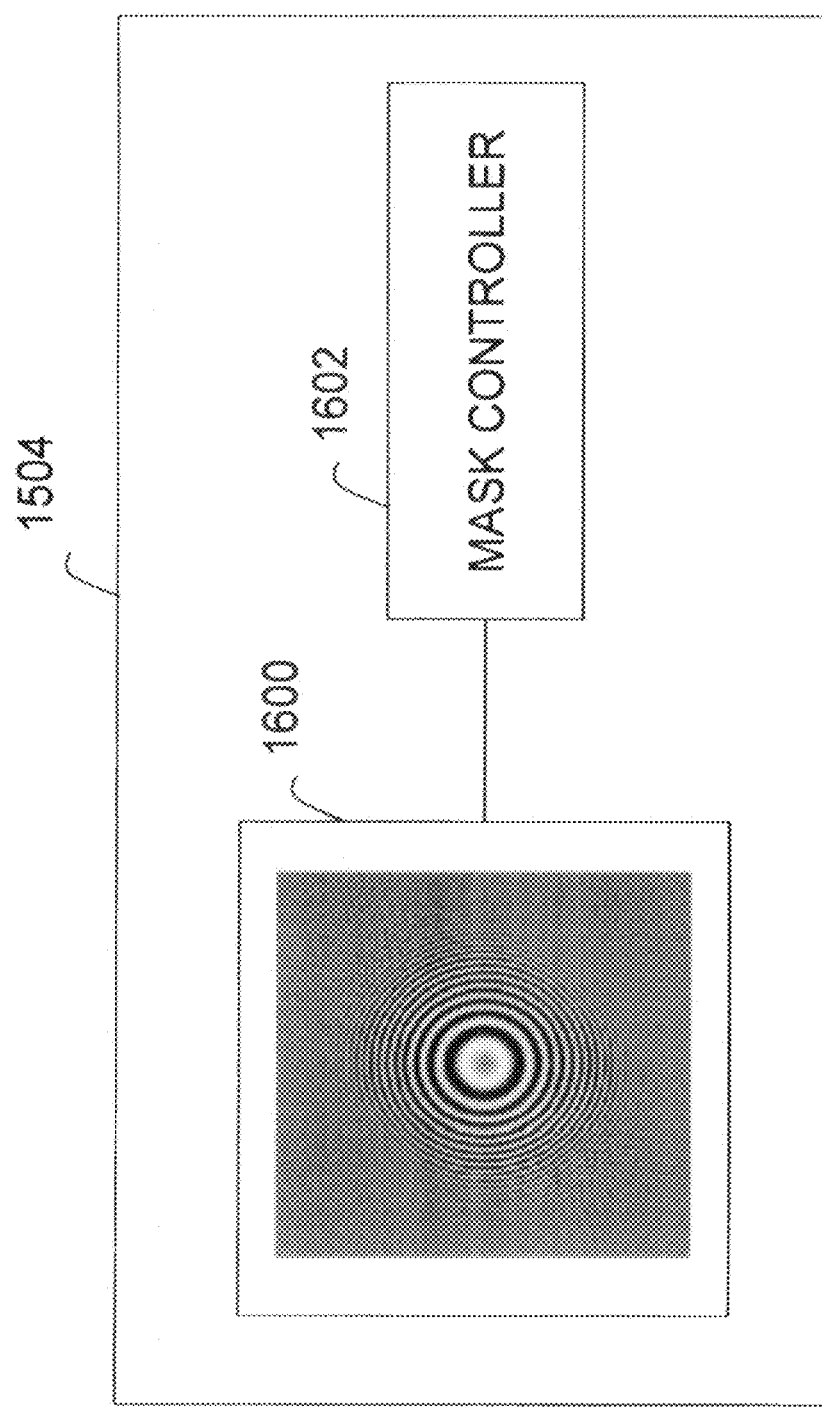
FIG. 16 is a block diagram of a controllable mask that includes a spatial light modulator under the control of a mask controller.

FIG. 16 is a block diagram of controllable mask 1504 that includes a spatial light modulator 1600 under the control of a mask controller 1602. The mask controller 1602 controls the mask controller 1602 to transform light according to complex transform functions $H_1$, $H_2$ and $H_3$ of Equation 4B, at times $t_1$, $t_2$ and $t_3$, as synchronized by the timing controller 1508. In an alternative embodiment, the mask controller 1602 may be eliminated and the spatial light modulator 1600 may be controlled directly by the timing controller 1508, or by another external device not shown (e.g., an external computer operated controller). Image capture assembly 1506, also under the control of timing controller 1508 captures three partial images at times $t_1$, $t_2$ and $t_3$ and combines the partial images to obtain geometric information for object 130, as described previously.

Figure 17:
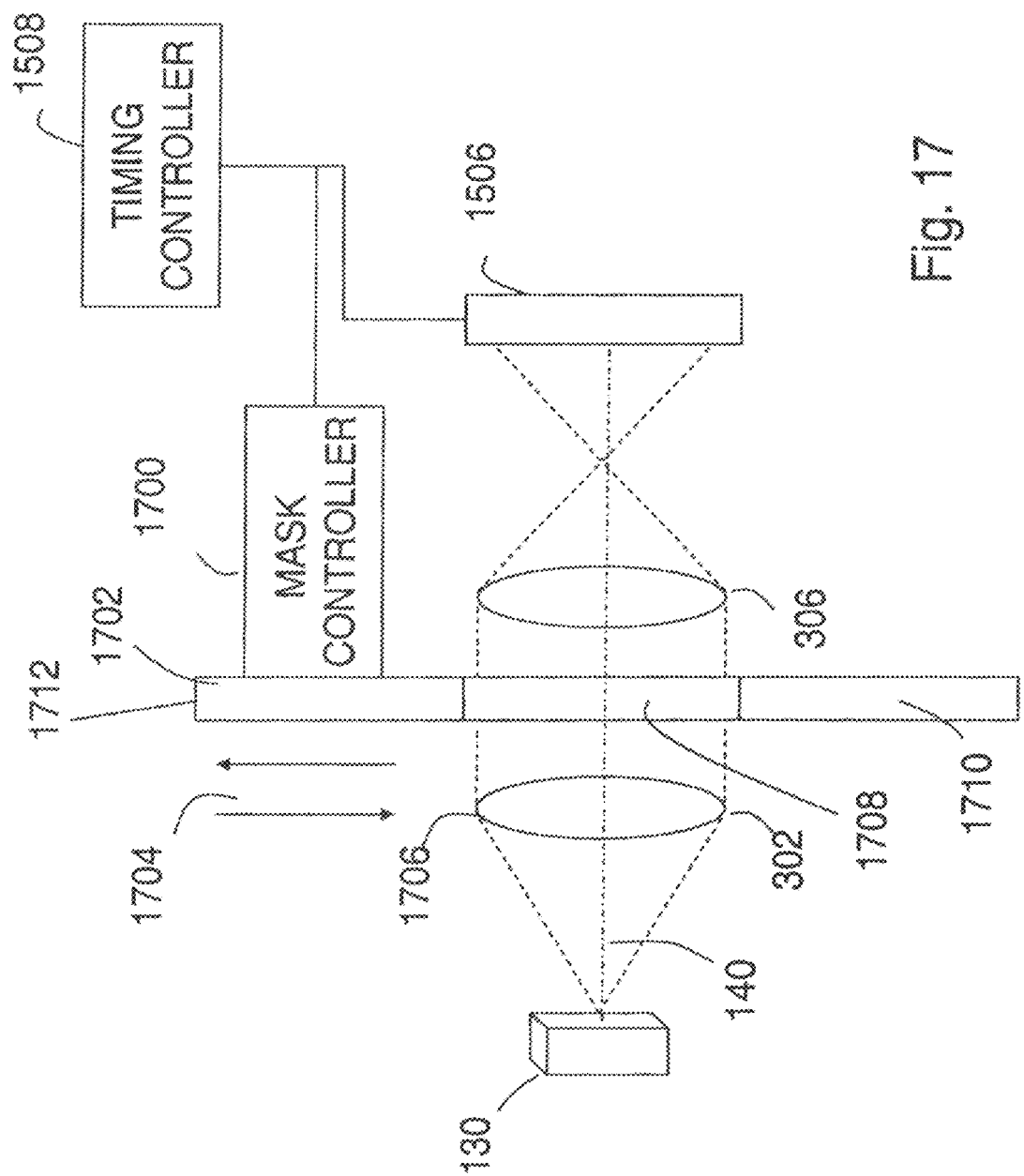
FIG. 17 is a block diagram of another embodiment of an optical apparatus in which the mask is varied over time.

FIG. 17 is a block diagram of another embodiment of an optical apparatus in which the mask is varied over time. In this embodiment, a mask controller 1700 controls a mechanical position of a multimask 1712. The multimask 1712 includes three masks 1702, 1708 and 1710 corresponding to the masks $H_1$, $H_2$ and $H_3$ according to Equation 4B. The mask controller moves the multimask 1712 in directions 1704 to place a corresponding mask between optical transforming assemblies 302 and 306 at times $t_1$, $t_2$, and $t_3$, under the control of timing controller 1508. Image capture assembly 1506, also under the control of timing controller 1508 captures three partial images at times $t_1$, $t_2$ and $t_3$ and combines the partial images to obtain geometric object information for object 130, as described previously. The multimask 1712 may include masks in a linear arrangement as shown in FIG. 17, or may include masks arranged in a radial arrangement, or any other suitable arrangement.

The three partial images may also be produced and captured simultaneously using an arrangement including three different optical assemblies having different masks and arranged to each receive a portion of the light received from the object.

Figure 18:
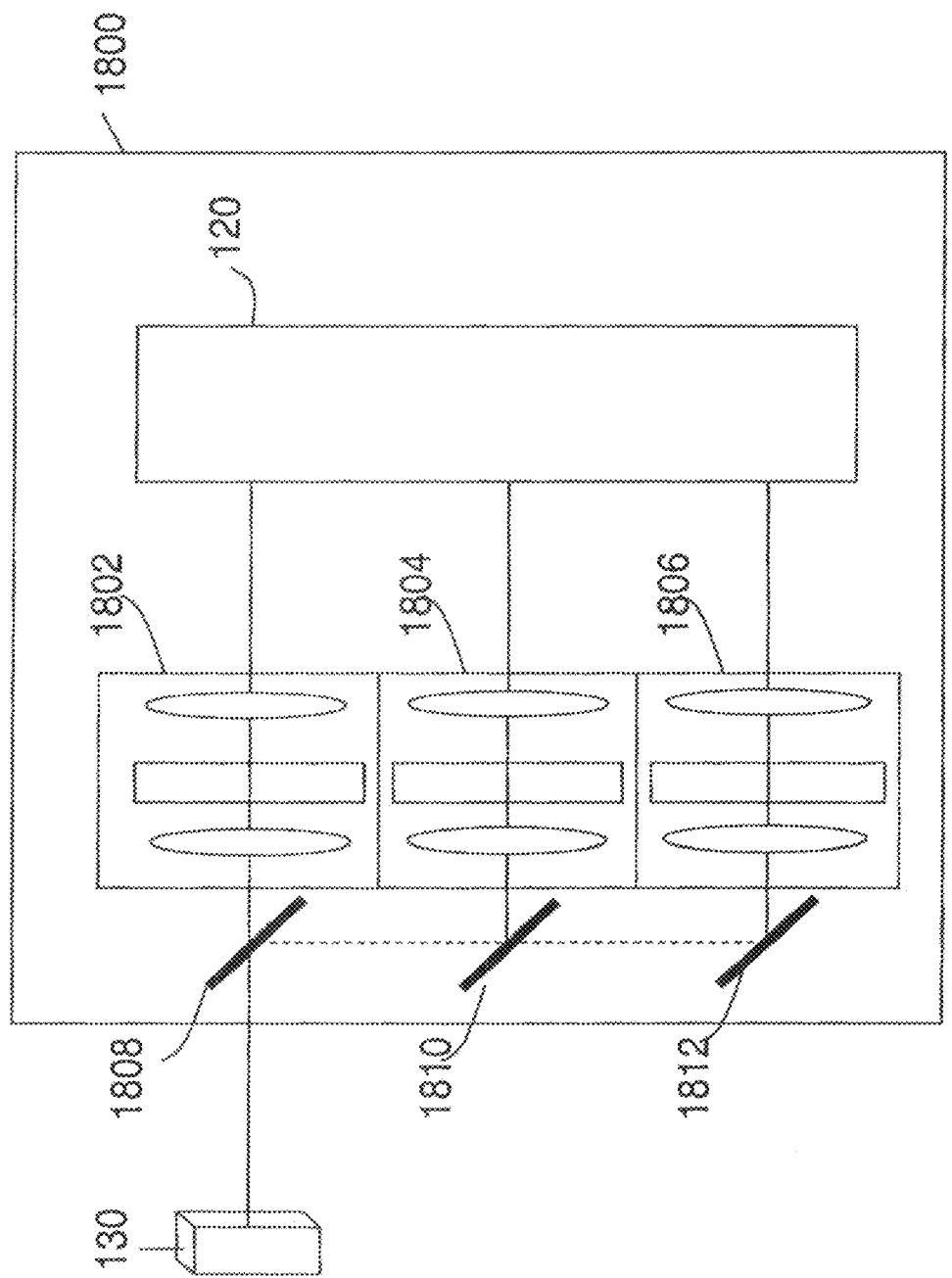
FIG. 18 is a block diagram of another embodiment of an optical apparatus.

FIG. 18 is a block diagram of an embodiment of an optical apparatus 1800 having optical assemblies 1802, 1804 and 1806 that are configured to each receive a portion of the received light from the object by an arrangement of partially transmissive and reflective mirrors 1808, 1810 and 1812 (e.g., "partially-silvered" mirrors). An image capture assembly 120, such as the embodiments shown in FIGS. 11A and 11B, captures and processes the received partial images as described above.

Although the embodiments are described using only transmissive optical elements (e.g., refractive lenses and transmissive masks) one of skill in the art will understand that the invention also includes alternative embodiments in which one or more of the optical elements may be replace with a corresponding reflective optical element, as desired.

FIG. 19 is an embodiment of an optical apparatus 1900 that is similar to optical apparatus 400 shown in FIG. 4. However, optical apparatus 1900 includes a reflective mask 1902 that is configured to reflect unmasked light, instead of transmitting the unmasked light as in mask 304. A beam splitter 1904 redirects the light reflected by mask 1902 to the second transforming optical assembly 306.

Figure 20B:
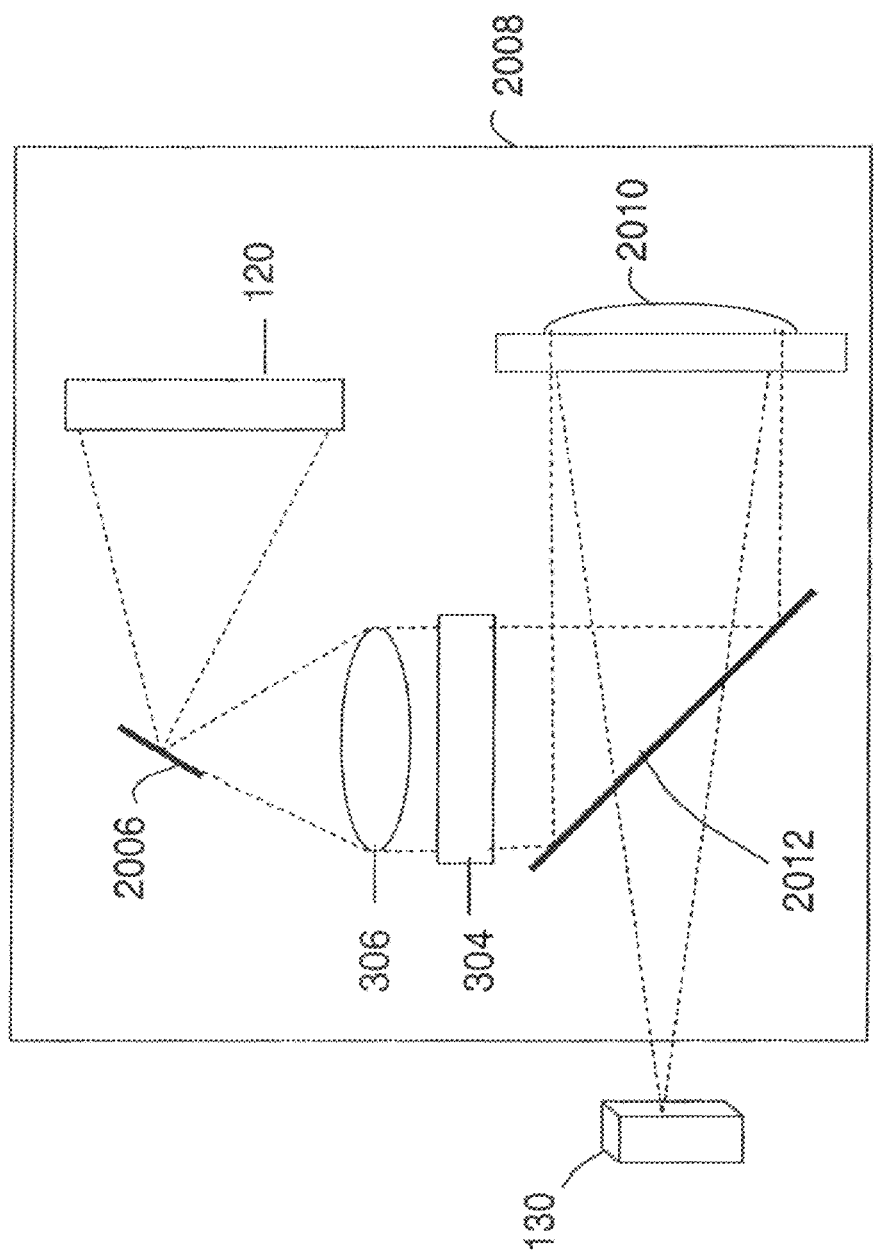
FIG. 20B is a block diagram of an embodiment of an optical apparatus having a first transforming optical assembly including a reflective optical assembly.

FIGS. 20A and 20B are block diagrams of embodiments of optical apparatuses 2000 and 2008, respectively, in which the first transforming optical assembly is implemented using a reflective optical assembly. In FIG. 20A, a beam splitter 2004 directs a light received from the object 130 to a reflective optical assembly 2002, which transforms the received light and reflects the transformed light towards mask 304 and second transforming optical assembly 306. In the present embodiment, light transmitted from the second transforming optical assembly is reflected to the image capture assembly 120 by a mirror 2006.

Similarly, in FIG. 20B, a reflective optical assembly 2010 receives a light from object 130, transforms the received light and reflects the transformed light to a beam splitter 2012 which directs the transformed light to mask 304, and so on.

Other arrangements of mirrors or beam splitters to conveniently direct light are also included in the present invention.

In the optical apparatus embodiments described above, when the electromagnetic radiation received from the object includes a wide bandwidth, it is possible to capture frequency information in the image capture assembly. Thus, it is possible for the image capture assembly to determine a corresponding electromagnetic radiation frequency or frequencies for each portion of the object. For example, when a white light is received at the optical assembly from the object, the image capture assembly may determine the color of each portion of the object from the image captured by the image capture assembly.

In addition, it may be possible to increase the resolution of the captured three-dimensional information by reducing the bandwidth of the received light. For example, the resolution of the captured three-dimensional information may be increased by limiting the bandwidth of the received light to those frequencies of light close to the color red. Such an increase in resolution may be obtained by filtering received or transmitted light in the optical assembly to have a reduced bandwidth using conventional filters, or by irradiating the object with a reduced bandwidth light source, using methods known by those of skill in the art.

However, images captured using a reduced light bandwidth may not include a sufficient level of information regarding the various colors of the received light, and therefore may not allow for the image capture assembly to determine colors of the object to a sufficiently high level of accuracy. Accordingly, other embodiments of the invention may include plural channels each configured to receive light and capture images within different portions of the electromagnetic spectrum, and them to combine the separately captured images to produce full spectrum three-dimensional information regarding the object.

Figure 21A:
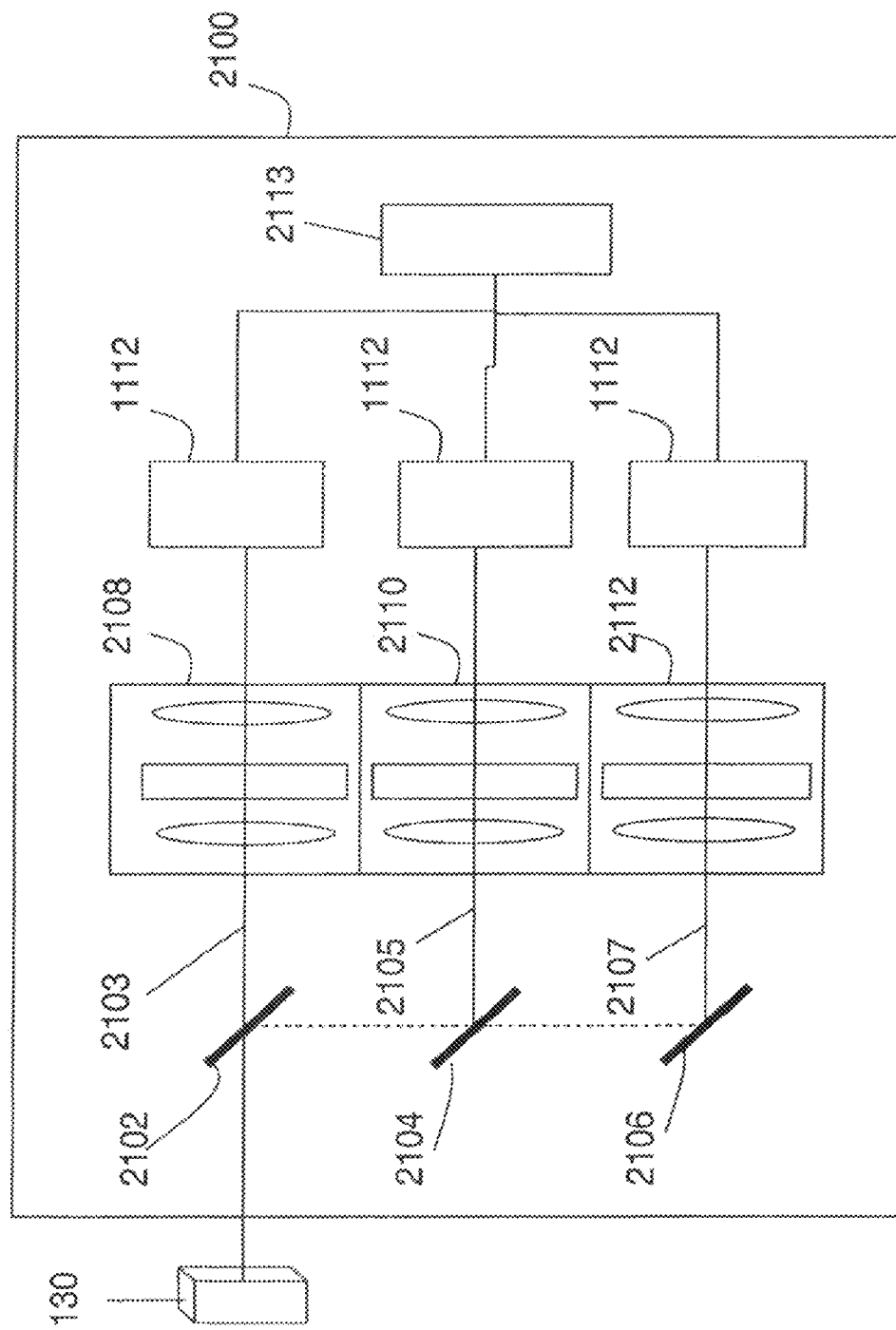
FIG. 21A is a block diagram of another embodiment of an optical apparatus.

FIG. 21A is a block diagram of optical apparatus 2100 that receives light from object 130. The received light is partitioned into three light portions 2103, 2105 and 2107 by light partitioning devices 2102, 2104 and 2106, respectively. The three light portions 2103, 2105 and 2107 each include a subset of the bandwidth of the received light. For example, light portion 2103 may include only light frequencies near the color red, light portion 2105 may include only light frequencies near the color green and light portion 2107 may include only light frequencies near the color blue. The light partitioning devices 2102, 2104 and 2106 may include any combination of dichroic mirrors, color filters, mirrors or other partially transmissive frequency filtering devices known to those of skill in the art.

The light portions 2103, 2105 and 2107 are received by optical assemblies 2108, 2110 and 2112, respectively, which each may be configured to transform the received light as described above. That is, each of the optical assemblies 2108, 2110 and 2112 may transform a light portion of the received light as described above (e.g., using three partial mask patterns or a time varying pattern), and transmit the transformed light to an image capture assembly 1112 that includes a separate light capture assembly for each of the three partial mask patterns, or to an image capture assembly 1100 (not shown) that includes a single light capture assembly configured to capture different images over time or different partial images within different regions of the assembly.

In addition, the optical apparatus 2100 includes an image combining apparatus 2113 configured to receive image data representing the images captured at image capture assemblies 1100 and combine the image data to produce combined broadband three-dimensional information regarding the object. For example, the optical apparatus 2100 may be able to capture full-color three-dimensional information with a higher resolution than the embodiments described above.

FIG. 21B is a block diagram of an optical apparatus 2126 that receives light from object 130 and separates the received light into three light portions 2115, 2117 and 2119 by light partitioning devices 2114, 2116 and 2118, respectively. The three light portions 2115, 2117 and 2119 each include the entire bandwidth of the received light. For example, if the received light includes a white light then each of the three light portions 2115, 2117 and 2119 also includes a white light. The light partitioning devices 2114, 2116 and 2118 may include any combination of polychromatic mirrors, beam splitters or wideband transmissive devices known to those of skill in the art.

The light portions 2115, 2117 and 2119 are received by optical assemblies 2120, 2122 and 2124, respectively, which each may be configured to transform the received light as described above. That is, each of the optical assemblies 2120, 2122 and 2124 may transform a light portion of the received light as described above (e.g., using three partial mask patterns or a time varying pattern).

Further, each of the optical assemblies 2120, 2122 and 2124 may be configured to selectively filter out some received light frequencies. For example, the optical assemblies may include conventional color filters (not shown) to filter out certain light colors. Further, the mask in each optical assembly may include light transforming regions having predetermined attenuation of received light frequencies, as described above with respect to FIG. 6A. That is, each transform region 614 may be configured to apply different amounts of amplitude reduction over different frequencies of the received light spectrum.

Each of the optical assemblies 2120, 2122 and 2124 transmits the transformed portion of received light to an image capture assembly 1112 that includes a separate light capture assembly or region of an assembly for each of the three partial mask patterns, or to an image capture assembly 1100 (not shown) that includes a single light capture assembly configured to capture different images over time or different partial images within different regions of the light capture assembly.

Although the embodiments of FIGS. 21A and 21B include received light that is separated into three portions, other embodiments in which light is separated into other numbers of portions are also included.

An incoherent correlator may equivalently be implemented with alternate optical apparatuses other than the lens/mask/lens arrangements described above. For example, by applying the well-known thin lens approximation for lenses, the incoherent correlator may be implemented with a single optical transforming element and a single mask, with either the mask or the optical transforming element arranged to first receive light from the object. In addition, the optical assembly 110 may be implemented using a single diffractive optical element. The equations 1-5 above therefore also apply to embodiments having a single transforming optical assembly and a mask, and embodiments having an optical assembly implemented using only a single diffractive optical element.

FIG. 22A is a block diagram of an example of an optical apparatus 2200 that is similar to the optical apparatus 400 shown in FIG. 4. However, the optical apparatus 2200 does not require a second transforming optical element. Instead light is received from the object 130 by optical transforming element 2202, which transforms the received light and transmits the transformed light. The transformed light is received by mask 2204 which selectively transmits a portion of the transformed light. Image capture assembly 120 receives and captures an image of the selectively transmitted light and obtains geometric information regarding object 130 from the captured image, as described above.

Figure 22B:
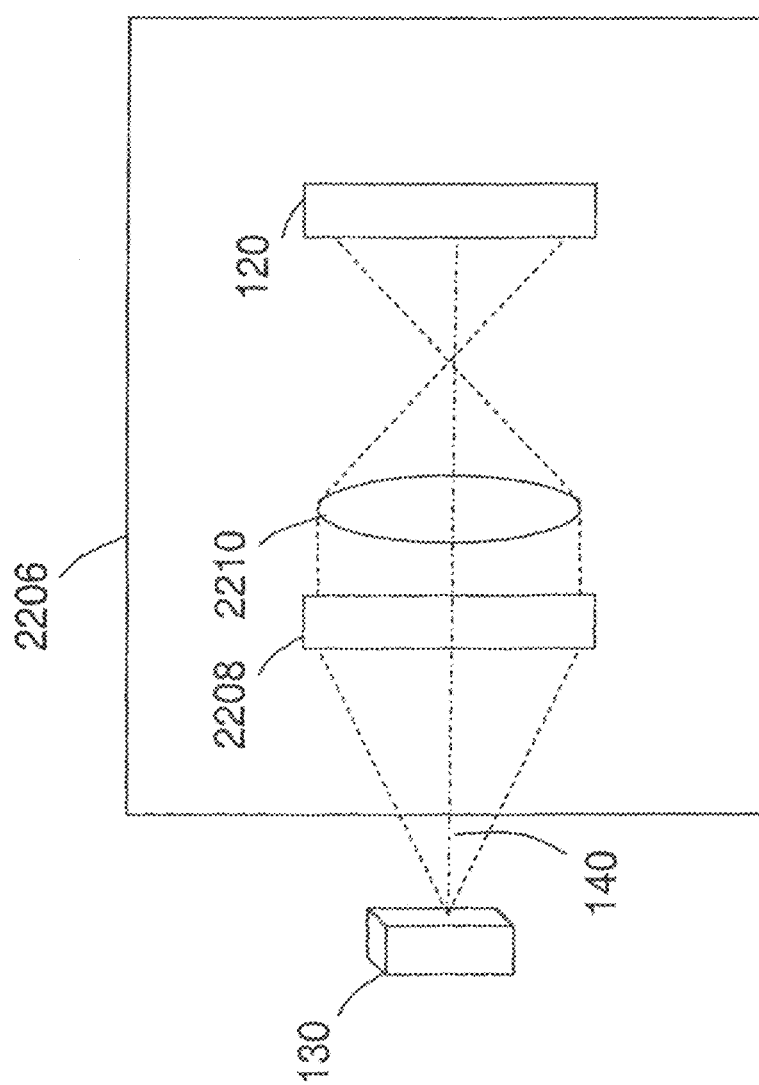
FIG. 22B is a block diagram of an example of an optical apparatus that does not require a first transforming optical element.

FIG. 22B shows an example of an optical apparatus 2206 that is similar to the optical apparatus 400 shown in FIG. 4. However, the optical apparatus 2206 does not require a first transforming optical element. Instead light is received from the object 130 by mask 2208 which selectively transmits a portion of the received light. The second optical transforming element 2210 receives the selectively transmitted light, transforms the received light and transmits the transformed light. Image capture assembly 120 receives and captures an image of the transformed light and obtains geometric information regarding object 130 from the captured image, as described above.

There may be a relatively high cost to manufacture optical assemblies having a conventional incoherent correlator structure. An alternative embodiment of the present invention the optical assembly may be implemented using a single diffractive optical element (DOE) in place of the incoherent correlator.

A single DOE may replace the incoherent correlator (e.g., incoherent correlator 300 including first and second transforming optical assemblies 302/306 and mask 304 in the embodiment shown in FIG. 4) described above. A DOE that is equivalent to the incoherent correlator is the product of the mask filter function and the transmission functions of the first and second transforming optical assemblies, $H_{DOE}$, defined as follows:

$$H_{DOE}(u, v) = \exp\left[\frac{-i2\pi}{\lambda f}(u^2 + v^2)\right] \quad (9A)$$

$$\iint h(x, y, 0)\exp\left[\frac{-i\pi}{\lambda f}(x^2 + y^2)\right]\exp\left[\frac{i2\pi}{\lambda f}(xu + vy)\right]dxdy$$

where f is the focal length of the first and second transforming optical assemblies included in the DOE, h(x,y,0) is given above in Equation 3, and other parameters are as described with respect to Equation 4.

Further, the focal lengths of the lenses are not required to be the same. When the focal lengths are different, the $H_{DOE}$, is defined as follows:

$$H_{DOE}(u, v) = \exp\left[\frac{-i\pi(f_1 + f_2)}{\lambda f_1 f_2}(u^2 + v^2)\right] \quad (9B)$$

$$\iint h(x, y, 0)\exp\left[\frac{-i\pi}{\lambda f_2}(x^2 + y^2)\right]\exp\left[\frac{i2\pi}{\lambda f_2}(xu + vy)\right]dxdy$$

Note that although Equations 9A and 9B do not include literal P function terms, $p_o(x,y)$ is part of h(x,y,0), and when the integral in Equations 9A and 9B are solved, the convolution with P(u,v) is obtained.

FIG. 22C is a block diagram of an example of an optical apparatus 2212 that is similar to the optical apparatus 400 shown in FIG. 4. However, the optical apparatus 2212 does not require first and second transforming optical elements. Instead light is received from the object 130 by mask 2214 which transmits light based on a complex transformation of the received light. Mask 2214 may be implemented using only a single diffractive optical element, as described above. Image capture assembly 120 receives and captures an image of the transformed light and obtains geometric information regarding object 130 from the captured image, as described above.

Figure 23:
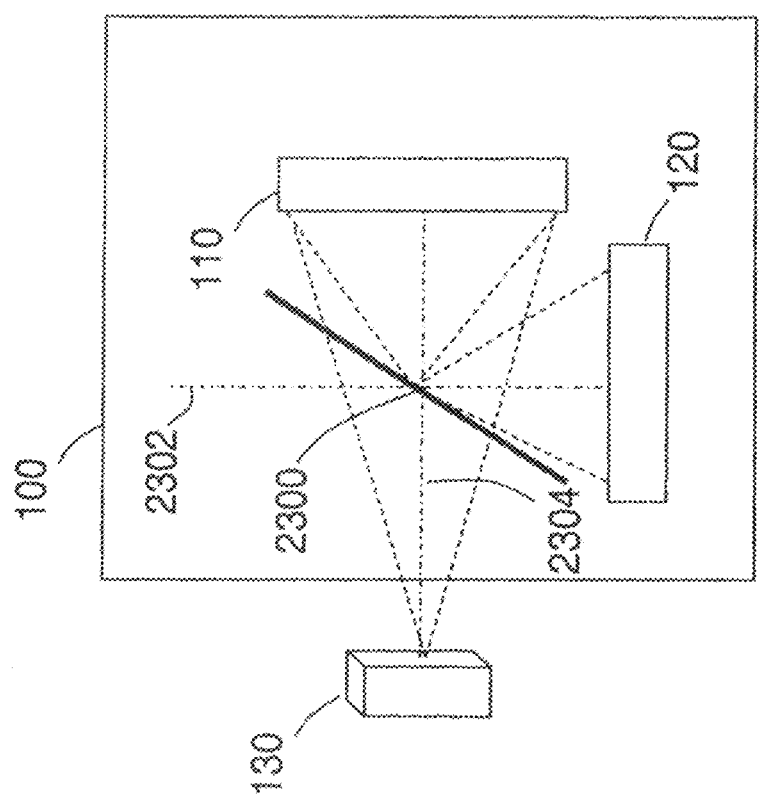
FIG. 23 is a block diagram of an embodiment of an optical apparatus including a reflective type diffractive optical element.

FIG. 23 is a block diagram of an embodiment of optical apparatus 100 in which the optical element 110 includes a reflective type diffractive optical element, for example, such as the diffractive optical elements shown in FIGS. 5F and 5G. In this embodiment, the optical apparatus 100 receives a light from object 130 along a receiving optical axis 2304. The optical apparatus 100 transforms and reflects the received light to produce a transmitted light transmitted back along optical axis 2302. The transmitted light is reflected by a beam splitter 2300 to an image capture assembly 120 located along a capturing optical axis 2302 of the optical apparatus. In the present embodiment, capturing optical axis 2302 is arranged at an angle of approximately 90 degrees from the receiving optical axis 2304. However, other angles between the receiving and capturing optical axes are also included in the invention.

With only two optical axes, the current embodiment may advantageously reduce a size of the optical assembly 100, while exhibiting less sensitivity to axial variations than in conventional holography systems.

An objective-side optical assembly, such as an objective lens, a zoom lens, a macro lens, a microscope, a telescope, a prism, a filter, a monochromatic filter, a dichroic filter, a complex objective lens, a wide-angle lens, a camera, a pin-hole, a light slit, a mirror, or any other optical assembly may be placed between the optical assembly and the object to collimate, focus, invert or otherwise modify the light from the object, prior to the light being received at the optical assembly. Such an arrangement may advantageously allow light from objects or portions of objects to be received, when it would not be possible or practical to receive that light without the inclusion of the objective-side optical assembly.

Further, an objective-side optical assembly may include refractive or diffractive optical elements configured to at least partially cancel any disadvantageous wavelength dispersal effects that may be caused by the optical apparatus 100, as described by Goodman, "Introduction to Fourier Optics," 3rd Ed., Roberts & Company Publishers, 2005, at p. 212, incorporated herein by reference.

Figure 24A:
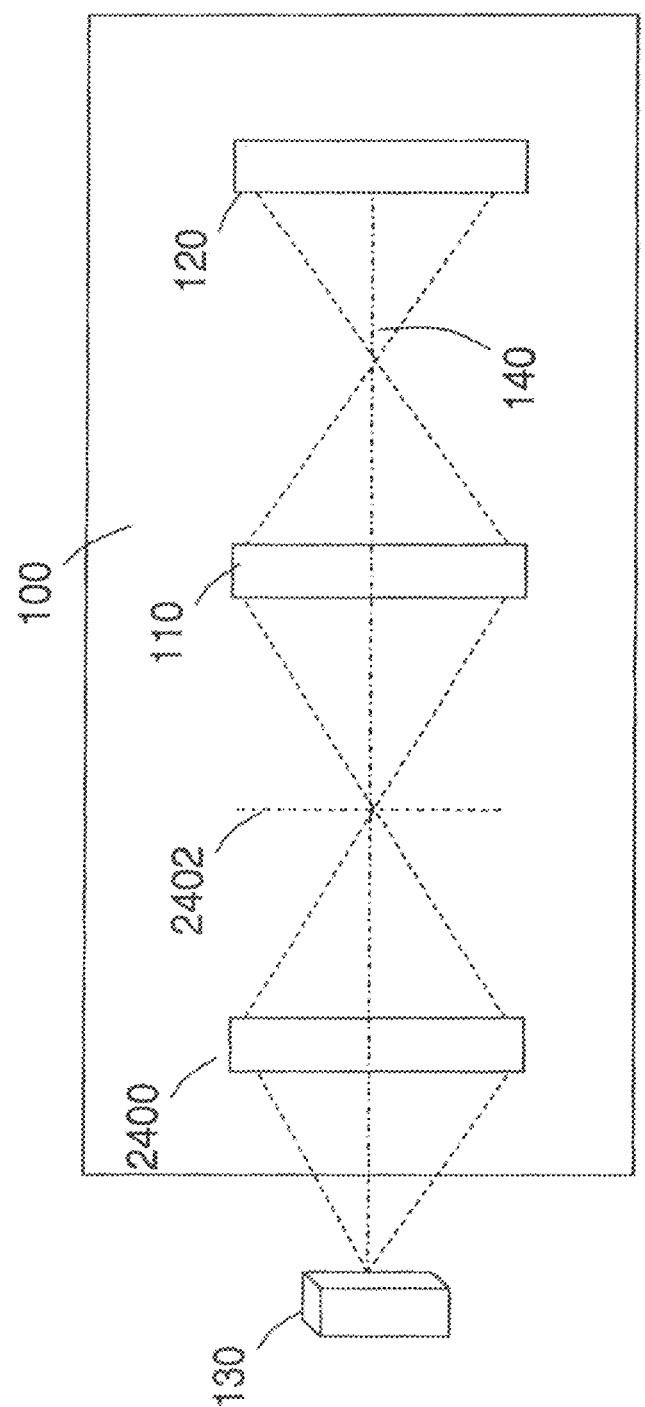
FIG. 24A is a block diagram of another embodiment of an optical apparatus.

FIG. 24A shows an alternative embodiment including the features of the embodiment in FIG. 1, as well as an objective-side optical assembly 2400 that receives light from the object and transmits a received light to the optical assembly 110. The objective-side optical assembly 2400 in the present embodiment includes a magnifying refracting objective lens that produces a magnified image of the object 130 centered on an image plane 2402. Thus, the present embodiment may capture more detailed geometric information regarding a magnified portion of the object.

The present invention may also operate in conjunction with an existing sensor-less camera, which is understood herein to be any camera from which the existing digital light sensor (e.g., CMOS device or CCD) or light sensitive capture medium (e.g., film and film transport mechanism) has been removed, or moved away from the image plane of the camera to allow an apparatus according to the present invention to be used with the remaining optical and mechanical components of the camera. For example, film, film transport mechanisms and the rear cover of an existing 35 mm film camera may be removed and replaced with an optical assembly and image capture device according to the present invention, thereby making the existing camera capable of capturing three-dimensional information. Such an arrangement advantageously allows the present invention to conveniently take advantage of and operate with existing photographic lenses, shutter systems and aperture control systems of existing cameras.

Figure 24B:
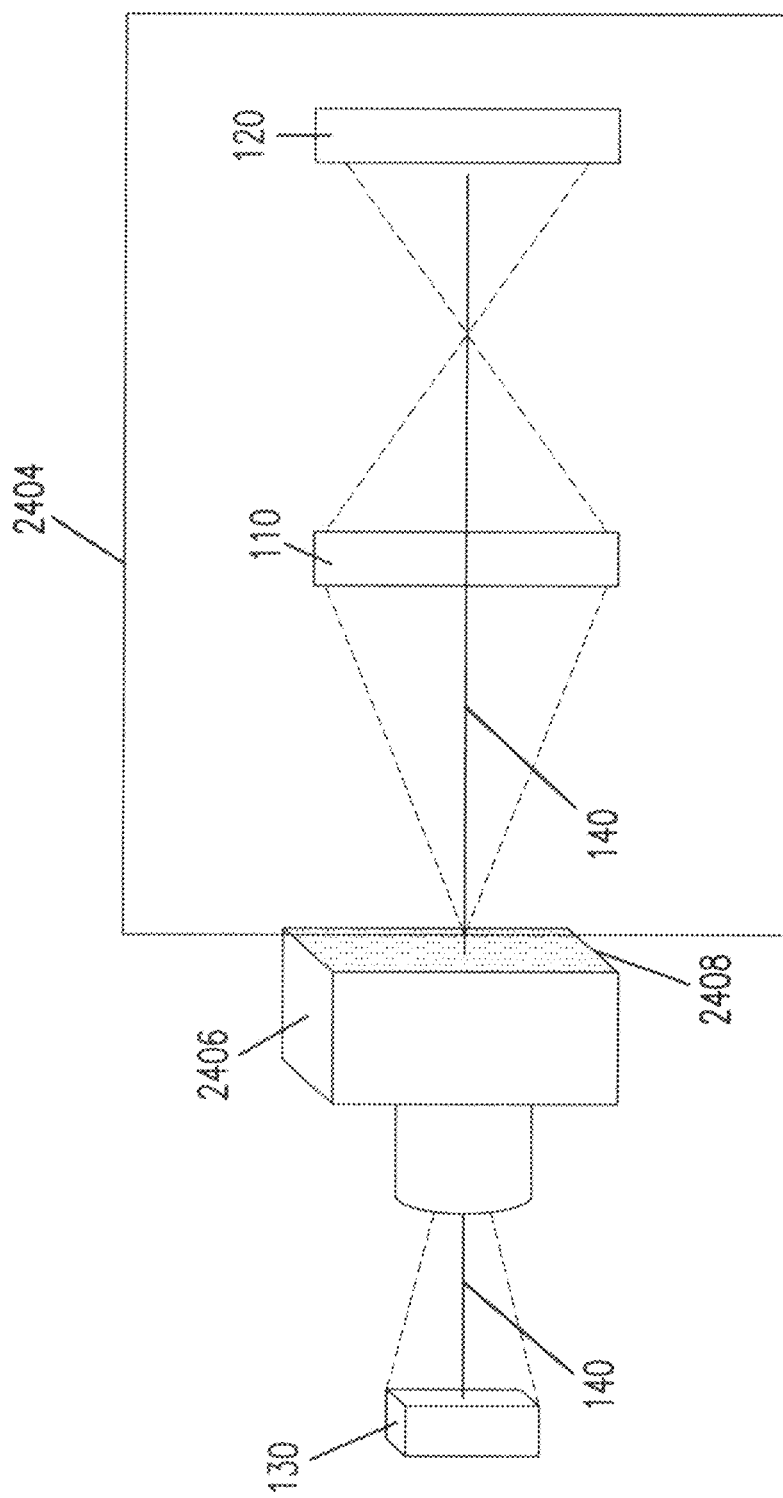
FIG. 24B is a block diagram of another embodiment of an optical apparatus.

FIG. 24B shows an example of an embodiment of an optical apparatus 2404 including features similar to the optical apparatus 100 shown in FIG. 1. In addition, the optical apparatus 2404 is configured to operate with an existing sensor-less camera 2406, which receives light from the object 130 along an optical axis 140, and manipulates the light using conventional camera features (e.g., lens, ground glass focusing screen, shutter and aperture of the existing camera) to produce an image of the object centered at image plane 2408. The optical apparatus 2404 includes a chassis having mechanical and electrical attachment features suitable for coupling the optical apparatus 2404 to a portion of the existing sensor-less camera 2406 near the image plane produced by the optics of the existing sensor-less camera 2406 (e.g., as a replaceable "3D back" of the camera). The optical assembly 110 receives light from the image of the object at the image plane 2408 and transmits a transformed light, which may be received, captured and processed to extract three-dimensional information of an object by the image capture assembly 120, as described above.

The present invention may also operate in conjunction with an existing camera. In particular, the optical assembly in the embodiment described herein may be used in conjunction with a conventional digital or film camera to illuminate the image plane of the conventional camera with a Fresnel hologram or partial Fresnel holograms of the observed object. The conventional camera may be used to capture an image of the hologram fringe patterns using the corresponding conventional means (e.g., light sensitive film or digital sensor), and image data corresponding to the fringe patterns may be converted into three-dimensional data of the object using a general purpose computer.

The invention is not limited to a single DOE that includes a transmission function based on a linear combination of three transmission functions each having a Fourier transforms of a FZP. On the other hand, the invention also includes receiving a portion of the light from the object at each of three DOEs, which produce three partial images that are combined.

FIG. 25 shows a block diagram of an embodiment of an optical apparatus 2500 including partially reflective and transmissive mirrors 1808, 1810 and 1812 that direct a light received from object 130 to each of three diffractive optical elements 2502, 2504 and 2506, respectively, which each perform a transforming function including a Fourier transform of a FZP. The image capture assembly 2508 extracts three-dimensional information from an image of the light transmitted by the diffractive optical elements, similar to the manner described above.

In addition, alternative embodiments of the optical assembly 110 may consist of a single SLM as shown in FIG. 6F or one or more SLMs as shown in FIG. 6G.

Further, the invention is not restricted only to using three mask patterns to produce three partial hologram images that are combined. The invention also includes using an off-axis holographic method that employs a single off-axis hologram instead of three masks.

During reconstruction of an image from an off axis hologram each term is diffracted toward a different direction and therefore a desired angular separation can be achieved even from a single hologram, by taking advantage of the fact that angular separation in diffraction theory is directly translated to a spatial frequency separation. This characteristic may be exploited based on the idea that, when performing a convolution between functions f and g, it is equivalent to transform f and g to the frequency domain by a Fourier transform to obtain functions F and G, obtain a product of F and G, and transform the product back by an inverse Fourier transform. Thus, an optical apparatus that shifts a spatial frequency spectrum of a received light may be advantageously used to create a Fresnel hologram.

An optical apparatus that produces an off-axis Fresnel Zone Pattern (OAFZP) in response to point input light source can be used to convolve a received light rather than the FZPs in the embodiments above, and convolution using the OAFZP based assembly will allow for a convenient separation of terms in the frequency domain.

Figure 26:
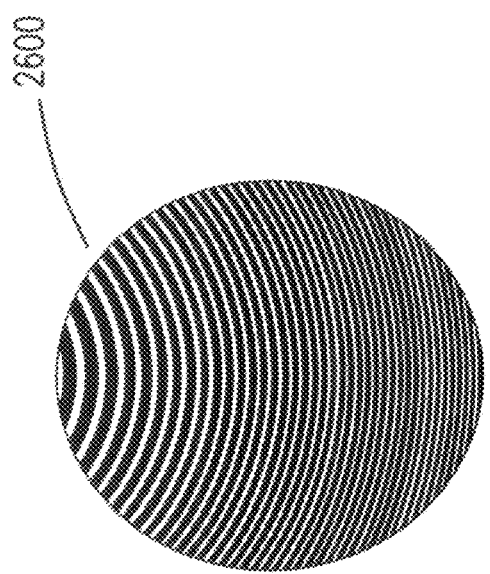
FIG. 26 is an example of an off-axis Fresnel Zone Pattern.

FIG. 26 shows an example of an OAFZP 2600.

To synthesize the off-axis FZP we may introduce a linear phase term to the equation for the on-axis FZPs described above, to result in the following OAFZP transformation function $$h(x, y, z) = p_z(x, y) \left\{ \frac{1}{\sqrt{2}} \exp\left[ \frac{i\pi(x^2 + y^2)}{2\lambda\Delta(z)} + \frac{i2\pi(\alpha x + \beta y)}{\lambda} \right] + \frac{1}{\sqrt{2}} \exp\left[ \frac{-i\pi(x^2 + y^2)}{2\lambda\Delta(z)} - \frac{i2\pi(\alpha x + \beta y)}{\lambda} \right] \right\} \quad (10)$$

Further, it is not necessary to use a mask or a spatial light modulator to create such an OAFZP producing optical assembly. Alternatively, an arrangement of at least two lenses each shifted away from an optical axis of an image plane and arranged so that their focal points are at different distances from an image plane may be used to produce an OAFZP.

Figure 27:
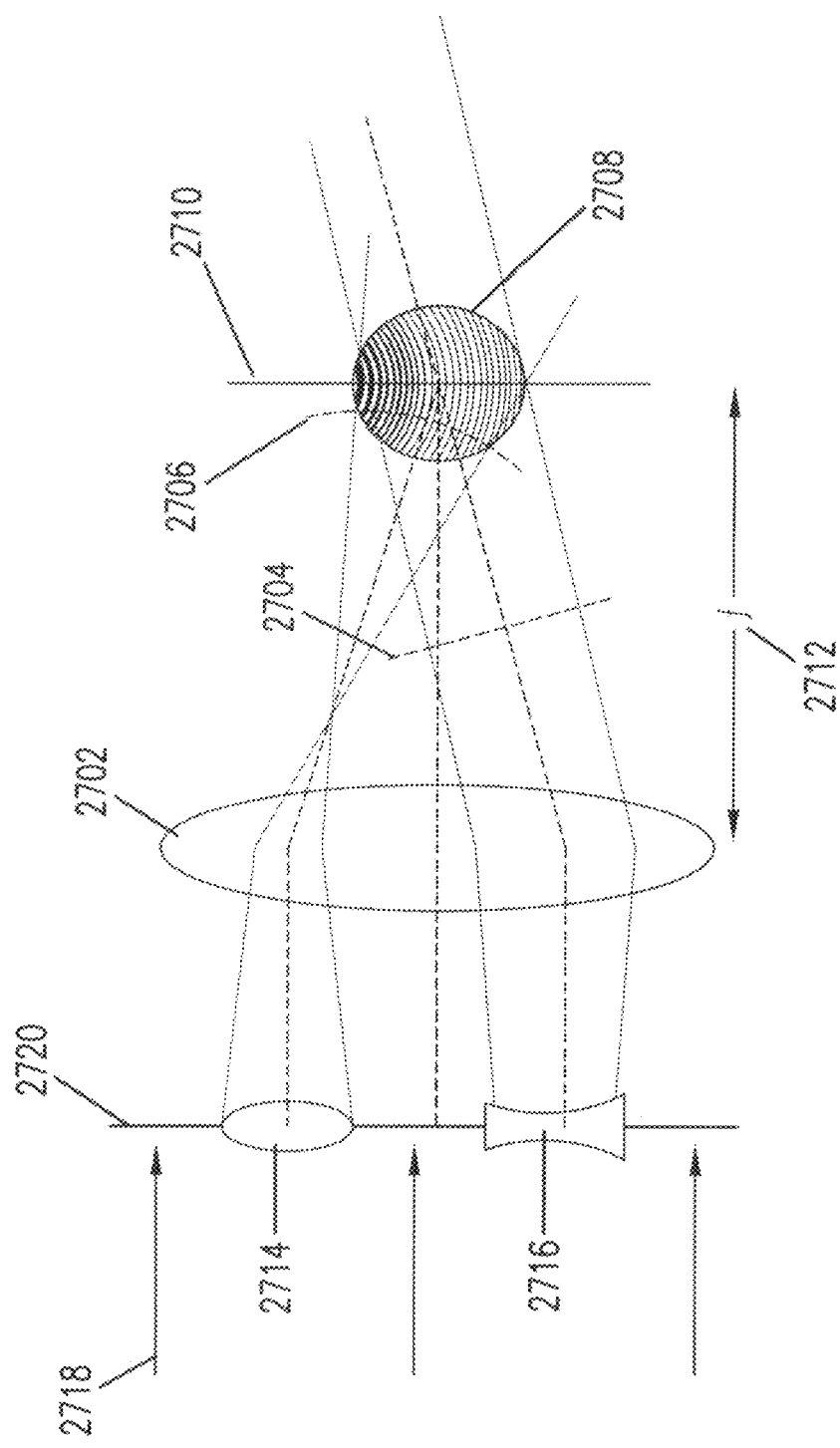
FIG. 27 is a block diagram of a portion of an optical apparatus including a composite mask having lenses.
Figure 28:
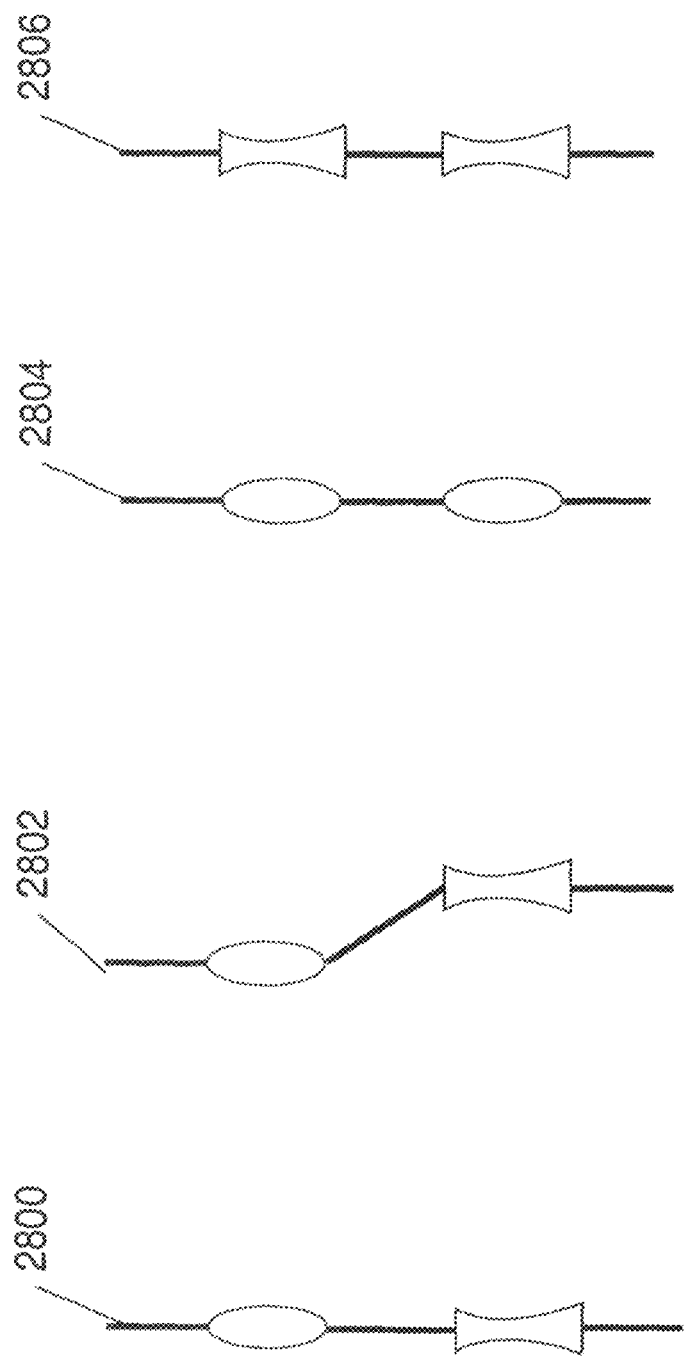
FIG. 28A is a side view of an embodiment of a composite mask.
FIG. 28B is a side view of another embodiment of a composite mask.
FIG. 28C is a side view of another embodiment of a composite mask.
FIG. 28D is a side view of another embodiment of a composite mask.

FIG. 27 is a block diagram of a portion of an optical apparatus including a composite mask 2720 having lenses 2714 and 2716. Light 2718 is received and refracted by lenses 2714 and 2716 towards lens 2702 having focal length f 2712. In this example, lenses 2714 and 2716 are configured to have different focal lengths. Spherical waves 2706 and 2704 produced by lenses 2714 and 2716, respectively, interfere with each other to produce OAFZP 2708 at image plane 2710.

Although the example of FIG. 27 includes convex and concave lenses, the invention includes any combination or permutation of convex and/or concave lenses. Further, the lenses may have different focal lengths, and be arranged in a same plane, as shown in FIG. 27, or alternatively, the lenses may have the same or different focal lengths and be arranged in different planes.

FIGS. 28A-D show examples of composite masks 2800, 2802, 2804 and 2806. Further, although the lenses shown in the composite mask examples described above are round lenses that cover only a portion of the composite mask plane or planes, the invention also includes other shaped lenses (e.g., cylindrical lenses) covering a portion or the entirety of the composite mask plane or planes. In addition, the invention includes replacing one or both of the lenses in the composite mask with a corresponding diffractive optical element, or with a FZP.

Therefore, a composite mask that produces a single off-axis FZP may replace the masks or diffractive optical elements based on Fourier transforms of FZPs in any of the optical apparatuses described above. However, to achieve further separation of terms in the frequency domain a pattern of lines may be projected on the object, or an optical grating having an appropriate spatial frequency may be placed between the object and the image capture plane to add a pattern of lines to the image of the object.

Figure 29:
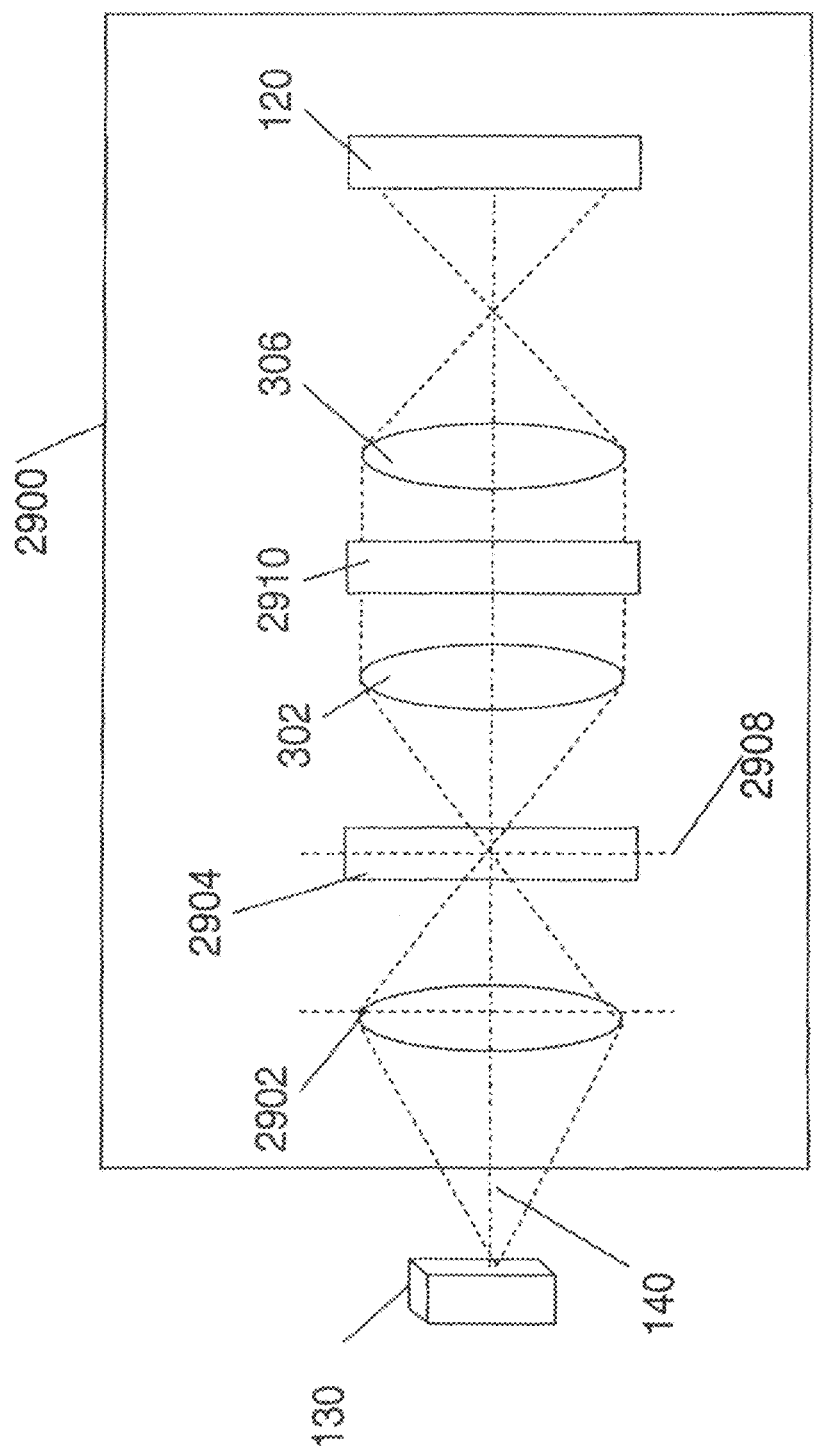
FIG. 29 is a block diagram of another embodiment of an optical apparatus.

FIG. 29 is a block diagram of an embodiment of an optical apparatus 2900 that is configured to receive light from object 130 and extract three-dimensional information about object 130 from the received light. Optical apparatus 2900 includes an objective optical assembly 2902 that receives light from object 130 along an optical axis 140. The objective optical assembly 2902 produces an image of the object 130 at an image plane 2908. A grating 2904, located on the image plane 2908, adds a pattern of lines to the image of the object 130 which propagates to first transforming lens 302. Further, the optical apparatus 2900 includes a composite mask 2910 which transforms the light received from the first transforming lens 302, and transmits a transformed light. Second transforming lens 306 receives the transformed light and transmits a further transformed light, and image capture assembly 120 captures an image of the light and extracts three-dimensional information from the captured image, as described above.

FIG. 30 is a detailed view of an embodiment of grating 2904 that includes low transmissivity regions 3002 and high transmissivity regions 3000. A width 3006 of the low transmissivity regions 3002, and a width 3004 of the high transmissivity regions 3000 are selected so that contrasting dark and light areas are observable in the resulting image at the image capture device 120. Gratings including variable widths of high and low transmissive regions may also be used.

As discussed above, the pattern of lines may also be applied to the light illuminating the object or to the light received from the object. For example, light illuminating the object may pass through a lined transparency configured to produce shadow lines on the object.

FIG. 31A is a block diagram of an embodiment of an optical apparatus 3100 that may be used with a lined transparency 3102 to obtain three-dimensional information of an object 130. Light from light source 150 is shadowed by lines on the lined transparency 3102 to produce lined illumination on object 130. The lined illumination reflects from the object 130 and is received by the first transforming lens 302 in the optical apparatus 3100. Further, the optical apparatus 3100 includes a composite mask 2910 which transforms the light received from the first transforming lens 302, and transmits a transformed light. Second transforming lens 306 receives the transformed light and transmits a further transformed light, and image capture assembly 120 captures an image of the light and extracts three-dimensional information from the captured image, as described above.

Alternatively, it is not necessary to use the grating 2904. Instead, the light coming from the object may be split into two beams, each of which is transferred by a different off-axis lens toward a different portion of the filter. The filter and the system beyond the plane of the filter are similar to corresponding portions of the previous embodiments described in FIGS. 27, 29 and 31A.

Figure 31B:
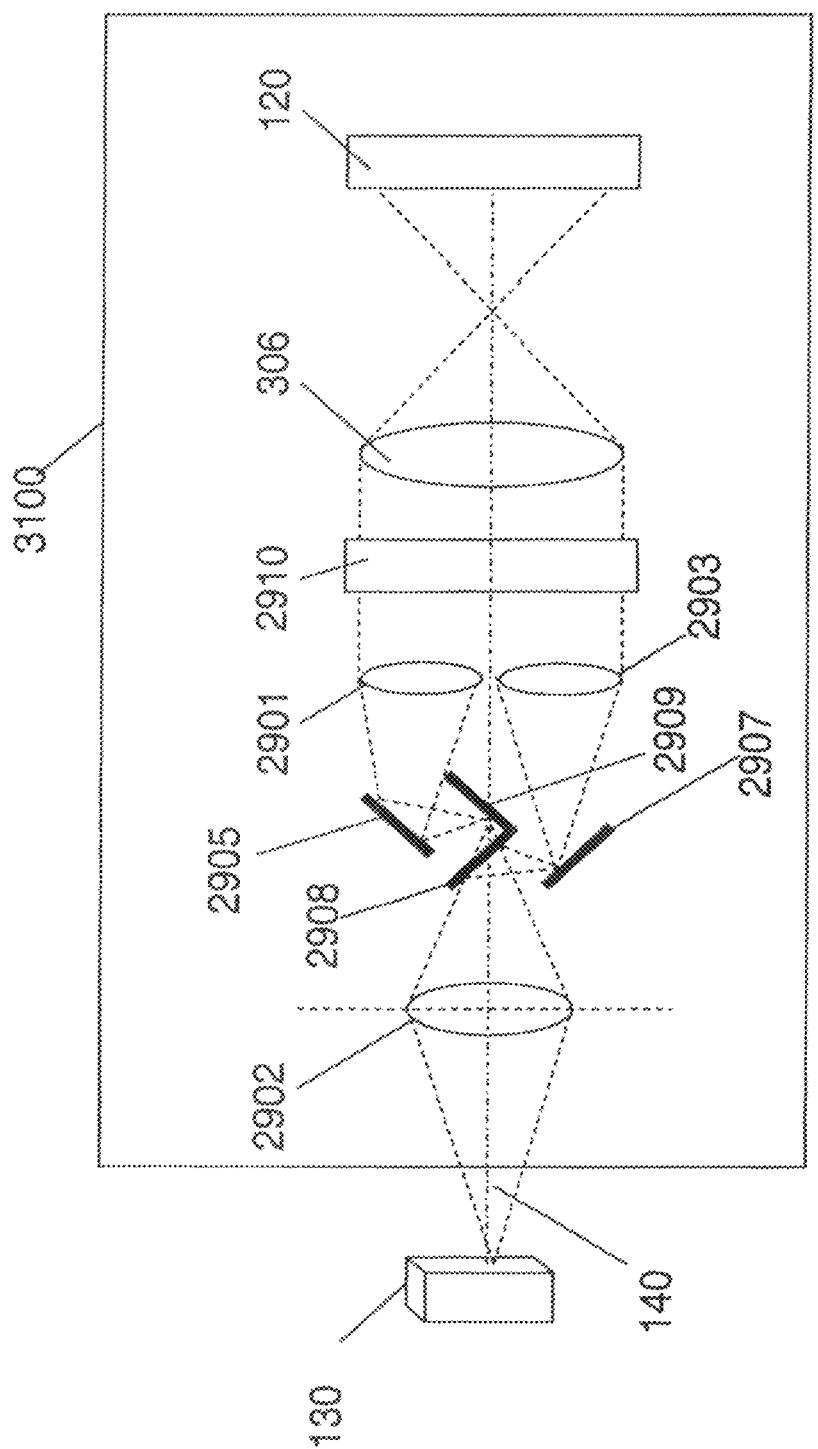
FIG. 31B is a block diagram of another embodiment of an optical apparatus.

FIG. 31B is a block diagram of an embodiment of an optical apparatus 3100 that includes two off-axis lenses 2901 and 2903 and is configured to obtain three-dimensional information of an object 130. Optical apparatus 3100 includes an objective optical assembly 2902 that receives light from object 130 along an optical axis 140. Beam splitter 2908 and mirror 2909 transmit portions of the received light to mirrors 2907 and 2905, respectively. The light reflected from mirrors 2905 and 2907 propagates to first transforming lenses 2901 and 2903, respectively. Further, the optical apparatus 3100 includes a composite mask 2910 which transforms the light received from the first transforming lenses 2901 and 2903, and transmits a transformed light. Second transforming lens 306 receives the transformed light and transmits a further transformed light, and image capture assembly 120 captures an image of the light and extracts three-dimensional information from the captured image, as described above.

One of skill in the art will understand that the optical apparatuses described above are not limited to capturing only reflected sunlight, but may also determine the shape and distance of object portions that do not reflect light but instead emit a fluorescent light, a black body radiation, a chemiluminescent light or other light produced by the object, or objects that reflect or scatter light from sources other than the sun. In addition, an optical apparatus, according to the present embodiment, is not limited to capturing only the external shape and distance of objects, but may also capture information regarding internal portions of an object that radiate (i.e., reflect or fluoresce) light from an internal portion through a transparent or translucent surface of the object to the optical apparatus.

The present invention is also not limited to capturing geometric information regarding an object using a Cartesian coordinate system (e.g., x, y, z), but also includes capturing geometric information using any other coordinate system that may fully describe the shape, size and location of the object, such as a three-dimensional polar coordinate system (e.g., $\phi$, $\theta$, r), an earth referenced coordinate system such as the global coordinate system (e.g., latitude, longitude, elevation), a coordinate system incorporating an ellipsoid earth model reference system such as WGS-84, an earth centered earth fixed Cartesian coordinate system (ECEF) (e.g., x, y, z), Universal Transverse Mercator (UTM), Military Grid Reference System (MGRS), or World Geographic Reference System (GEOREF), etc. . . . . . Further, although Cartesian type measurement terms such as "vertical," "horizontal" and "range" are used throughout the present description, those terms are intended to also include corresponding measurement terms in other reference systems, but which are omitted from the description herein for reasons of clarity and brevity.

The use of the apparatuses is not limited to the field of three-dimensional imaging, but also includes uses in pattern recognition, target acquisition, and object identification, etc. . . . performed in three-dimensional space, for example as described in Y. Li and J. Rosen, "Object recognition using three-dimensional optical quasi-correlation," JOSA A 19, 1755-1762 (2002), incorporated herein by reference.

Advantages of the present invention may make embodiments of the invention suitable for three-dimensional imaging applications that are impossible or impractical without the present invention. For example, the present invention may be applied to capturing three-dimensional movies/ video/television images, performing three-dimensional object recognition for moving objects or stationary objects from a moving or stationary platform (e.g., military targeting applications, robotic sensing applications, autonomous aid to vision impaired users, etc. . . . ), autonomous navigation and safety functions (e.g., automatically guide an automobile to stay on a road and avoid collisions with moving and stationary objects), weather sensing (e.g., capture three-dimensional information regarding clouds or air masses detected with radar, visible light, or infrared and/or ultraviolet light, etc. . . . ), security functions (e.g., monitor locations and identity objects in a room, monitor identities and locations of people in a building, three-dimensional synthetic radar, etc. . . . ), and three-dimensional environmental mapping for virtual reality simulation (e.g., create three-dimensional model of tourist destination for virtual visit), or three-dimensional models of environments that are difficult or impossible to observe directly (e.g., internal body cavities, microscopic environments, hazardous environments, extraterrestrial environments, underground or sea environments, remote environments, etc. . . . ).

Although examples described above deal with optical components and visible light, the present invention also applies to receiving other forms of electromagnetic radiation from an object and determining three-dimensional information of the object based on the received electromagnetic radiation, such as x-ray radiation, microwave radiation, radio frequency radiation, and ultraviolet and infrared light. For example, embodiments of the invention described above may be modified to replace optical components (e.g., lenses, mirrors, diffractive optical elements, SLMs) with corresponding x-ray components, such as are known in the art and as described in i) U.S. Pat. No. 6,385,291 to Takami, ii) Pereira et al., "Lithium x-ray refractive lenses," Proc. SPIE 4502, 173 (2001)., and iii) Beguiristain et al., "Compound x-ray refractive lenses made of polyimide," Proc. SPIE, vol. 4144, pp. 155-164, each of which is incorporated herein by reference.

Further, for example, the present invention may be applicable as a replacement for existing x-ray imaging systems (e.g., CT scanners). As the present approach does not require any moving parts, x-ray imaging done using an embodiment of the present invention advantageously may produce a scan more reliably, with higher resolution, greater speed and less total radiation exposure to the patient.

Each of the embodiments described above may be modified to replace optical elements with equivalent x-ray elements known to those of skill in the art to produce three-dimensional information based on a received x-ray radiation from an object (i.e., a three-dimensional x-ray image). For example, the present invention may be applicable as a replacement for existing electron microscope technology.

Further the invention also applies to other forms of propagating energy waves, such as sound waves and may be applied to produce three-dimension object information using passive or active sonar.

Coherent light, which propagates according to the paraxial approximation, is described mathematically as a convolution between an input aperture and a quadratic phase function with an appropriate parameter in a denominator of an exponent power indicating a propagation distance of the wave from the input aperture. Thus, the complex amplitude (i.e., the electrical field) distribution O(x,y) on some transversal plane, in a distance z from the input plane, may be given (in the Fresnel approximation) by $$O(x, y) = \iint S(x', y')\exp\left\{\frac{i\pi}{\lambda z}[(x-x')^2 + (y-y')^2]\right\}dx'dy' \quad (11)$$

where $S(x',y')$ is the complex amplitude on the input aperture at the transverse plane z=0, $\lambda$ is the wavelength of the propagating light and (x',y'), (x,y) are the coordinates of the input and output planes, respectively. For 3D objects, contributions from the object points are accumulated to the following expression, $$O_z(x, y) = \quad (12)$$
$$\iiint S(x', y', z')\exp\left\{\frac{i\pi}{\lambda(z-z')}[(x-x')^2 + (y-y')^2]\right\}dx'dy'dz'$$

where (x',y',z') are the coordinates of the input space. In a conventional holography approach that produces a Fresnel hologram, the complex amplitude $O_z(x,y)$ may be interfered with a reference beam and the intensity of the resulting interference pattern is recorded on a photographic plate or a digital camera. However, according to the present invention, a convolution similar to Equation 12 may be performed differently using incoherent light, because the Fresnel propagation described in Equation 11 may be valid only for coherent illumination.

For a two-dimensional (2D) input intensity function s(x,y) and an intensity point spread function (PSF)|h(x,y)|², a correlator output intensity (e.g., of a correlator such as shown in FIG. 3) distribution may be given by the following convolution, $$o(x,y)=s(x,y)*|h(x,y)|^2=s(x',y')|h(x-x',y-y')|^2dx'dy' \quad (13)$$

where the asterisk denotes a 2D convolution, h(x,y) is the amplitude PSF in the system, but under coherent illumination. h(x,y) is related to the 2D inverse Fourier transform of the filter function H(u,v) at plane $P_2$, as the following, $$h(x, y) = \iint H(u, v)\exp\left[\frac{i2\pi}{\lambda f_2}(xu + yv)\right]dudv \quad (14)$$

where $f_2$ is the focal length of the second lens in the correlator shown in FIG. 3. To solve for 3D objects rather 2D, a response of the incoherent correlator to a 3D input function may be determined. Further, although the input function is three-dimensional, the output and the convolution remain two-dimensional. In fact the correlator response for a 3D input is, $$o(x,y)=\int s(x,y,z)*|h(x,y,z)|^2 dz=\iiint s(x',x',y-y',z') \\ |^2 dx'dy'dz' \quad (15)$$

To calculate the general 3D amplitude PSF h(x,y,z) of the system, a response to a single point located at some point (x,y,z) in the vicinity of the rear focal point of the correlator may be determined. Such a calculation produces the 3D PSF of the system which may be used to calculate the system response to any possible 3D input. Since the system is known as space invariant it is correct to calculate the system response to a point on the optical axis at some point (0,0,−z), and to generalize the response toward a general location at (x,y,z). The input point is located a distance $f_1+z$ from the lens 302 at the point 308 (i.e., 0,0,−z), as shown in FIG. 3.

The Fresnel integrals in Equations 11 and 12 can be used to calculate the light distribution because a single monochromatic point source is by definition a spatial coherent source. By substituting the representation of a single point source, represented by a delta function δ(0,0,−z), into Equation 12 as the input S(x,y,z), the result on the plane of the first lens 302 is a diverging quadratic phase function as follows, $$O_{L_1}(x, y) = \int\int\int \delta(x', y', z'+z)\exp \qquad (16)$$

$$\left[\frac{i\pi}{\lambda(f_1-z')}\{(x-x')^2+(y-y')^2\}\right]dx'dy'dz'$$

$$= \exp\left[\frac{i\pi}{\lambda(f_1+z)}(x^2+y^2)\right]$$

where $f_1$ is the focal length of the first lens in the correlator shown in FIG. 3. This quadratic phase function is known as the paraxial approximation of the spherical wave propagating in the z direction, and the paraxial approximation of a concave spherical lens transparency. This spherical wave propagates through the incoherent correlator and beyond the correlator the beam becomes a converging spherical wave. It may be shown that at the plane where the beam is focused one gets the Fourier transform of the transparency function of the mask H(u,v). This Fourier transform is scaled according to the specific location of the focal plane and is multiplied by a quadratic phase function.

Assuming that the three optical thin elements $L_1$, $L_2$ and H(u,v) of the incoherent correlator (e.g., elements 302, 306 and 304, respectively, in FIG. 3) are all located at the same plane, the diverging spherical wave and the two adjunct lenses $L_1$ and $L_2$ can be replaced by a single equivalent lens having a focal length $f_e$, as follows:

$$f_e = \left(\frac{1}{f_1}+\frac{1}{f_2}-\frac{1}{f_1+z}\right)^{-1} = \frac{f_1 f_2(f_1+z)}{f_1^2+z(f_1+f_2)} \qquad (17)$$

In a system having the equivalent lens in place of the correlator, once the system is illuminated by a plane wave, the complex amplitude on a back focal plane of equivalent lens $L_e$ is related to the 2D Fourier transform of the transparency function H(u,v). This means that the complex amplitude on the back focal plane, at a distance $f_e$ from the equivalent lens $L_e$ is $$u(x, y, z) = \qquad (18)$$

$$A\exp\left[\frac{i\pi}{\lambda f_e(z)}(x^2+y^2)\right]\int\int H(u, v)\exp\left[\frac{-i2\pi}{\lambda f_e(z)}(xu+yv)\right]dudv$$

Note that the incoherent system is analyzed above according to the rules of coherent diffraction theory because the beams are considered to have been emitted from a single infinitesimal point. Since the output of the system is located a distance $f_2$ from the equivalent lens $L_e$, the output complex amplitude is obtained after a free propagation beyond the back focal plane of the equivalent lens $L_e$.

Free propagation of coherent light may be obtained, as mentioned above in Equation 11, as the result of convolution between the complex amplitude in the starting plane and a quadratic phase function. According to this, the output complex amplitude is, $$h(x, y, z) = u(x, y, z) * \exp\left[\frac{i\pi}{\lambda[f_2-f_e(z)]}(x^2+y^2)\right] = \qquad (19)$$

$$\left\{\exp\left[\frac{i\pi}{\lambda f_e(z)}(x^2+y^2)\right]\int\int H(u, v)\exp\left[\frac{-i2\pi}{\lambda f_e(z)}(xu+yv)\right]dudv\right\} *$$

$$\exp\left[\frac{i\pi}{\lambda[f_2-f_e(z)]}(x^2+y^2)\right]$$

Note that although the function in Equation 19 deals with three dimensions, the convolution is always in 2D. Equation 19 expresses the general 3D amplitude Point Spreading Function (PSF) of the system when it is illuminated by coherent light. Further, Equation 19 can be simplified by writing explicitly the convolution integral, switching the order of integration and using the well-known result of the Fourier transform of quadratic phase function. Such a simplification reduces the four integrals of Equation 19 to a double integral as follows:

$$h(x, y, z) = \qquad (20)$$

$$\exp\left[\frac{i\pi}{\lambda f_2}(x^2+y^2)\right] \times \int\int H(u, v)\exp\left[\frac{-i\pi[f_2-f_e(z)]}{\lambda f_2 f_e(z)}(u^2+v^2)\right]$$

$$\exp\left[\frac{-i2\pi}{\lambda f_2}(xu+yv)\right]dudv$$

Another equation used to synthesize the filter in the system is the expression of the amplitude PSF for any point at the plane z=0, given by substituting $f_e(0)=f_2$ in Equation 20, as follows, $$h(x, y, 0) = \exp\left[\frac{i\pi}{\lambda f_2}(x^2+y^2)\right]\int\int H(u, v)\exp\left[\frac{-i2\pi}{\lambda f_2}(xu+yv)\right]dudv. \qquad (21)$$

As described above, the intensity PSF for incoherent systems and for intensity distributions on the input and output planes is $|h(x,y,z)|^2$. The intensity PSF represents the impulse response of general incoherent systems. By taking the absolute square of Equation 20 one finds that the 3D intensity PSF is, $$|h(x, y, z)|^2 = \qquad (22)$$

$$\left|\int\int H(u, v)\exp\left[\frac{-i\pi[f_2-f_e(z)]}{\lambda f_2 f_e(z)}(u^2+v^2)\right]\exp\left[\frac{-i2\pi}{\lambda f_2}(xu+yv)\right]dudv\right|^2$$

The general expression of Equation 22 can be used to compute the PSF for a given filter or the required filter for a given PSF.

According to Equation 17 the expression in the exponent of Equation 22 is, $$\frac{[f_2 - f_e(z)]}{f_2 f_e(z)} = \frac{f_2 - \frac{f_1 f_2(f_1 + z)}{f_1^2 + z(f_1 + f_2)}}{\frac{f_1 f_2^2(f_1 + z)}{f_1^2 + z(f_1 + f_2)}} = \frac{z}{f_1(f_1 + z)} \quad (23)$$

Substituting Equation 23 into Equation 12 yields $$|h(x, y, z)|^2 = \qquad (24)$$

$$\left| \int\int H(u, v) \exp\left[\frac{-i\pi z}{\lambda f_1(f_1 + z)}(u^2 + v^2)\right] \exp\left[\frac{-i2\pi}{\lambda f_2}(xu + yv)\right] du dv \right|^2$$

The general expression of Equation 24 can be used to compute the PSF for a given filter or the required filter for a given PSF.

To obtain a Fresnel hologram, which is a convolution between any object and a quadratic phase function, an incoherent intensity PSF in a shape of a quadratic phase function with a number of cycles (Fresnel number) dependent on the distance z is selected. This may not be achieved directly because $|h(x,y,z)|^2$ is a positive real function while a quadratic phase function has negative and imaginary values.

One method of selecting such a PSF is to compose the PSF $|h(x,y,z)|^2$ as a sum of three terms, one of them is the required quadratic phase function, and their sum maintains the condition that $|h(x,y,z)|^2$ is a positive real function. Thus, a PSF such as shown in Equation 25

$$|h(x, y, z)|^2 = \qquad (25)$$

$$p_z(x, y) \left\{ 1 + \frac{1}{2} \exp\left[\frac{i\pi}{\lambda \Delta(z)}(x^2 + y^2)\right] + \frac{1}{2} \exp\left[\frac{-i\pi}{\lambda \Delta(z)}(x^2 + y^2)\right] \right\}$$

satisfies this condition, where $\Delta(z)$ is a parameter linearly related to the distance z and $p_z(x,y)$ is a disk function with the diameter $d(z)$, different for different values of z, that indicates the limiting aperture of a corresponding Fresnel Zone Pattern (FZP). The amplitude PSF for this choice is $$h(x, y, z) = \sqrt{p(x, y)\left\{1 + \cos\left[\frac{i\pi}{\lambda\Delta(z)}(x^2 + y^2)\right]\right\}} \qquad (26)$$

$$= \sqrt{2}\, p(x, y)\cos\left[\frac{i\pi}{2\lambda\Delta(z)}(x^2 + y^2)\right]$$

$$= p_z(x, y)\left\{\frac{1}{\sqrt{2}}\exp\left[\frac{i\pi(x^2 + y^2)}{2\lambda\Delta(z)}\right] + \frac{1}{\sqrt{2}}\exp\left[\frac{-i\pi(x^2 + y^2)}{2\lambda\Delta(z)}\right]\right\}$$

Note that a possible arbitrary pure phase term can multiply $h(x,y,z)$ without affecting the square magnitude of $h(x,y,z)$ given in Equation 25. However in order to get a Fresnel hologram of all the object's points, it is preferred that $h(x,y,z)$ remains as a sum of two quadratic phase terms along the propagation axis. Of the possible phase functions that can multiply $h(x,y,z)$, only a quadratic phase function may satisfy the condition that $h(x,y,z)$ is a sum of two quadratic phase terms after propagating a distance. Accordingly, it is appropriate to assume that $h(x,y,z)$ is a sum of two quadratic waves with the same magnitude of Fresnel number but with opposite signs, as given in Equation 26. Further, as described below, two quadratic waves with different Fresnel numbers may be used in an optimized solution.

Based on the desired $h(x,y,z)$, $H(u,v)$ may be calculated by inversing Equation 21, to produce the following filter function in Equation 27.

$$H(u, v) = \int\int h(x, y, 0)\exp\left[\frac{-i\pi}{\lambda f_2}(x^2 + y^2)\right]\exp\left[\frac{i2\pi}{\lambda f_2}(xu + yv)\right]dx dy \qquad (27)$$

Substituting Equation 26 into Equation 27 yields Equation 28

$$H(u, v) = \left\{\frac{1}{2}\exp\left[\frac{i\pi}{\lambda\gamma_1}(u^2 + v^2)\right] + \frac{1}{2}\exp\left[\frac{i\pi}{\lambda\gamma_2}(u^2 + v^2)\right]\right\} * P(u, v) \qquad (28)$$

where $P(u,v)$ is the Fourier transform of $p_z(x,y)$. Note that $H(u,v)$ is 2D function which determines the dependency of $h(x,y,z)$ along the transverse coordinates $(x,y)$. The dependency of $h(x,y,z)$ along the z axis is dictated by the location of input source point.

The intensity PSF may be obtained by substituting the filter function of Equation 28 into Equation 22. Substituting Equation 17 into the exponent expression of Equation 22 yields, $$\frac{[f_2 - f_e(z)]}{f_2 f_e(z)} = \frac{f_2 - \frac{f_1 f_2(f_1 + z)}{f_1^2 + z(f_1 + z)}}{\frac{f_1 f_2^2(f_1 + z)}{f_1^2 + z(f_1 + f_2)}} = \frac{z}{f_1(f_1 + z)} \qquad (29)$$

Assuming that the filter function is $$H(u, v) = \left\{\frac{1}{2}\exp\left[\frac{i\pi}{\lambda\gamma}(u^2 + v^2)\right] + \frac{1}{2}\exp\left[\frac{-i\pi}{\lambda\gamma}(u^2 + v^2)\right]\right\} * P_o(u, v) \qquad (30)$$

therefore, Equation 22 becomes, $$|h(x, y, z)|^2 = \left| \int\int \left\{\frac{1}{2}\exp\left[\frac{i\pi}{\lambda\gamma}(u^2 + v^2)\right] + \frac{1}{2}\exp\left[\frac{-i\pi}{\lambda\gamma}(u^2 + v^2)\right]\right\} * \right. \qquad (31)$$

$$\left. P_o(u, v) \times \exp\left[\frac{-i\pi}{\lambda}\frac{z}{f_1(f_1 + z)}(u^2 + v^2)\right]\exp\left[\frac{-i2\pi}{\lambda f_2}(xu + yv)\right]du dv \right|^2$$

After summation corresponding terms, the result is, $$|h(x, y, z)|^2 = \left| \int\int \left\{ \frac{1}{2}\exp\left[\frac{i\pi(f_1^2 + f_1 z - \gamma z)(u^2 + v^2)}{\lambda\gamma f_1(f_1 + z)}\right] + \right. \right. \qquad (32)$$

$$\left. \left. \frac{1}{2}\exp\left[\frac{-i\pi(f_1^2 + f_1 z + \gamma z)(u^2 + v^2)}{\lambda\gamma f_1(f_1 + z)}\right] \right\} * \right.$$

-continued $$\left. P_o(u,v)\exp\left[\frac{-i2\pi}{\lambda f_2}(xu+yv)\right]dudv\right|^2$$

Calculating the Fourier transform, $$|h(x,y,z)|^2 = \left|\left\{\frac{1}{2}\exp\left[\frac{-i\pi\gamma f_1(f_1+z)(x^2+y^2)}{\lambda f_2^2(f_1^2\gamma+f_1z-\gamma z)}\right]+\right.\right. \tag{33}$$
$$\left.\left.\frac{1}{2}\exp\left[\frac{i\pi\gamma f_1(f_1+z)(x^2+y^2)}{\lambda f_2^2(f_1^2\gamma+f_1z+\gamma z)}\right]\right\}p_o(x,y)\right|^2$$

Calculating the square magnitude yields, $$|h(x,y,z)|^2 = 1 + \frac{1}{4}\exp\left[\frac{i2\pi\gamma f_1^2(f_1+z)^2(x^2+y^2)}{\lambda f_2^2(f_1^2(f_1+z)^2-\gamma^2 z^2)}\right]+ \tag{34}$$
$$\frac{1}{4}\exp\left[\frac{-i2\pi\gamma f_1^2(f_1+z)^2(x^2+y^2)}{\lambda f_2^2(f_1^2(f_1+z)^2-\gamma^2 z^2)}\right]$$

The parameter $\Delta(z)$ is, $$\Delta(z) = \frac{(f_1^2(f_1+z)^2-\gamma^2 z^2)f_2^2}{2\gamma f_1^2(f_1+z)^2} \tag{35}$$

Equation 35 gives the value of $\Delta(z)$, the distance of a reconstructed image point as a function of the object point's location on the z axis, for the general choice of $\gamma_{1,2}=\pm\gamma$.

The derivative of $\Delta(z)$ yields the axial magnification as a function of z. The derivative of $\Delta(z)$ given in Equation 35 is, $$\frac{d\Delta(z)}{dz} = \frac{-z\gamma f_2^2}{f_1(f_1+z)^3} \tag{36}$$

Equation 36 indicates that there is a point at z=0, which is at the front focal point in which the axial magnification is zero. This point is also an extreme point of the function $\Delta(z)$. This means that for an object positioned at this location, points on one side (e.g., object points where z<0) yield the same hologram as other points from the other side (e.g., object points where z>0). The result might be a reconstruction of an axially folded image. Therefore, recording a hologram of an object located at this point may be advantageously avoided.

The immediate conclusion from this curve is that one cannot record a hologram of an object that has points from both sides of the forbidden point. This is because every two points to the left and to the right of z=0 induce the same hologram which is actually a FZP with the same value of $\Delta(z)$. In other words, from the recorded hologram one cannot know whether the object is located at z or at −z. A solution to this problem may be to record holograms of objects that are all located only at one side of the point z=0.

We also see from Equation 36 that $\Delta(z)$ is not a linear function of z. This phenomenon might introduce distortion of the image if the object has considerable depth. However, this depth distortion can be compensated during computer reconstruction of the three-dimensional image based on the known curve of $\Delta(z)$.

Equation 36 also shows that that in the region z>0 there is a point where $d\Delta(z)/dz$ gets its maximum value. This point may be convenient for locating the object because in the vicinity of this point the magnification may be maximal and approximately linear. This point may be found by comparing a second derivative of $\Delta(z)$ to zero. The optimal point is at $z_o=f_1/2$. Substituting the value of $z_o$ back into Equation 36 yields the following axial magnification $$M_A = \frac{d\Delta(z)}{dz} = \frac{-4\gamma f_2^2}{27f_1^3} \tag{37}$$

Thus, Equation 37 provides a basis for selecting the value of $\gamma$. In any hologram without distortions during the reconstruction the axial and the transverse magnifications are equal. Therefore, the transverse magnification of the inventive system is $M_T=-f_2/f_1$. Substituting the non-distortion constraint that $M_T=M_A$ into Equation 37 yields the filter parameter as follows, $$\gamma = \frac{27f_1^2}{4f_2} \tag{38}$$

For example, when magnifications of the two lenses are −0.5 (i.e., $f_1=2f_2$) the filter parameter $\gamma$ is $27f_2$. Thus, in the embodiment of FIG. 3, for the simpler case of $f_1=2f_2$, one quadratic phase has a focal length resulting in $\gamma_1=27f_2$. For symmetry, the other quadratic phase may likewise be selected to have a focal length resulting in $\gamma_2=-27f_2$. Substituting these values into Equation 30 yield the following filter function:

$$H(u,v) = \left\{\frac{1}{2}\exp\left[\frac{i\pi}{27\lambda f_2}(u^2+v^2)\right] + \frac{1}{2}\exp\left[\frac{-i\pi}{27\lambda f_2}(u^2+v^2)\right]\right\} * P_o(u,v) \tag{39}$$

Note, that such a symmetric hologram has real values only, and this property may be used to advantageously implement a mask. Substituting the filter function of Equation 39 into Equation 22 yields intensity PSF of the form of Equation 25, where $\Delta(z)$ is given by Equation 35 as follows, $$\Delta(z) = \frac{\left[f_1^2(f_1+z)^2 - \frac{27^2}{4}f_1^2 z^2\right]\frac{f_1^2}{4}}{2\frac{27}{2}f_1^3(f_1+z)^2} \tag{40}$$
$$= \frac{[4(f_1+z)^2 - 27^2 z^2]f_1}{108(f_1+z)^2}$$

In the point $z_o=f_1/2$ of maximum, and almost linear, magnification, $\Delta(z_o)$ is $$\Delta(z_o) = -\frac{693}{972}f_1 \tag{41}$$

Note that when the hologram is reconstructed, twin images are obtained along the z axis at the vicinity of the points $\pm\Delta(z)$ from the hologram plane. Solving the twin image reconstruction problem is further described below.

Following is an example of how parameters may be selected for fabrication of a mask according to the present invention. Assuming that an SLM used as the filter medium has N×N pixels in a rectangle area of size D×D, a FZP with ±γ parameters may be displayed on the SLM, where the width of a thinnest possible ring is given by $\delta = |\gamma|\lambda/D$ and $\delta = D/N$. Therefore, from the equation $D/N = |\gamma|\lambda/D$ one gets $|\gamma| = D^2/N\lambda$. For an SLM having D≈2 cm, N≈1000 pixels, the result is $|\gamma| \approx 80$ cm in the visible light regime where $\lambda \approx 0.5$ μm. According to Equation 22, and the discussion after that, $\gamma_{1,2} = \pm 27 f_2$ and therefore $f_2 \approx 6$ cm and $f_1 \approx f_2/2 = 3$ cm.

Equation 25 describes the intensity PSF captured by an image capture device according to the present invention. This PSF has three additive terms that are all concentrated in the center of the image capture plane. Therefore, convolution of the object function with such an intensity PSF yields three overlapped non-separated terms. However, it is desired to extract only a desired convolution term between the object and a single quadratic phase function among the three convolutions with three terms of the intensity PSF. A desired convolution between the object and a single quadratic phase function among the three convolutions with three terms of Equation 22 may be extracted using methods similar to those in digital holography, for example as described by I. Yamaguchi, and T. Zhang, "Phase-shifting digital holography," Opt. Lett. 22, 1268-1269 (1997), which is incorporated herein by reference.

The correlator may perform three operations of convolution between the object and three PSFs equipped with three different constant phase values. These PSFs may be synthesized by introducing three filter masks with three different constant phase values as follows, $$H_n(u, v) = \left\{\frac{1}{2}\exp\left[\frac{i\pi}{\lambda\gamma}(u^2 + v^2) + \frac{i\theta_n}{2}\right] + \frac{1}{2}\exp\left[-\frac{i\pi}{\lambda\gamma}(u^2 + v^2) - \frac{i\theta_n}{2}\right]\right\} * P(u, v), \quad (42)$$
$$n = 1, 2, 3$$

By the relation of Equation 24, it can be shown that the three filters induce three intensity PSFs as follows, $$|h_n(x, y, z)|^2 = p_z(x, y) \times \left\{1 + \frac{1}{2}\exp\left[\frac{i\pi}{\lambda\Delta(z)}(x^2 + y^2) + i\theta_n\right] + \frac{1}{2}\exp\left[\frac{-i\pi}{\lambda\Delta(z)}(x^2 + y^2) - i\theta_n\right]\right\} \quad (43)$$

Substituting the three PSFs of Equation 43 into Equation 15 yields the output intensity images that may be recorded by a camera or other suitable image capture device (e.g., CCD, CMOS, photographic film, etc. . . . ):

$$o_n(x, y) = \int s(x, y, z) * |h_n(x, y, z)|^2 dz = \int [s(x, y, z) * p_z(x, y)] dz + \quad (42)$$
$$\frac{1}{2}\exp(i\theta_n) \int s(x, y, z) * p_z(x, y) \exp\left[\frac{i\pi}{\lambda\Delta(z)}(x^2 + y^2)\right] dz +$$
$$\frac{1}{2}\exp(-i\theta_n) \int s(x, y, z) * p_z(x, y) \exp\left[\frac{-i\pi}{\lambda\Delta(z)}(x^2 + y^2)\right] dz,$$
$$n = 1, 2, 3$$

From these three images, a single term of convolution between the object $s(x,y)$ and one of the quadratic phases may be extracted. A possible formula to isolate such a single convolution is $$O_F(x,y) = o_1(x,y)[\exp(-i\theta_3) - \exp(-i\theta_2)] + o_2(x,y)[\exp(-i\theta_1) - \exp(-i\theta_3)] + o_3(x,y)[\exp(-i\theta_2) - \exp(-i\theta_1)] \quad (43)$$

$O_F(x,y)$ is a final complex valued hologram which satisfies the relation, $$O_F(x, y) = \int s(x, y, z) * p(x, y) \exp\left[\frac{i\pi}{\lambda\Delta(z)}(x^2 + y^2)\right] dz \quad (44)$$

The function $O_F(x,y)$ is the final hologram which contains information on the one 3D image only. Such an image $s(x,y,z)$ can be reconstructed from $O_F(x,y)$ by calculating the inverse operation to Equation 45, as follows, $$s(x, y, z) = O_F(x, y) * \exp\left[\frac{-i\pi}{\lambda\Delta(z)}(x^2 + y^2)\right] \quad (45)$$

Subsequently, the process of obtaining a single hologram with good separation between the three terms will be described. However, practical aspects of performing the convolution with three different PSFs are described first. There are several ways in which the filters may be multiplexed to produce the three partial images. For example, a time multiplexing system, such as the embodiment shown in FIG. 15, multiplexes the filters over time. Alternatively, the multiplexing may be done in the output plane of a single channel, for example as in the embodiment shown in FIG. 4. When a single point source is introduced at the point (0,0,0) the system's PSF is a pattern of 3 FZP with 3 different phases, distributed at 3 separated locations on the output plane. This 2D amplitude PSF is given by, $$h(x, y, 0) = \quad (46)$$
$$\sum_{n=1}^{3} \left(\frac{1}{\sqrt{2}}\exp\left\{\frac{i\pi}{2\lambda\Delta(0)}[(x-x_n)^2 + (y-y_n)^2] + \frac{i\theta_n}{2}\right\} + \frac{1}{\sqrt{2}}\exp\left\{\frac{-i\pi}{2\lambda\Delta(0)}[(x-x_n)^2 + (y-y_n)^2] - \frac{i\theta_n}{2}\right\}\right) p_o(x-x_n, y-y_n),$$

where $(x_n, y_n)$ is the center point of the nth FZP. $h(x,y,0)$ of Equation 46 may be used to synthesize the filter $H(u,v)$ by Fourier transform of $h(x,y,0)$. For synthesizing the diffractive optical element (DOE) in a lensless system, for example the embodiment shown in FIGS. 1 and 22C, one may multiply the filter function by the transmission function of the two spherical lenses, to identify the overall transmission function of the DOE as follows, $$H(u, v) = \exp\left[\frac{-i\pi(f_1 + f_2)}{\lambda f_1 f_2}(u^2 + v^2)\right] \quad (47)$$
$$\int\int h(x, y, 0)\exp\left[\frac{-i\pi}{\lambda f_2}(x^2 + y^2)\right]\exp\left[\frac{i2\pi}{\lambda f_2}(xu + vy)\right] dx dy,$$

where $h(x,y,0)$ is given in Equation 46.

A further embodiment includes a method of recording digital Fresnel holograms under incoherent illumination. According to this embodiment, the reflected white light from a 3-D object propagates through a diffractive optical element (DOE) and is recorded by a digital camera. Three holograms are recorded sequentially each with a different phase factor of the DOE. The three holograms are superposed in the computer such that the result is a complex valued Fresnel hologram. The 3-D properties of the object are revealed by reconstructing this hologram in the computer. To the best of our knowledge, the demonstrated hologram is the first digital hologram recorded without using laser light.

Figure 33:
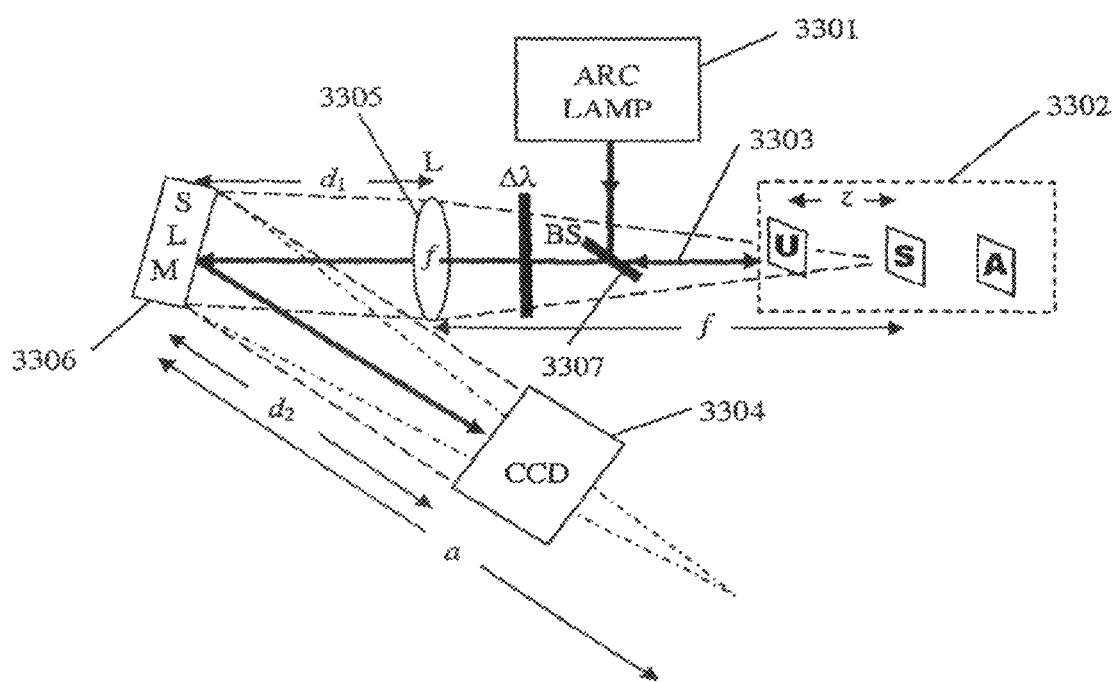
FIG. 33 is a block diagram of another embodiment of an optical apparatus.

A system according to this embodiment is shown in FIG. 33. A white light source 3301 illuminates a 3-D object 3302 and the reflected light 3303 from the object is captured by a CCD camera 3304 after passing through a lens L 3305 and a DOE displayed on a spatial light modulator (SLM) 3306. The specific SLM in this experiment operates in reflection mode, but it is well understood that the same principles and analysis are valid for transmission SLM as well. In general, such system can be analyzed as an incoherent correlator, where the DOE function is considered as the system's transfer function. However, in this work we find it easier to regard the system as an incoherent interferometer, where the grating displayed on the SLM is considered as a beam splitter. As is common in such cases, we analyze the system by following its response to an input object of a single infinitesimal point. Knowing the system's point spread function (PSF), enables one to realize the system operation for any general object. Analysis of a beam originated from narrow band infinitesimal point source is done using Fresnel diffraction theory (J. Goodman, Introduction to Fourier Optics, $2^{nd}$ ed., McGraw-Hill, New York, 1996, pp. 63-95 (Chapter 4)) since such a source is coherent by definition.

A Fresnel hologram of a point object is obtained when the two interfering beams are, for instance, plane and spherical beams. Such a goal is achieved if the DOE's reflection function R(x,y) is of the form, $$R(x_D, y_D) = \frac{1}{2} + \frac{1}{2}\exp\left[-\frac{i\pi}{\lambda a}(x_D^2 + y_D^2) + i\theta\right] \quad (48)$$

$$= \frac{1}{2} + \frac{1}{2}Q\left(-\frac{1}{a}\right)\exp(i\theta),$$

Where $\lambda$ is the central wavelength, and for the sake of shortening, the quadratic phase function is designated by the function Q such that $Q(b)=\exp[i\pi b/\lambda(x^2+y^2)]$. The constant term of ½ in Eq. (48) contributes the plane wave, and the quadratic phase term is responsible on the spherical wave. The angle $\theta$ plays an important rule later in the computation process in order to get rid of the twin image and the bias term.

A point source located at the point $(0,0,z_s)$ a distance $f-z_s$ from a spherical positive lens, with f focal length, induces on the lens plane a diverging spherical wave of the form of $Q(1/f-z_s)$. Right after the lens, which has a transmission function of $Q(-1/f)$, the complex amplitude of the wave is $Q(1/f-z_s)Q(-1/f)=Q[z_s/f(f-z_s)]$. After propagating additional distance of $d_1$ till the DOE plane, the complex amplitude becomes $Q\{z_s/[f(f-z_s)+z_s d_1]\}$. Right after the DOE, with the reflection function given in Eq. (1), the complex amplitude is related to $Q\{z_s/[f(f-z_s)+z_s d_1]\}[1+Q(-1/a)\exp(i\theta)]$. Finally, in the CCD plane a distance $d_2$ from the DOE, the intensity of the recorded hologram is, $$I_P(x, y) = A\left|Q\left[\left(\frac{f(f-z)}{z} + d_1 + d_2\right)^{-1}\right] + \right. \quad (49)$$

$$\left. Q\left[\left(\frac{af(f-z)+azd_1}{za-f(f-z)-zd_1} + d_2\right)^{-1}\right]\exp(i\theta)\right|^2$$

where A is a constant. The first term of Eq. (49) is now approximated to a constant by assuming that z is much smaller than f. Since the system is shift invariant the result of $I_P(x,y)$, after calculating the square magnitude in Eq. (49), can be generalized to a PSF for any source point located at any point $(x_s,y_s,z_s)$, as follows, $$I_P(x, y) = A\left(2 + \exp\left\{\frac{i\pi}{\lambda\gamma(z)}\left[\left(x - \frac{\gamma(z)x_s}{f}\right)^2 + \left(y - \frac{\gamma(z)y_s}{f}\right)^2\right] + i\theta\right\} + \quad (50)\right.$$

$$\left.\exp\left\{\frac{-i\pi}{\lambda\gamma(z)}\left[\left(x - \frac{\gamma(z)x_s}{f}\right)^2 + \left(y - \frac{\gamma(z)y_s}{f}\right)^2\right] - i\theta\right\}\right),$$

where, $\gamma(z)=[d_2-a-z(d_1 a+d_2 f-af+d_2 a-d_1 d_2)/f^2]/[1-z(a+f-d_1)/f^2]$. For a general 3-D object $g(x_s,y_s,z_s)$ illuminated by a narrowband incoherent illumination, the intensity of the recorded hologram is an integral of the entire PSFs given in Eq. (50), over all object points $g(x_s,y_s,z_s)$, as follows $$H(x, y) = \quad (51)$$

$$A\left(C + \int\int\int g(x_s, y_s, z_s)\exp\left\{\frac{i\pi}{\lambda\gamma(z)}\left[\left(x - \frac{\gamma x_s}{f}\right)^2 + \left(y - \frac{\gamma y_s}{f}\right)^2\right] + i\theta\right\}\right.$$

$$dx_s dy_s dz_s + \int\int\int g(x_s, y_s, z_s)\exp$$

$$\left.\left\{\frac{-i\pi}{\lambda\gamma(z)}\left[\left(x - \frac{\gamma x_s}{f}\right)^2 + \left(y - \frac{\gamma y_s}{f}\right)^2\right] - i\theta\right\}dx_s dy_s dz_s\right).$$

Besides a constant term Eq. (51) contain two terms of convolution between an object and a quadratic phase, z-dependent, function, which means that the recorded hologram is indeed a Fresnel hologram. In order to remain with a single convolution term out of the three terms given in Eq. (51), we follow the usual procedure of on-axis digital holography (I. Yamaguchi, and T. Zhang, "Phase-shifting digital holography," Opt. Lett. 22, 1268-1269 (1997). commercial). Three holograms of the same object are recorded each of which with a different phase constant $\theta$. The final hologram $H_F$ is a superposition according to the following, $$H_F(x,y)=H_1(x,y)[\exp(-i\theta_3)-\exp(-i\theta_2)]+H_2(x,y)$$
$$[\exp(-i\theta_1)-\exp(-\theta_3)]+H_3(x,y)[\exp(-i\theta_2)-\exp(-i\theta_1)]. \quad (52)$$

where $H_k$ is the kth recorded hologram with the phase constant $\theta_k$. A 3D image s(x,y,z) can be reconstructed from $H_F(x,y)$ by calculating the Fresnel propagation formula, as follows, $$s(x, y, z) = H_F(x, y) * \exp\left[\frac{i\pi}{\lambda z}(x^2 + y^2)\right], \quad (53)$$

where the asterisk denotes a 2D convolution.

The system shown in FIG. 33 has been used to record the three holograms. The SLM (HOLOEYE HEO 1080P) is phase-only and as so the desired function given by Eq. (48) cannot be directly displayed on this SLM 3306. To overcome this obstacle, we chose to display the phase function Q(-1/a) on only half of the SLM pixels. The rest of the pixels were modulated with a constant phase, where the pixels of each kind were selected randomly. By this method the SLM function becomes a good approximation to R(x,y) of Eq. (48). The SLM 3306 has 1920×1080 pixels in a display of 16.6×10.2 mm, where only 1024×1024 pixels were used for implementing the DOE. The phase distribution of the three reflection masks displayed on the SLM 3306, with phase constants of 0°, 120° and 240°, are shown in FIGS. 34A-34C, respectively. The other specifications of the system are: f=250 mm, a=800 mm, $d_1$=132 mm, $d_2$=260 mm. The system also includes beamsplitter BS 3307 and lens L 3305 is spherical with a focal length f.

Three white on black letters each (U, S, and A), the 3D object 3302 of the size 2×2 mm were located at the vicinity of rear focal point of the lens. 'O' was at z=−24 mm, 'S' was at z=−48 mm and 'A' was at z=−72 mm. These letters were illuminated by a mercury arc lamp (Zeiss-AttoArc 2, HBO 100W). A filter which passed 574 to 725 nm light with a peak wavelength of 599 nm and a bandwidth of 60 nm was positioned between the beamsplitter and the lens L. The three holograms, each for a different phase constant of the DOE, were recorded by a cooled CCD camera (HAMAMATSU DIGITAL CAMERA C4742-95) and processed by a computer. The final hologram $H_F(x,y)$ was calculated according to Eq. (52) and its magnitude and phase distribution are depicted in FIGS. 34E and 34G, respectively.

The hologram $H_F(x,y)$ was reconstructed in the computer by calculating the Fresnel propagation toward various propagation distances according to Eq. (53). Three different reconstruction planes are shown in FIGS. 34G, 34H, and 34I. In each plane a different letter is in focus as is indeed expected from a holographic reconstruction of an object with a volume.

A process according to this invention may record holograms of realistic 3-D objects illuminated by incoherent light. Since an embodiment of the system may have only a single channel, it is not affected by vibrations, it does not demand complicated alignment and the bandwidth can be wider than conventional incoherent interferometers. The concept of the present system can be applied to the design for a portable and very simple holographic camera which might be useful for various applications in the fields of microscopy, still and video photography, astronomy and medical imaging.

By this method, light is reflected from a 3-D object, propagates through or is reflected from a diffractive optical element (DOE) and is recorded by a digital camera. Each beam which originates from any object point is split into two different, mutually coherent, spherical waves. The beam splitting is done by the DOE grating, which operates as if it were a composition of two different diffractive spherical lenses. Therefore, the single wave-front originated from a point-source is divided by the DOE to two wave-fronts with different quadratic curves that propagate in the same direction. The intensity of the two wave-front interference, originated from the same point source, is accumulated incoherently on the camera pixel array with the other interferences from the entire object points to yield the complete hologram. In order to get rid of the twin image and the bias beam resulting from each single hologram which will be described later, three incoherent holograms are recorded sequentially, each with a different phase factor of the DOE. Using the common routines of digital holography (J. Rosen, G. Indebetouw, G. Brooker, Opt. Exp. 14, 4280-4285 (2006)) (J. Rosen, and G. Brooker "Incoherent digital holography," Submitted for publication in Opt. Lett. (11/2006)) (I. Yamaguchi, and T. Zhang, Opt. Lett. 22, 1268-1269 (1997)), the three holograms are superposed in the computer, such that the result is a complex valued Fresnel hologram. When this hologram is reconstructed in the computer, a single 3-D image of the object appears in the digital reconstruction space.

The technique described above may also be used for color fluorescence imaging. An example of such an embodiment produces a color Fresnel hologram which reconstructs the 3-D object with its original fluorescent colors. The 3D objects that are imaged, for example "dice", may contain a fluorescent light source, such as several spots of two fluorescent dyes each with different emission wavelengths. The 3D objects are illuminated by an arc lamp source with a bandpass filter to illuminate the specimen with incoherent light of about 50 nm bandwidth and which can also excite fluorescence in each of the fluorescent dyes. According to this example, several digital holograms are generated for each of the different fluorescent colors on the dice and for the dice themselves. Each emission color is introduced into the recording system by restricting the emission with a specific chromatic filter. For each wavelength of the fluorescence emission and the reflected non-fluorescent light image of the object, a different Fresnel number is applied to the DOE's grating. For each wavelength, three holograms are sequentially recorded, each with a different phase factor of the DOE's function, such that the overall number of captured holograms for M colors plus the complete reflected non-fluorescent image of the object is 3·(M+1). Every three holograms of the same wavelength are superposed in a certain way such that the result is a complex valued Fresnel hologram of this wavelength. The digital reconstruction from each hologram is added to the rest, yielding a complete color 3-D image of the original object. To the best of our knowledge, the demonstrated holograms are the first fluorescence holograms recorded without scanning and the first fluorescence multiwavelength emission color holograms ever recorded.

Figure 35:
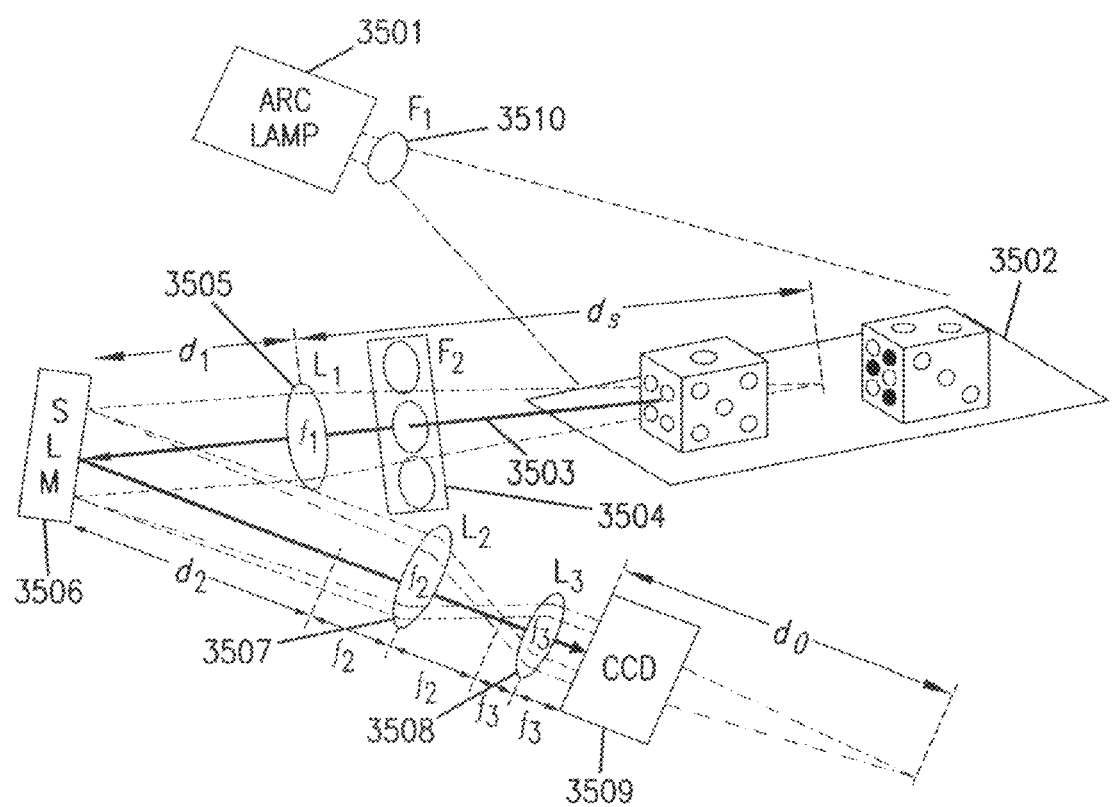
FIG. 35 is a block diagram of another embodiment of an optical apparatus.

An incoherent blue light source 3501 with a bandwidth of 56 nm illuminates a 3-D object 3502 as is shown in FIG. 35. The object's fluorescent emission light 3503 is introduced into the system after passing through one of the chromatic filters $F_2$ 3504. After passing through lens $L_1$ 3505, the beam is reflected from a spatial light modulator (SLM) 3506 toward a demagnification setup of two lenses $L_2$ 3507 and $L_3$ 3508, which projects the holographic pattern onto a CCD camera 3509. To understand the operational principle, we analyzed the system by following its response to an input object of a single infinitesimal point. Knowing the system's point spread function (PSF), enables one to analyze the system operation for any general object.

A Fresnel hologram of a point object is obtained when the two interfering beams are, for instance, plane and spherical beams. Therefore, we choose the DOE's reflection function $R(x_D,y_D)$ displayed on the SLM to be of the form, $$R(x_D, y_D) = \frac{1}{2} + \frac{1}{2}\exp\left[-\frac{i\pi}{\lambda a}(x_D^2 + y_D^2) - i\theta\right], \quad (54)$$

Where λ is the central wavelength introduced to the system. The constant term of ½ in Eq. (54) contributes the plane wave, and the quadratic phase term is the paraxial approximation of the spherical wave. The angle θ is the phase shift needed in order to get rid of the twin image and the bias term.

The reflection function of the DOE given by Eq. (54) implies that the system's outcome can be viewed as a sum of two overlap imaging systems. Finding the location of each image is a key concept for understanding this holographic recorder. In one system, let's call it system A, the DOE is actually a converging diffractive lens with a focal length of a, whereas in the other system (system B) the DOE serves as a plane mirror. In system A, a point source located at a distance $d_s = f_1$ from the lens $L_1$ is imaged to an image point at a distance $(a-d_2)(f_3/f_2)^2$ beyond the camera plane. In this last expression we use the well-known fact that the axial magnification of an ordinary imaging system is given by the relation $M_A = M_T^2 = (d_o/d_s)^2$, where $M_T$ is the transverse magnification, and $d_o$ is the distance from the output aperture to the image. For any point at $(0,0,z_s)$ located a distance $d_s f_1 - z_s$ from the lens $L_1$, assuming that $z_s \ll f_1$, the distance $d_o$ is approximately, $$d_o(z_s) \cong (a - d_2)\left(\frac{f_3}{f_2}\right)^2 + \overline{M}_A z_s \quad (55)$$

$$= (a - d_2)\left(\frac{f_3}{f_2}\right)^2 + \left(\frac{f_3 a}{f_2 f_1}\right)^2 z_s$$

$$= \left[\left(\frac{r^2}{f_1 \lambda N}\right)^2 z_s + \frac{r^2}{\lambda N} - d_2\right]\left(\frac{f_3}{f_2}\right)^2$$

where the overall axial magnification $\overline{M}_A$ is the product of magnifications of the two consecutive imaging systems, r is the DOE's radius and N is the DOE's Fresnel number given by $N = r^2/\lambda a$.

In system B, assuming that $d_s/f_1$, the object point is obtained far beyond the camera plane at a distance that justifies approximating the location of the image point at infinity. Therefore, for a point at $(x_s, y_s, z_s)$, the intensity on the camera plane is the square magnitude of the complex amplitude sum of the spherical wave converging at the distance $d_o$ beyond the CCD plane, together with a plane wave, as follows, $$I_P(x, y) \cong C\left|1 + \exp\left\{\frac{-i\pi}{\lambda d_o(z_s)}[(x - \overline{M}_T x_s)^2 + (y - \overline{M}_T y_s)^2] - i\theta\right\}\right|^2 \quad (56)$$

where the overall transverse magnification is $\overline{M}_T = f_3 a/f_2 f_1 = f_3 r^2/\lambda N f_2 f_1$. For a general 3-D object $g(x_s, y_s, z_s)$, illuminated by a narrowband incoherent illumination, the intensity of the recorded hologram is an integral over the entire PSFs, given by Eq. (56), over all the object points, as follows $$H(x, y) = A\Big(C' + \int\int\int g(x_s, y_s, z_s)\exp \quad (57)$$

$$\left\{\frac{i\pi}{\lambda d_o(z_s)}[(x - \overline{M}_T x_s)^2 + (y - \overline{M}_T y_s)^2] + i\theta\right\}$$

$$dx_s dy_s dz_s + \int\int\int g(x_s, y_s, z_s)\exp$$

$$\left\{\frac{-i\pi}{\lambda d_o(z_s)}[(x - \overline{M}_T x_s)^2 + (y - \overline{M}_T y_s)^2] - i\theta\right\}dx_s dy_s dz_s\Big).$$

Besides a constant term C', Eq. (57) contains two terms of correlation between an object and a quadratic phase, $z_s$-dependent, function, which means that the recorded hologram is indeed a Fresnel hologram. In order to remain with a single correlation term out of the three terms given in Eq. (57), we follow the procedure of on-axis digital holography (J. Rosen, G. Indebetouw, G. Brooker, Opt. Exp. 14, 4280-4285 (2006)) (J. Rosen, and G. Brooker "Incoherent digital holography," Submitted for publication in Opt. Lett. (11/2006)). Three holograms of the same object are recorded each of which with a different phase constant θ. The final hologram $H_F$ is a superposition according to the following, $$H_F(x, y) = H_1(x, y)[\exp(-i\theta_3) - \exp(-i\theta_2)] + H_2(x, y)[\exp(-i\theta_1) - \quad (58)$$

$$\exp(-i\theta_3)] + H_3(x, y)[\exp(-i\theta_2) - \exp(-i\theta_1)].$$

$$= \int\int\int g(x_s, y_s, z_s)\exp\left\{\frac{i\pi}{\lambda d_o(z_s)}[(x - \overline{M}_T x_s)^2 + (y - \overline{M}_T x_s)^2]\right\}dx_s dy_s dz_s.$$

where $H_k$ is the k-th recorded hologram with the phase constant $\theta_k$ and k=1,2,3.

A 3-D image can be digitally reconstructed from $H_F(x,y)$ by calculating the Fresnel propagation (J. Goodman, *Introduction to Fourier Optics*, $2^{nd}$ ed., McGraw-Hill, New York, 1996, pp. 63-95 (Chapter 4)). The reconstruction results of different chromatic holograms are composed together to a complete color figure. In order to get the same transverse and axial magnifications for all the wavelengths we change the Fresnel number of the DOE such that $d_o(z_s)$, given by Eq. (55), remains the same for all recorded wavelengths. In other words, the Fresnel number of the (i+1)-th wavelength $\lambda_{i+1}$ is $N_{i+1} = N_i \lambda_i/\lambda_{i+1}$, where $N_i$ is the Fresnel number of the i-th wavelength $\lambda_i$.

An experiment showing the recording of a color fluorescence hologram was carried out on the system shown in FIG. 35. The SLM (HOLOEYE HEO 1080P) is phase-only, and as so, the desired function given by Eq. (54) cannot be directly displayed on this SLM. Instead, as a good approximation for Eq. (54), we chose to display the required quadratic phase function on only half of the SLM pixels. The rest of the pixels were modulated with a constant phase, where the pixels of both types were selected randomly (J. Rosen, and G. Brooker "Incoherent digital holography," Submitted for publication in Opt. Lett. (11/2006)). The central 1024×1024 pixels of the SLM, on an area of 9.7 mm×9.7 mm, were used for displaying the DOE. The phase constants of $\theta_{1,2,3}$=0°, 120°, 240° were introduced into the three quadratic phase functions. The other specifications of the system are: $f_1$=250 mm, $f_2$=150 mm, $f_3$=35 mm, $d_1$=135 mm, $d_2$=206 mm. $L_1$, $L_2$, and $L_3$ are spherical lenses, and $F_1$ and $F_2$ are chromatic filters.

A pair of 8 mm×8 mm dice (i.e., the 3D object 3502) (in which some of the dots were painted with either red or green fluorescent paint) were positioned at the vicinity of the rear focal point of lens $L_1$ 3505. The center of the die with red fluorescent spots and the die with green fluorescent spots were at a distance of 228 mm and 260 mm from $L_1$ 3505, respectevely. These dice were illuminated with a mercury arc lamp (ZEISS-ATTOARC 2, HBO 100W) in which only light from 444 to 500 nm with a peak wavelength of 472 nm and a bandwidth of 56 nm was allowed to pass through bandpass filter $F_1$ 3510. All of the holograms were recorded by a cooled CCD camera (HAMAMATSU DIGITAL CAMERA C4742-95, 12 bit, 1024×1280 pixels, bin 1) and processed by a computer. The first three holograms (0, 120 and 240 degrees) of the non-fluorescent surfaces on the dice were recorded with an identical filter as the source's filter mentioned above placed in the emission filter slider $F_2$ 3504

The Fresnel number for these holograms was chosen to be $N_B=10$ (based upon a center wavelength of 472 nm). The magnitude and phase of the final complex hologram, superposed from the first three holograms, is shown in FIGS. 36(a) and (b), respectively. The reconstruction from the final hologram was calculated using the Fresnel propagation formula. (J. Goodman, *Introduction to Fourier Optics*, 2nd ed., McGraw-Hill, New York, 1996, pp. 63-95 (Chapter 4)) The results are shown at the plane of the front face of the front die [36(c)], and at the plane of the front face of the rear die [36(d)]. Note that in each plane a different die face is in focus as is indeed expected from a holographic reconstruction of an object with a volume. The second set of three holograms was recorded via a red filter in the emission filter slider $F_2$ 3504 which passed 614 to 640 nm fluorescent light with a peak wavelength of 626 nm and a bandwidth of 11 nm. The Fresnel number during the recording of the 'red' holograms was $N_R=7.8$. The magnitude and phase of the final complex hologram, superposed from the 'red' set, is shown in FIGS. 36(e) and (f), respectively. The reconstruction results from this final hologram are shown in FIGS. 36 (g) and (h) at the same planes as in FIGS. 36 (c) and (d), respectively. Finally, an additional set of three holograms was recorded with a green filter in emission filter slider $F_2$ 3504 which passed 500 to 532 nm fluorescent light with a peak wavelength of 516 nm and a bandwidth of 16 nm. The Fresnel number during the recording of the 'green' holograms was $N_G=0.2$. The magnitude and phase of the final complex hologram, superposed from the 'green' set, is shown in FIGS. 36(i) and (j), respectively. The reconstruction results from this final hologram are shown in FIGS. 36 (k) and (l) at the same planes as in FIGS. 36 (c) and (d), respectively. Compositions of FIGS. 36(c), (g) and (k) and FIGS. 36(d), (h) and (l) are depicted in FIGS. 36(m) and (n), respectively. Note that all the colors in FIG. 36 are pseudo-colors. These last results yield a complete color 3-D holographic image of the object including the red and green fluorescence. While the optical arrangement in this demonstration has not been optimized for maximum resolution, it is important to recognize that even with this simple optical arrangement, the resolution is good enough to image the fluorescent emissions with good fidelity and to obtain good reflected light images of the dice. Furthermore, in the reflected light images in FIGS. 36(c) and 36(d) the system has been able to detect reflections of the illumination on the dice.

Thus, this example shows a process of recording color holograms of 3-D fluorescent objects. This example motionless system is not affected by vibrations, it does not require complicated alignment or a laser and the bandwidth can be wider than conventional incoherent interferometers, entirely because this holographic recorder is implemented on a single channel setup. The proposed design might play an important role in many types of 3D fluorescence applications (Patents pending) including fluorescence microscopy so that multicolor 3-D structures and dynamic processes could be imaged without any scanning, and therefore would be expected to be faster then other methods.

Numerous modifications and variations of the present invention are possible in light of the above teachings. It is therefore to be understood that within the scope of the appended claims, the invention may be practiced otherwise than as specifically described herein.

The invention claimed is:

1. An apparatus configured to produce a hologram of an object, said apparatus comprising:
   an electromagnetic radiation source configured to provide incoherent electromagnetic radiation on the object;
   a correlator comprising a first optical assembly configured to receive incoherent electromagnetic radiation reflected by or scattered from the object and transmit transformed electromagnetic radiation, a mask assembly configured to receive the transformed electromagnetic radiation and transmit amplitude and/or phase modified electromagnetic radiation, and a second optical assembly configured to receive the amplitude and/or phase modified electromagnetic radiation and transmit further transformed electromagnetic radiation; and
   an image capture assembly configured to capture an image of the transmitted further transformed electromagnetic radiation, and produce the hologram of the object based on the captured image,
   wherein the mask assembly includes one or more diffractive optical elements, each of the one or more diffractive optical elements including an array of plural transform regions, each of which is configured to transform amplitude and/or phase of the received transformed electromagnetic radiation, and at least one of the diffractive optical elements includes a plurality of volume-modulated diffractive optical elements, each of the volume-modulated diffractive optical elements corresponding to a different transform region, each of the volume-modulated diffractive optical elements having a volume that is different from a volume of at least one other volume-modulated diffractive optical element and is configured to transform the amplitude and/or phase of the received transformed electromagnetic radiation to produce the amplitude and/or phase modified electromagnetic radiation.

2. The apparatus of claim 1, further comprising a processing system including at least one processor configured to generate a three-dimensional image of the object based on the hologram of the object.

3. The apparatus of claim 1, further comprising a processing system including at least one processor configured to determine geometric information of the object based on the hologram of the object.

4. The apparatus of claim 1 wherein the mask assembly includes one or more spatial light modulators.

5. The apparatus of claim 1 wherein the image capture assembly includes a CCD, a CMOS light sensitive device, an electronic camera, a light sensitive emulsion, or a photosensitive device.

6. The apparatus of claim 1, wherein the object and the apparatus remain stationary while the image capture assembly captures the image.

7. The apparatus of claim 1, wherein the first optical assembly includes one or more converging Fourier lenses.

8. The apparatus of claim 1, wherein the second optical assembly includes one or more converging Fourier lenses.

9. The apparatus of claim 1, wherein the mask assembly includes a spatial light modulator configured to provide the amplitude and/or phase modified electromagnetic radiation by transforming the received transformed electromagnetic radiation according to a complex transform function.

10. The apparatus of claim 1, wherein the mask assembly includes three different mask patterns having three different transmission functions and the received transformed electromagnetic radiation is passed through the three different mask patterns.

11. The apparatus of claim 1, wherein the mask assembly comprises a mask controller configured to vary the complex transmission function of the electromagnetic radiation assembly over time, the mask controller configured to vary the complex transmission function based on a Fourier transform of a first Fresnel Zone Pattern at a first time, a Fourier transform of a second Fresnel Zone Pattern at a second time, and a Fourier transform of a third Fresnel Zone Pattern at a third time, and the image capture assembly further comprises: a timing controller configured to capture a first partial image at the first time, a second partial image at the second time, and a third partial image at the third time, and wherein the hologram is produced using the first partial image captured at the first time, the second partial image captured at the second time, and the third partial image captured at the third time.

12. An apparatus configured to produce a hologram of an object, said apparatus comprising:
- an electromagnetic radiation source configured to provide incoherent electromagnetic radiation on the object;
- a composite mask comprising a first lens and a second lens, wherein the first lens is configured to receive incoherent electromagnetic radiation reflected by or scattered from the object and transmit first refracted electromagnetic radiation and the second lens is configured to receive the incoherent electromagnetic radiation reflected by or scattered from the object and transmit second refracted electromagnetic radiation;
- a third lens configured to (1) receive the first refracted electromagnetic radiation from the first lens and the second refracted electromagnetic radiation from the second lens, and (2) transmit the received first refracted electromagnetic radiation and the received second refracted electromagnetic radiation such that they interfere with each other; and
- an image capture assembly configured to capture an image of the interference of the first refracted electromagnetic radiation and the second refracted electromagnetic radiation transmitted by the third lens and produce the hologram of the object based on the captured image.

13. The apparatus of claim 12, wherein the first lens and the second lens are shifted away from an optical axis of an image plane of the image capture assembly.

14. The apparatus of claim 12, wherein the first and second lenses are arranged in a same plane and a focal length of the first lens is different from a focal length of the second lens.

15. The apparatus of claim 12, wherein the first and second lenses are arranged in different planes and a focal length of the first lens is the same as a focal length of the second lens.

16. The apparatus of claim 12, wherein the first lens is a convex lens and the second lens is a concave lens.

17. The apparatus of claim 12, wherein the first and second lenses are both convex lenses or the first and second lenses are both concave lenses.

18. The apparatus of claim 12, wherein the third lens is configured to direct the refracted electromagnetic radiation from the first and second lenses such that the interference of the first refracted electromagnetic radiation and the second refracted electromagnetic radiation is past the third lens and produces an off-axis Fresnel Zone Pattern.

19. The apparatus of claim 12, wherein the first lens is a convex lens, the second lens is a concave lens, the first and second lenses are arranged in a same plane, a focal length of the first lens is different from a focal length of the second lens, and the refracted electromagnetic radiation from the first lens and the refracted electromagnetic radiation from the second lens interfere with each other past the third lens.

* * * * *